(12) United States Patent
Johnson et al.

(10) Patent No.: US 10,796,285 B2
(45) Date of Patent: Oct. 6, 2020

(54) RESCHEDULING EVENTS TO DEFRAGMENT A CALENDAR DATA STRUCTURE

(71) Applicant: Microsoft Technology Licensing, LLC, Redmond, WA (US)

(72) Inventors: Warren D. Johnson, Sammamish, WA (US); Jessica M. Lundin, Seattle, WA (US); Tachen C. Ni, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 917 days.

(21) Appl. No.: 15/098,339

(22) Filed: Apr. 14, 2016

(65) Prior Publication Data
US 2017/0300869 A1    Oct. 19, 2017

(51) Int. Cl.
*G06Q 10/10* (2012.01)
*G06F 16/23* (2019.01)
*G06Q 10/06* (2012.01)

(52) U.S. Cl.
CPC ..... *G06Q 10/1095* (2013.01); *G06F 16/2343* (2019.01); *G06Q 10/06314* (2013.01); *G06Q 10/1093* (2013.01)

(58) Field of Classification Search
USPC ....................................................... 705/7.19
See application file for complete search history.

(56) References Cited

U.S. PATENT DOCUMENTS

| | | |
|---|---|---|
| 5,050,077 A | 9/1991 | Vincent |
| 5,774,867 A | 6/1998 | Fitzpatrick et al. |

(Continued)

FOREIGN PATENT DOCUMENTS

| | | |
|---|---|---|
| WO | 2006/066585 A2 | 6/2006 |
| WO | 2015/029073 A2 | 3/2015 |

(Continued)

OTHER PUBLICATIONS

Humo et al. (A Mathematical Model for Classroom—Period Schedule Defragmentation, Published in: Eurocon 2007—The International Conference on "Computer as a Tool", Date Added to IEEE Xplore: Dec. 26, 2007, pp. 2030-2033).*

(Continued)

*Primary Examiner* — Matthew D Henry
(74) *Attorney, Agent, or Firm* — Rainier Patents, P.S.

(57) ABSTRACT

A computer-implemented technique is described herein for rescheduling events within calendars to achieve a target objective with respect to target occurrences of a particular kind in the calendars. For instance, the target occurrences may correspond to instances of free time, and the target objective is to increase the amount of minimum-sized free-time blocks within the calendars, e.g., by favoring the introduction of large free-time blocks of minimum size (e.g., two-hour blocks), and disfavoring the presence of smaller-sized free-time blocks scattered among calendar events. In other words, the technique defragments the calendars with respect to free time expressed in those calendars. At the same time, the technique honors (when possible) participant-related constraints associated with calendar events. Further, the technique penalizes modification of an event as a function of a temporal distance over which the event is moved; this penalization has the effect of reducing disruption to the calendars.

20 Claims, 28 Drawing Sheets

(56) References Cited

U.S. PATENT DOCUMENTS

| | | | |
|---|---|---|---|
| 6,101,480 A | 8/2000 | Conmy et al. | |
| 7,318,040 B2 | 1/2008 | Doss et al. | |
| 7,406,453 B2 | 7/2008 | Mundie et al. | |
| 8,046,767 B2 | 10/2011 | Rolia et al. | |
| 8,429,103 B1 | 4/2013 | Aradhye et al. | |
| 8,494,891 B2 | 7/2013 | Bhogal et al. | |
| 2003/0004773 A1* | 1/2003 | Clark | G06Q 10/1095 705/7.19 |
| 2003/0014491 A1 | 1/2003 | Horvitz et al. | |
| 2003/0204474 A1* | 10/2003 | Capek | G06Q 20/382 705/64 |
| 2004/0064585 A1* | 4/2004 | Doss | G06Q 10/1097 709/246 |
| 2004/0093290 A1 | 5/2004 | Doss et al. | |
| 2005/0065832 A1* | 3/2005 | Virta | G06Q 10/1093 705/7.18 |
| 2006/0200374 A1 | 9/2006 | Nelken | |
| 2007/0288278 A1 | 12/2007 | Alexander et al. | |
| 2008/0033778 A1 | 2/2008 | Boss et al. | |
| 2008/0114716 A1 | 5/2008 | Mock | |
| 2008/0294483 A1 | 11/2008 | Williams | |
| 2009/0022297 A1 | 1/2009 | Jackson et al. | |
| 2009/0089133 A1 | 4/2009 | Johnson et al. | |
| 2009/0248474 A1 | 10/2009 | Fried et al. | |
| 2009/0292578 A1 | 11/2009 | Danis et al. | |
| 2009/0313074 A1 | 12/2009 | Harpur et al. | |
| 2010/0088143 A1 | 4/2010 | Platt et al. | |
| 2010/0088144 A1 | 4/2010 | Collet et al. | |
| 2011/0072372 A1 | 3/2011 | Fritzley et al. | |
| 2011/0137700 A1 | 6/2011 | Hamalainen | |
| 2011/0184943 A1* | 7/2011 | Norton | G06Q 10/02 707/723 |
| 2011/0320234 A1 | 12/2011 | Mussman | |
| 2012/0143638 A1* | 6/2012 | Kho | G06Q 10/02 705/5 |
| 2014/0099614 A1 | 4/2014 | Hu et al. | |
| 2014/0172864 A1 | 6/2014 | Shum | |
| 2014/0235276 A1* | 8/2014 | Lefkowitz | G06Q 10/1095 455/456.3 |
| 2014/0244399 A1 | 8/2014 | Orduna et al. | |
| 2014/0347265 A1 | 11/2014 | Aimone et al. | |
| 2015/0019553 A1 | 1/2015 | Shaashua et al. | |
| 2015/0039537 A1 | 2/2015 | Peev et al. | |
| 2015/0046828 A1 | 2/2015 | Desai et al. | |
| 2015/0095292 A1* | 4/2015 | Dryfoos | G06F 16/1724 707/693 |
| 2015/0199010 A1 | 7/2015 | Coleman et al. | |
| 2015/0278730 A1 | 10/2015 | Goldsmith et al. | |
| 2015/0286929 A1 | 10/2015 | Weekes et al. | |
| 2015/0302531 A1* | 10/2015 | Thier | G06Q 40/10 705/30 |
| 2015/0317337 A1 | 11/2015 | Edgar | |
| 2016/0098539 A1 | 4/2016 | Zamanakos et al. | |

FOREIGN PATENT DOCUMENTS

| | | |
|---|---|---|
| WO | 2015/103442 A1 | 7/2015 |
| WO | 2015/123751 A1 | 8/2015 |
| WO | 2015/133989 A1 | 9/2015 |
| WO | 2015142162 A1 | 9/2015 |

OTHER PUBLICATIONS

"Non Final Office Action Issued in U.S. Appl. No. 15/098,337", dated Aug. 1, 2018, 45 Pages.

International Search Report and Written Opinion dated Jun. 1, 2017 from PCT Patent Application No. PCT/US2017/026260, 14 pages.

Refanidis, et al., "On Scheduling Events and Tasks by an Intelligent Calendar Assistant," in Proceedings of the ICAPS Workshop on Constraint Satisfaction Techniques for Planning and Scheduling Problems, Sep. 2009, 10 pages.

Trapani, Gina, "Work Smart: Defrag Your Calendar by Batching Tasks," available at <<http://www.fastcompany.com/1648827/work-smart-defrag-your-calendar-batching-tasks>>, Fast Company, published on May 18, 2010, 7 pages.

Poremsky, Diane, "Using Outlook's Autopick Next and Suggested Times," available at <<http://www.slipstick.com/outlook/calendar/using-outlooks-autopick-next-and-suggested-times/>>, Slipstick Systems, published on May 31, 2014, 13 pages.

Hogan, Lara, "Calendar Flacks," available at <<https://codeascraft.com/2014/07/15/calendar-hacks/>>, Code as Craft, Etsy Inc., New York, NY, published on Jul. 15, 2014, 7 pages.

Chung, Irene, "Introducing appointment slots in Google Calendar," available at <<http://gmailblog.blogspot.in/2011/06/introducing-appointment-slots-in-google.html>>, Goolge, Inc., Mountain View, CA, published on Jun. 6, 2011, 4 pages.

"Vote for the best meeting day and location," available at <<http://www.msoutlook.info/question/vote-for-best-meeting-day-and-location>>, MSOutlook.info, published on May 9, 2015, 4 pages.

Lindblom, Michelle, "Doodle: Easy Online Scheduling," available at <<http://wiredimpact.com/blog/doodle-easy-online-scheduling/>>, Wired Impact, published on Sep. 26, 2012, 14 pages.

Borelva, Johan, "Vote on suggestions directly from your vyte.in calendar," available at <<http://blog.vyte.in/2015/02/21/vote-vyte-calendar/>>, vyte.in blog, published on Feb. 21, 2015, 12 pages.

"SurveyMonkey for Scheduling," available at <<https://www.surveymonkey.com/mp/online-schedule-poll/>>, SurveyMonkey, published on Nov. 21, 2013, 5 pages.

Fuller, Ryan, "A Primer on Measuring Employee Engagement," available at <<https://hbr.org/2014/11/a-primer-on-measuring-employee-engagement>>, in Harvard Business Review, published on Nov. 17, 2014, 6 pages.

Nightingale, Rob, "Time Blocking—The Secret Weapon for Better Focus," available at <<http://www.makeuseof.com/tag/time-blocking-secret-weapon-better-focus/>>, Makeuseof.com, published on Dec. 4, 2014, 6 pages.

Humo, et al., "A Mathematical Model for Classroom-Period Schedule Defragmentation," in Proceedings of the EUROCON International Conference on Computer as a Tool, Sep. 2007, 4 pages.

McKee, Sandy, "Why Employee Engagement Matters and How to Measure It," available at <<https://www.surveygizmo.com/survey-blog/why-employee-engagement-matters-and-how-to-measure-it/>>, Surveygizmo.com, published on Jul. 14, 2015, 11 pages.

Conklin, Jeff, "Wicked Problems & Social Complexity," available at <<http://cognexus.org/wpf/wickedproblems.pdf>>, CogNexus Institute, Oct. 2008, 20 pages.

Fuller, Ryan, "Quantify How Much Time Your Company Wastes," available at <<https://hbr.org/2014/05/quantify-how-much-time-your-company-wastes/>>, in Harvard Business Review, published on May 28, 2014, 4 pages.

Lian, et al., "Clinical Appointment Process," in IEEE Engineering in Medicine and Biology Magazine, vol. 29, Issue 2, Mar. 2010, 8 pages.

Majumdar, et al., "Energy-Aware Meeting Scheduling Algorithms for Smart Buildings," in BuildSys '12, Proceedings of the Fourth ACM Workshop on Embedded Sensing Systems for Energy-Efficiency in Buildings, Nov. 2012, 8 pages.

"Bin packing problem," available at <<https://en.wikipedia.org/wiki/Bin_packing_problem>>, Wikpedia article, accessed on Mar. 22, 2016, 5 pages.

Hardesty, Larry "Social physics," available at <<http://news.mit.edu/2014/social-physics-0304>>, in MIT News, Mar. 4, 2014, 3 pages.

"FindTime: The easiest way to schedule across companies," available at <<https://findtime.microsoft.com/>>, Microsoft Corporation, Redmond, WA, accessed on Mar. 30, 2016, 7 pages.

Johnson, Warren D., "Scheduling New Events while Defragmenting a Calendar Data Structure," U.S. Appl. No. 15/098,337, filed Apr. 14, 2016, 125 pages.

Tollmar et al., "Mobile Health Mashups: Making sense of multiple streams of wellbeing and contextual data for presentation on a mobile device", Proceedings of thr 6th International Conference on Pervasive Computing Technologies for Healthcare (PervasiveHealth) and Workshops, May 21, 2012, pp. 65-72, 8 pages.

(56) References Cited

OTHER PUBLICATIONS

Jalali et al., "Building Health Persona from Personal Data Streams", Proceedings of the 1st ACM International Workshop on Personal Data Meets Distributed Multimedia, Oct. 22, 2013, 8 pages.

Jalali et al., "Personicle: Personal Chronicle of Life Events", Workshop on Personal Data Analytics in the Internet of Things, Sep. 5, 2014, 8 pages.

Fuentes et al., "Trellis Display for Modeling Data from Designed Experiments", Journal of Statistical Analysis and Data Mining, vol. 4, Issue 1, Feb. 2011, pp. 1-13, 13 pages.

McCormick, Rich, "Google Calendar's new Goals will help find you time for self-improvement", Apr. 13, 2016, retrieved at <<http://www.theverge.com/2016/4/13/11419840/google-calendar-goals-ios-android-exercise>>, 3 pages.

"Final Office Action Issued in U.S. Appl. No. 15/098,337", dated Dec. 14, 2018, 54 Pages.

International Search Report and Written Opinion dated Jun. 30, 2017 from PCT Patent Application No. PCT/US2017/026259, 12 pages.

"Non Final Office Action Issued in U.S. Appl. No. 15/098,337", dated Jul. 15, 2019, 43 Pages.

"Final Office Action Issued in U.S. Appl. No. 15/098,337", dated Nov. 22, 2019, 29 Pages.

\* cited by examiner

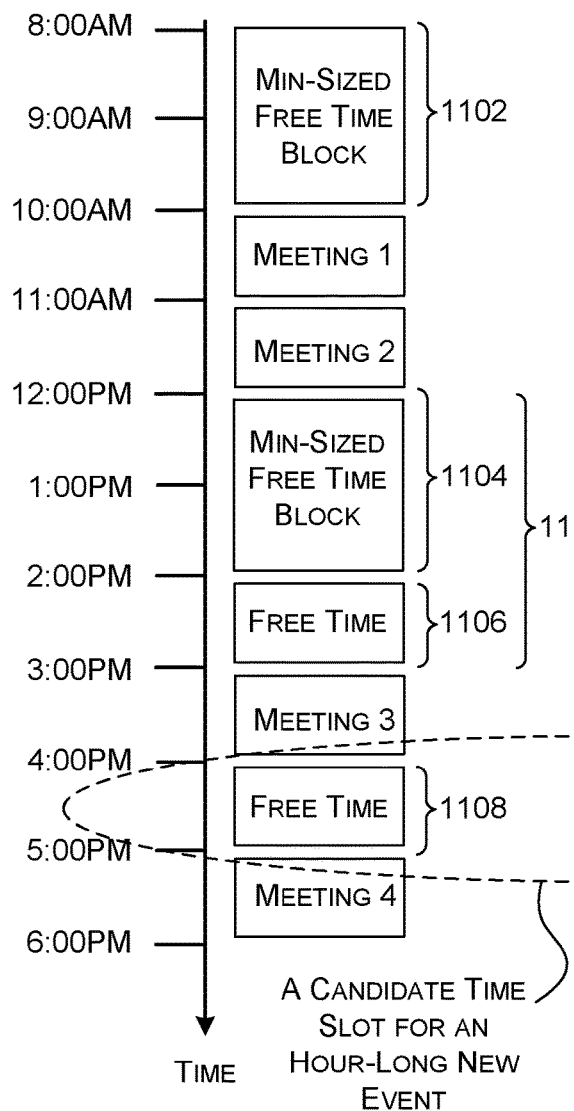
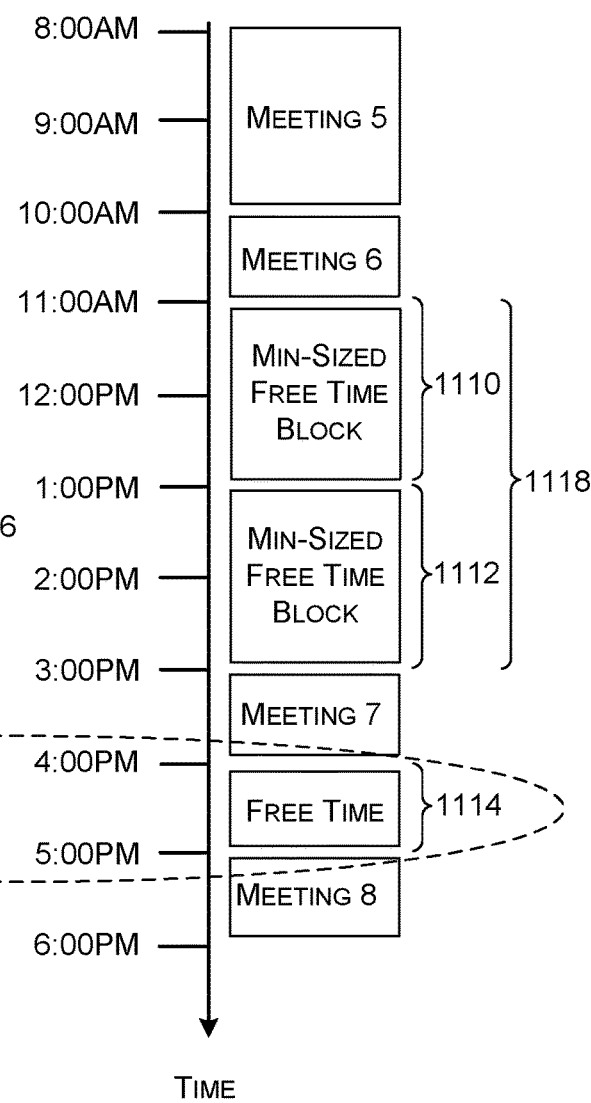
FIG. 11

RESCHEDULING EVENTS TO DEFRAGMENT A CALENDAR DATA STRUCTURE

BACKGROUND

Calendar systems provide a variety of tools that assist end-users in setting up events. For instance, consider the scenario in which an end-user wishes to set up a meeting involving a set of attendees. Some calendar systems can provide a user interface presentation which reveals the available and busy times on each participant's calendar. Some calendar systems may also automatically identify one more time slots for which all participants are free to attend the event. These tools, however, have a narrow scope of applicability; they focus on the limited task of setting up each individual meeting. Further, these tools perform each scheduling operation in an isolated manner, apart from other scheduling operations.

SUMMARY

A computer-implemented technique is described herein for rescheduling events within calendars to achieve a target objective with respect to target occurrences of a particular kind in the calendars. For instance, the target occurrences may correspond to instances of free time, and the technique achieves the target objective by increasing the amount of minimum-sized free-time blocks within the calendars, e.g., by e.g., by favoring the introduction of large free-time blocks of at least minimum size (e.g., two-hour blocks), and disfavoring the presence of smaller-sized free-time blocks scattered amongst events.

For example, consider an organization setting involving a plurality of members. The members maintain a plurality of calendars. The calendars collectively constitute a data structure. The computer-implemented technique rearranges the events in the data structure in such a manner that the data structure as a whole exhibits a reduced level of fragmentation of free time, relative to an initial level of fragmentation of free time. At the same time, the computer-implemented technique honors (when possible) participant-related constraints associated with the events. Further, the computer-implemented technique penalizes modification of an event as a function of a temporal distance over which the event is moved; this weighting operation has the effect of reducing disruption to the scheduled events in the calendars.

The computer-implemented technique offers various benefits. Consider the above-noted free-time-related context. From an organization-wide perspective, the computer-implemented technique increases the amount of large free-time blocks of minimum size. This result, in turn, may improve the productivity of the members of an organization. From a user-experience standpoint, the computer-implemented technique allows end-users to automatically and efficiently achieve organization-wide calendar-related objectives. For instance, the technique satisfies the organization-wide objectives without the need for ad hoc manual analysis of individual calendars, and without complex and extensive computer-implemented negotiation among the organization's end-users. From a system-related standpoint, the computer-implemented technique makes efficient use of computing resources. This is because, by virtue of its elimination of ad hoc analysis and complex interaction among end-users, it also eliminates the computing resources that would otherwise be required to conduct those tasks.

The above technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 11 shows excerpts of the calendars of two respective end-users, for a particular day.

Figure 1:
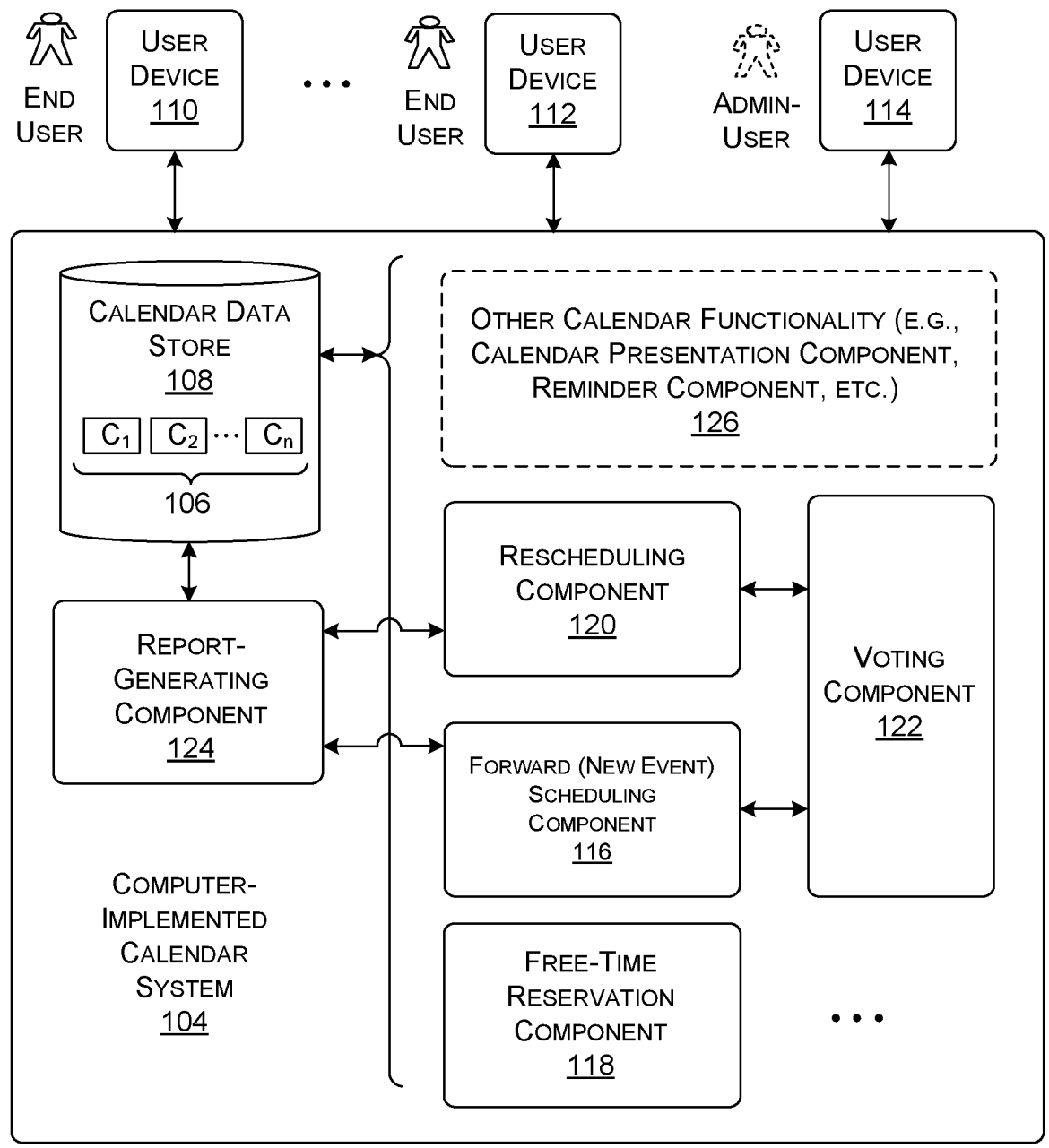
FIG. 1 shows an environment that includes a calendar system. In one use scenario, the calendar system promotes the creation of minimum-sized blocks of free time in calendars.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A provides an overview of a computer-implemented calendar system for managing calendars in a manner that achieves some target objective, such as the creation and preservation of free time of a particular type in the calendars. In one implementation, the calendar system includes a forward scheduling component (described in Section B), a free-time reservation component (described in Section C), a rescheduling component (described in Section D), a voting component (described in Section E), and a report-generating component (described in Section F). Section G describes alternative uses of the computer-implemented calendar system, e.g., beyond the creation and preservation of free time. Section H describes illustrative computing functionality that can be used to implement any aspect of the features described in Sections A-G.

As a preliminary matter, some of the figures describe concepts in the context of one or more structural components, also referred to as functionality, modules, features, elements, etc. In one implementation, the various components shown in the figures can be implemented by software running on computer equipment, or hardware (e.g., chip-implemented logic functionality), etc., or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. Section H provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts can be implemented by software running on computer equipment, or hardware (e.g., chip-implemented logic functionality), etc., or any combination thereof.

As to terminology, the phrase "configured to" encompasses various physical and tangible mechanisms for performing an identified operation. The mechanisms can be configured to perform an operation using, for instance, software running on computer equipment, hardware (e.g., chip-implemented logic functionality), etc., or any combination thereof.

The term "logic" encompasses various physical and tangible mechanisms for performing a task. For instance, each operation illustrated in the flowcharts corresponds to a logic component for performing that operation. An operation can be performed using, for instance, software running on computer equipment, hardware (e.g., chip-implemented logic functionality), etc., or any combination thereof. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific terms "computer-readable storage medium" and "computer-readable storage medium device" expressly exclude propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Overview of the Calendar System

FIG. 1 shows a logical depiction of an environment 102 that includes a computer-implemented calendar system 104. The calendar system 104 maintains a plurality of calendars 106 in a data store 108. Each calendar is associated with a respective end-user. Each calendar stores event information that describes a plurality of scheduled events. Collectively, all of the calendars constitute a calendar data structure, or just "data structure" for brevity.

Figure 3:
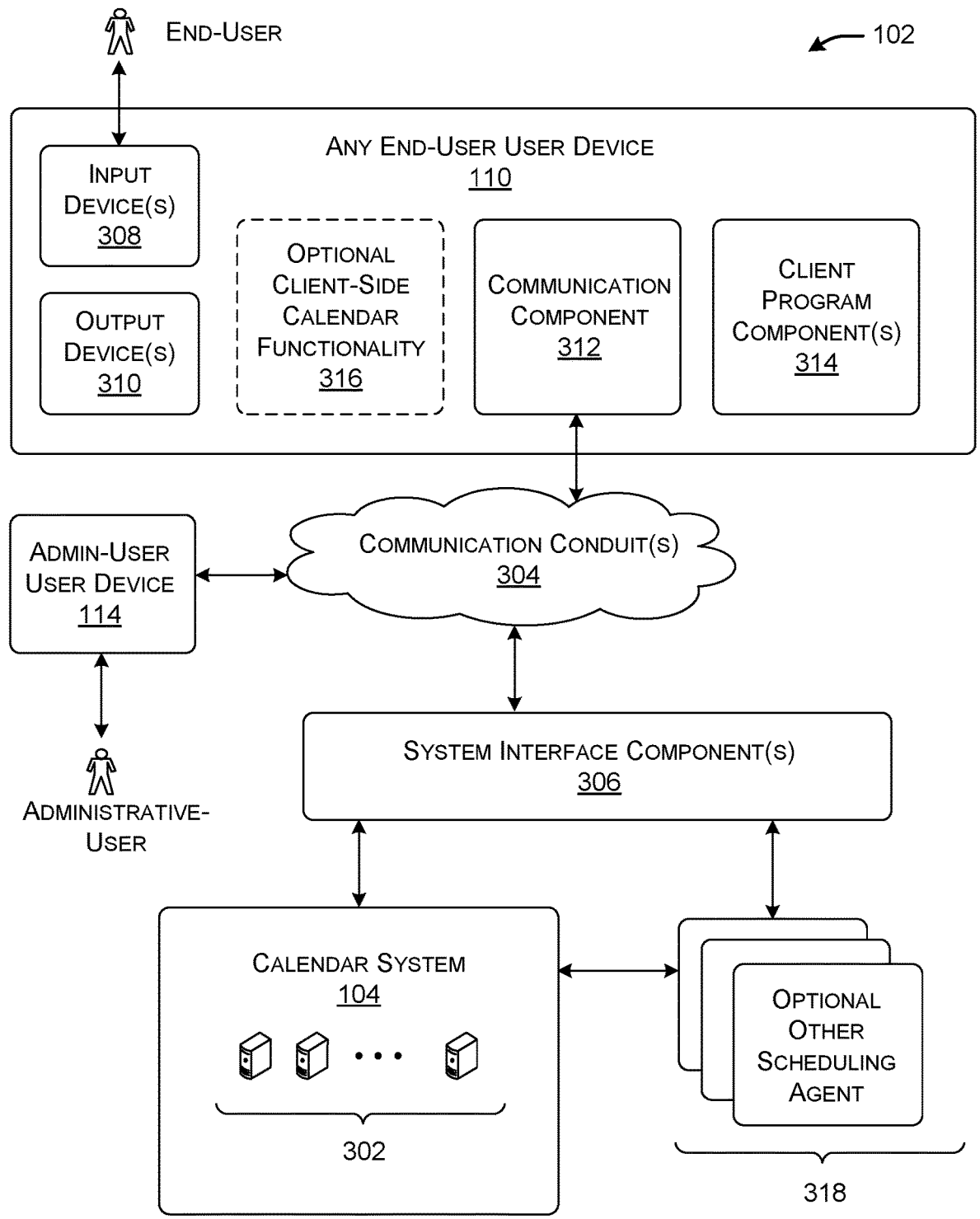
FIG. 3 shows one implementation of the overall environment of FIG. 1.
Figure 4:
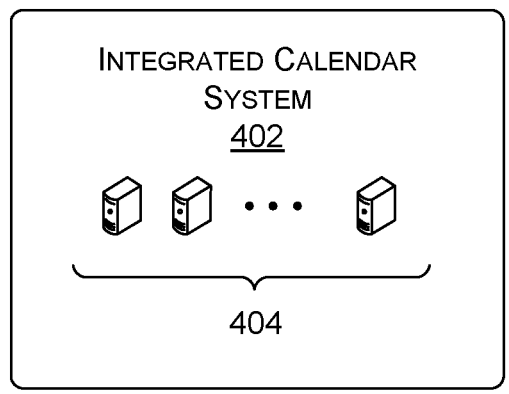
FIGS. 4 and 5 show two respective implementations of the calendar system of FIG. 1.
Figure 5:
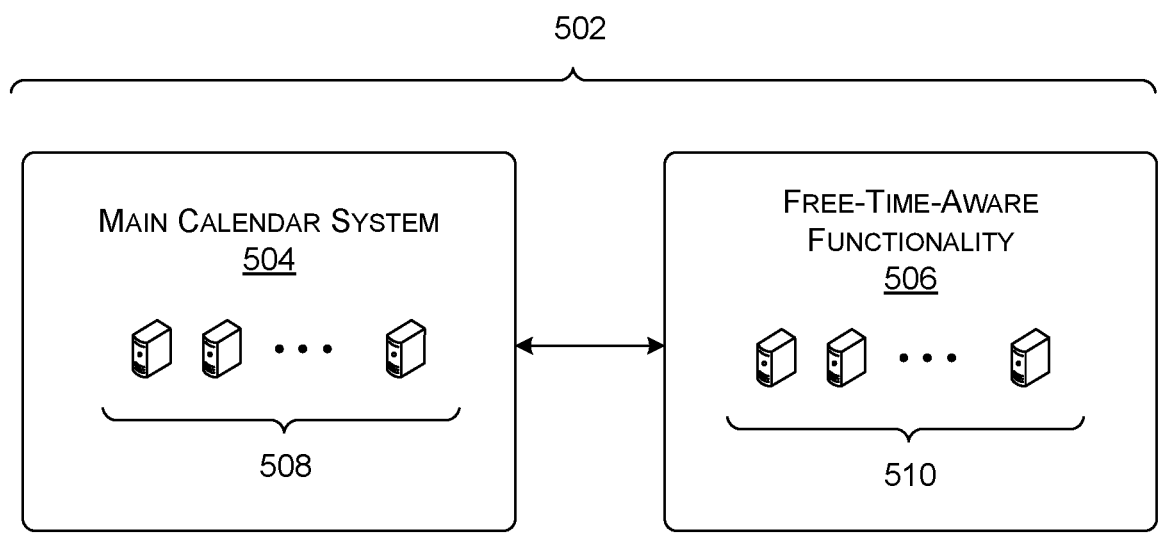

End-users may interact with the calendar system 104 via a plurality of respective user devices, such as user device 110 and user device 112. One or more administrative-users may also interact with the calendar system 104 via respective user devices, such as user device 114. A general reference to a "user," without a preceding qualifier, refers to either an end-user or an administrative-user, or some other individual. FIGS. 3-5 provide information regarding various physical implementations of the calendar system 104 and the user devices (110, 112, 114).

In one use scenario, the environment 102 pertains to an organizational setting. Here, the end-users correspond to members of an organization. Other end-users may correspond to external entities (e.g., vendors, etc.) who interact with the calendar system 104. Within an organizational setting, a calendar may primarily store event information that describes a plurality of meetings and other organization-related activities.

As used herein, an "organization" refers to any collection of individuals having any affiliation. For instance, an organization may refer to a company, government agency, educational institution, club, nonprofit entity, etc. Or an organization may refer to an informal group of people, such as a group of social contacts. An organization can have any scope. In a company setting, it may refer to the entire company or only part thereof, such as a division or work unit within the company. The phrase "a plurality of calendars" means all of the calendars in some use scenarios, or any subset of the calendars in that use scenario.

The calendar system includes (or can be conceptualized as including) various components that perform different respective roles. A forward scheduling component 116 schedules new events, e.g., by identifying proposed time slots for new events to be added to the calendars 106. Section B provides further information regarding the forward scheduling component 116. A free-time reservation component 118 adds free-time blocks (defined below) having a prescribed minimum size (e.g., two hours) to the calendars 106. Section C provides further information regarding the free-time reservation component 118. A rescheduling component 120 rearranges the temporal placement of at least some already-scheduled events in the calendars 106. Section D provides further information regarding the rescheduling component 120. A voting component 122 allows end-users to vote on candidate-comprise time slots associated with events. Section E provides further information regarding the voting component 122. A report-generating component 124 provides report information to administrative-users and/or end-users that describes the operation of the calendar system 104. Section F provides further information regarding the report-generating component 124. The calendar system 104 also provides additional calendar functionality 126 that is not specifically the focus of this disclosure, including functionality for displaying individual calendars, functionality for providing reminders to end-users, and so on.

From a high-level perspective, the calendar system 104 provides services that allow an organization to structure events in the calendars 106 to meet a target objective. The target objective is defined as a function of certain calendar occurrences of a particular kind (or kinds), as measured across a plurality of the calendars. For instance, in the prominent example set forth herein, the occurrences of a particular kind correspond to instances of free time in the calendars. As used herein, "free time" refers a span of time in which an end-user has no scheduled commitments. In an organizational setting, for example, free time refers to a span of time for which the end-user has no scheduled meetings or other fixed organizational commitments. An end-user may use the free time for any purpose that he or she deems appropriate. In an organizational setting, for instance, an end-user may use a block of free-time to perform creative tasks that demand a high level of concentration.

More specifically, a calendar can be said to include free time on a particular day in either a negative or positive sense, or a mix thereof. In the negative sense, a day includes a span of free time when the calendar shows no scheduled events within that span. In the positive sense, a day includes a span of free time when it includes a particular event that is specifically earmarked as "free time." The calendar owner and others in the organization are alerted to the purpose of a "free time" block by virtue of the descriptive label assigned thereto.

This disclosure also makes a distinction between two types of free time. As a first category, "quality" or promoted free time refers to any span of free time that extends at least as long as a prescribed minimum-sized free-time block. In the non-limiting examples presented herein, the minimum-sized block has a length of two hours (although other implementations can use other sizes of minimum-sized blocks). For example, a free-time instance having an uninterrupted span of two and one-half hours constitutes an instance of quality free time (because it extends longer than two hours). A free-time instance having an uninterrupted span of four and one-half hours also constitutes an instance of quality free time; here, the instance of free time is composed of two minimum-sized blocks of free time, and one-half hour of remaining free time. An instance of non-quality free time refers to any instance of free time that is shorter than the minimum-sized block of free time. For example, an instance of free time having a length of 45 minutes, which is placed between meetings on a calendar, constitutes an example of non-quality free time.

The plurality of calendars, constituting a data structure, exhibits a level of fragmentation with respect to instances (occurrences) of free time at any given time. Different implementations can define fragmentation in different ways. In one case, the level of fragmentation of a data structure refers to a percentage of the amount of non-quality free time in the calendars relative to a total amount of free time. In another case, the level of fragmentation can be measured as a percentage of workdays that lack at least one minimum-sized free-time block, relative to a total number of workdays, etc.

Different organizations can adopt different target objectives with respect to the amount of quality free time in the calendars 106. For example, an organization may attempt to achieve an ideal state in which each calendar (or each calendar of a certain class of calendars) includes at least one free-time block on each workday. In other cases, an organization may attempt to achieve a state in which a certain percentage of calendars include at least one free-time block on each work day. In other cases, an organization may attempt to achieve similar goals to those stated above, but with respect to another unit of time besides a day, such as a week, or a month, etc. In other cases, an organization may attempt to achieve a state in which the data structure exhibits no more than a prescribed target level of fragmentation with respect to free time (where fragmentation is defined above). Generally, in all such cases, the target objective is defined with respect to the data structure as a whole, which represents all of the calendars 106 of all of the end-users, or some portion thereof.

Given the above free-time-related context, the functions of the various components of the calendar system 104 can be summarized more precisely below. The forward scheduling component 116 schedules new events with two objectives in mind. Consider a specific case in which a meeting leader seeks to arrange a meeting for a group of N participants (attendees). As a first objective, the forward scheduling component 116 generates a proposed time slot for the meeting which satisfies all participant-related constraints associated with the meeting. The participant-related constraints describe, for instance, a desired timeframe for an event to be scheduled, the number (and identity) of participants of the new event, the duration of the new event, etc. As a second objective, the forward scheduling component 116 generates the proposed time slot such that it maximizes the amount of quality free time in the participants' calendars. Section B provides additional details regarding different ways that this second objective can be formulated; in one case, the forward scheduling component 116 chooses a day for the meeting that maximizes the number of minimum-sized free-time blocks across the participants' calendars.

The free-time reservation component 118 proactively and independently adds free-time blocks (of minimum size) to the calendars. The free-time reservation component 118 can also add a descriptive label to each such block, which identifies it as free time, informing both the calendar owner and other end-users of the intended purpose of the block.

The rescheduling component 120 reschedules a plurality of already-scheduled events in a plurality of calendars. Like the case of the forward scheduling component 116, the rescheduling component 120 serves two objectives. As a first objective, the rescheduling component 120 reschedules each individual event such that the participant-related constraints associated with that event continue to be honored (when possible). As a second objective, with respect to the rescheduling operation as a whole, the rescheduling component 120 attempts to increase the amount of quality free time in the calendars 106, e.g., by increasing the number of desired free-time blocks of minimum size within the calendars 106, while reducing the amount of smaller-sized (non-quality) spans of free time scattered among events. In other words, overall, the rescheduling component 120 attempts to decrease the level of fragmentation in the data structure relative to a current level of fragmentation of the data structure.

The voting component 122 provides a mechanism for end users to resolve deadlock conditions in which the forward scheduling component 116 or the rescheduling component 120 cannot automatically find a proposed time slot for an event. For example, the forward scheduling component 116 can conclude that there are no time slots which satisfy the above-described the participant-related constraints and the free-time objective. To resolve this situation, the voting component 122 can generate a set of candidate-compromise time slots. Each participant (associated with the event) can vote on the desirability of the candidate-compromise time slots. The voting component 122 can then choose the candidate-compromise time slot that has the greatest number of votes for the event under consideration.

The report-generating component 124 generates reports which convey an organization's progress toward its free-time objective (in whatever manner it is defined). For example, the report-generating component 124 can provide a report that describes the amount of free-time blocks or fragmentation level in the data structure as a function of time, or at a particular instance of time. The report-generating component 124 can create such a report with respect to any scope, such as the organization as a whole, a division of the organization, or a specific group of individuals within the organization.

An administrative-user can also interact with the calendar system 104 to perform a trial run of rescheduling, governed by administrator-specified setup information. That is, an administrative-user can interact with the rescheduling component 120 to reschedule events in a group of calendars, but without actually making changes to the calendars. The report-generating component 124 can then generate a report which reveals the outcome of such a trial run. The administrative-user may then decide to instruct the rescheduling component 120 to repeat the rescheduling operation, but this time making actual changes to the calendars. Or the administrative-user can instruct the rescheduling component 120 to perform another trial run with a different set of setup conditions. Through the above procedure, the administrative-user can perform ad hoc what-if analysis prior to actually restructuring any calendars.

As a final note with respect to FIG. 1, note that the calendar system 104 can be applied to achieve other target objectives, including target objectives that are defined with respect to other kinds of calendar occurrences (e.g., besides instances of free time). Section G (below) cites illustrative alternative applications. However, to facilitate explanation, the remainder of this section and Sections A-F will continue to emphasize the representative case in which the calendar system 104 is applied towards the goal of defragmenting a calendar data structure with respect to occurrences of free time.

Figure 2:
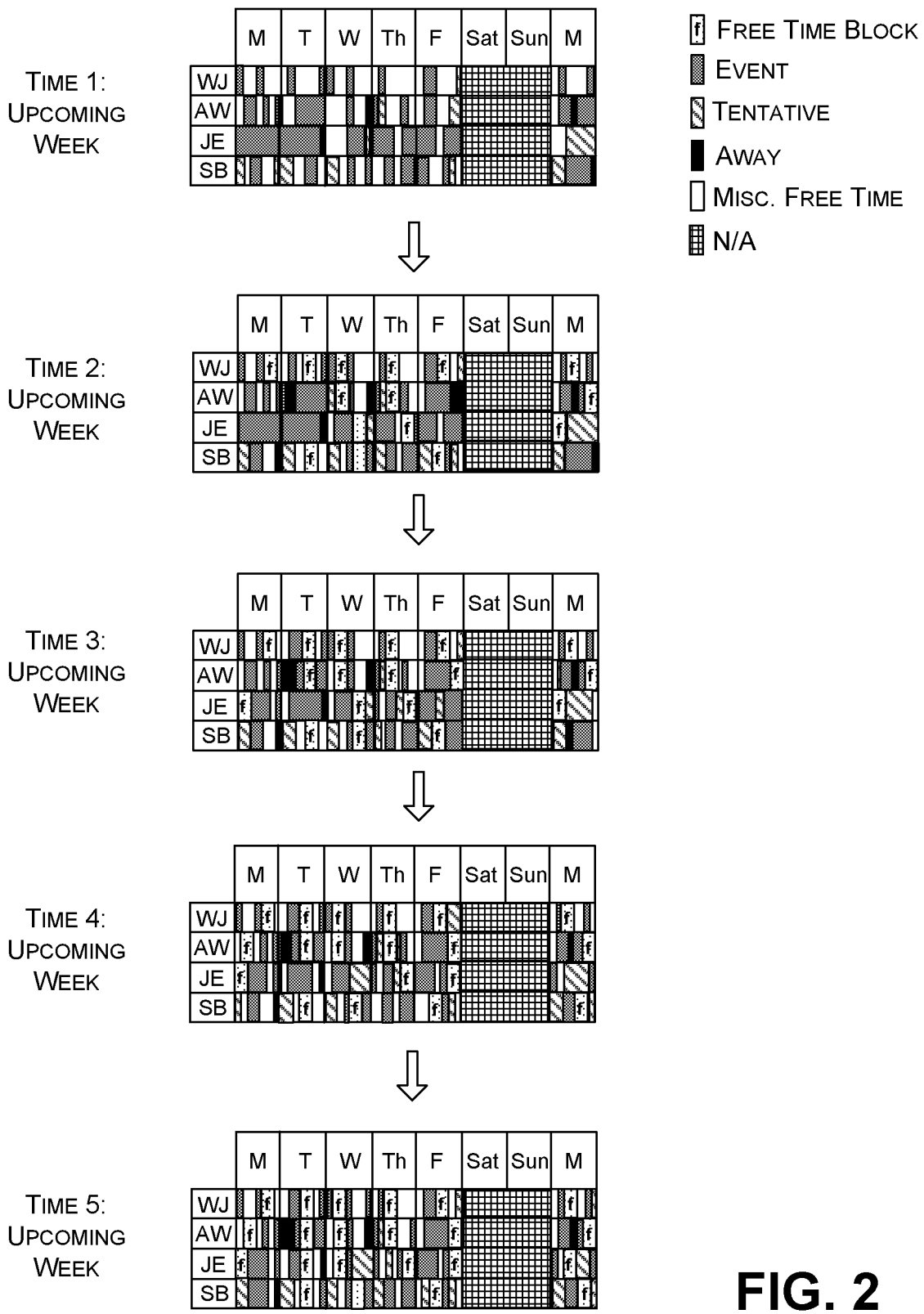
FIG. 2 shows changes that the calendar system (of FIG. 1) produces to a set of calendars, at different respective junctures of time.

FIG. 2 shows output results generated by the forward scheduling component 116 at five respective instances of time (time 1, time 2, time 3, time 4, and time 5), for the case in which the target objective involves defragmenting the data structure with respect to free time. For example, the instances of time can correspond to successive weeks in a calendar year. For each instance of time, FIG. 2 shows four calendars of four respective end-users (having initials W J, A W, J E, and S B).

Assume that "time 1" marks an instance of time when the organization first begins to apply the forward scheduling component 116. Thereafter, upon each new event that is scheduled, the forward scheduling component 116 generates a proposed time slot for the new event that: (a) meets participant-related constraints; and (b) satisfies a free-time objective, as measured across all of the calendars of the participants of the event. Hence, upon each use, the forward scheduling component 116 preserves and protects minimum-sized free-time blocks on all (or some) of the participants' calendars.

Overall, FIG. 2 shows that the forward scheduling component 116 gradually increases the number of free-time blocks in the four calendars. That is, the calendars for "time 3" have more free-time blocks compared to the calendars for "time 2," and so on. Moreover, FIG. 2 shows that, as time progresses, the forward scheduling component 116 begins to place at least some of the free-time blocks within the same time slots across the four calendars. For example, by "time 5," note that all four end-users have a free-time block at the same time on Tuesday. Section B describes mechanisms by which the forward scheduling component 116 can achieve clustering of free-time blocks across calendars.

The forward scheduling component 116 also has the effect of reducing the presence of stray smaller-sized free-time blocks within the calendars. In other words, the four calendars can be viewed as constituting a data structure that provides event information. The free-time reservation component 118 can be said to gradually defragment the free time in that data structure, e.g., by promoting the introduction of large minimum-sized free-time blocks (corresponding to quality free time), and reducing the presence of smaller-sized free-time blocks (corresponding to non-quality free time).

The rescheduling component 120 can produce similar effects to that shown in FIG. 2. But the rescheduling component 120 operates by rearranging at least some already-scheduled events, rather than successively handling new events. In one manner of operation, the rescheduling component 120 operates by ordering a collection of events to be rescheduled, and then rescheduling those events one-by-one using the same logic applied by the forward scheduling component 116. In addition, the rescheduling component 120 can discount any proposed time slot as a function of the temporal distance over which it is moved (relative to its original placement in a calendar). For instance, consider an original time slot for an event that occurs on a particular day of the week. A proposed new time slot that occurs later in the same day would be discounted less than a proposed new time slot that occurs later in the week.

The calendar system 104 confers various benefits. Consider the above-described example in which the target objective is defined as a function of instances of free time in the calendar data structure. From an organizational perspective, the calendar system 104 increases the amount of large free-time blocks of minimum size. This result, in turn, may improve the productivity of the members of an organization, e.g., by providing sufficient time for the members to focus on creative tasks.

From a user-experience standpoint, the calendar system 104 allows end-users to automatically, quickly and efficiently achieve organization-wide calendar-related objectives. In the examples emphasized herein, the organization-wide objective constitutes the creation of quality free time across the calendars of the organization. The calendar system 104 can be considered efficient insofar as it does not demand complex and cumbersome manual analysis of individual calendars. The calendar system 104 further eliminates the need for complex computer-implemented interaction among end-users, and the input actions associated therewith. Indeed, in the case of the forward scheduling component 116, the end-users may not even be aware that the calendar system 104 is automatically taking into account an organization-wide objective.

From a system-related standpoint, the calendar system 104 makes efficient use of computing resources. This is because, by virtue of its elimination of complex computer-implemented interaction among end-users, the calendar system 104 eliminates the computing resources that would otherwise be required to conduct that interaction. Such resources include processing resources, memory resources, communication resources, etc. For example, by eliminating the need for manual ad hoc analysis of individual calendars, the calendar system 104 eliminates the computing resources that would go into displaying and manipulating individual calendars. By eliminating the need for complex interaction among end-users, the calendar system 104 eliminates the computing and communication resources that would go into exchanging message among end-users, and so on.

FIG. 3 shows one implementation of the overall environment 102 of FIG. 1. In this example, the calendar system 104 is implemented by one or more server computing devices 302. The illustrative end-user device 110 corresponds to any computing apparatus, such as, but not limited to: a desktop personal computing device, a laptop computing device, a game console device, a set-top box device, a tablet-type computing device, a smartphone, and so on. The illustrative administrative-user user device 114 may be similarly constituted.

Any user device may interact with the calendar system 104 via one or more communication conduits 304, such as a wide area computer network, a local area computer network, one or more point-to-point links, or any combination thereof. The communication conduit(s) 304 may be governed by any protocol or combination of protocols. One or more system interface components 306 process messages flowing between any user device and the calendar system 104. The system interface component(s) 306 can correspond to any combination of firewall functionality, user authentication functionality, routing functionality, etc.

FIG. 3 also shows an illustrative implementation of the representative user device 110. The user device 110 includes one or more input devices 308, such as, but not limited to: a keyboard device, a mouse input device, a touchscreen input device, a digitizing pad, one or more video cameras, one or more depth cameras, one or more microphones, a voice recognition mechanism, any movement detection mechanisms (e.g., accelerometers, gyroscopes, magnetometers, etc.), and so on. The user device 110 also includes one or more output devices 310, such as, but not limited to: a display device, a printer, a haptic output mechanism, an archival mechanism (for storing output information), and so on. The user device 110 also includes a communication component 312 for interacting with the communication conduit(s) 304, such as a network card. The user device 110 also includes one or more client-side program components (applications) 314 for performing various respective tasks.

In one implementation, the environment 102 implements all calendar-related functions using the server-side calendar system 104. The user device 110 may interact with the sever-side calendar system 104 using a browser program component. In a second implementation, the user device 110 includes optional client-side calendar functionality 316. Here, the environment 102 implements the calendar-related functions using calendar-related functionality that is distributed between the server-side calendar system 104 and each user device. For example, each user device can implement a separate instance of the forward scheduling component 116 and the rescheduling component 120, while the server-side calendar system 104 provides the calendar data store 108. However, to facilitate explanation, it will henceforth be assumed that the server-side calendar system 104 implements all calendar-related functions (although the principles described herein are not limited to this implementation). Reference to the "calendar system" generally encompasses (at least) any of the implementations described above, including the distributed implementation.

Finally, FIG. 3 indicates that the environment 102 may include one or more optional other scheduling agents 318, which can be considered part of the calendar system 104 itself or components apart from the calendar system 104. For example, one scheduling agent can interact with voice recognition functionality to interpret free-form utterances made by an end-user or plural end-users. When an end-user makes an utterance that indicates that the end-user wishes to set up an event, the scheduling agent invokes the calendar system 104 to set up the event. That scheduling agent can interpret the end-user's utterance using a set of rules (e.g., where each rule is triggered by keywords in the end-user's utterance), and/or using a machine-learned model.

FIGS. 4 and 5 show two respective implementations of the calendar system 104 of FIG. 1. In the case of FIG. 4, a single integrated server-side system 402 implements the calendar system 104. The single integrated server-side system 402 implements the functions of the calendar system 104 using a set of server computing devices 404, with or without client-side functionality provided by end-user user devices.

In the case of FIG. 5, a server-side system 502 integrates a preexisting calendar system 504 with a supplemental calendar system 506. The preexisting calendar system 504 includes a set of server computing devices 508, while the supplemental calendar system 506 includes a set of server computing devices 510. The preexisting calendar system 504 handles core calendar-related functions, such as setting up meetings, displaying individual calendars, providing reminders, etc. For example, the preexisting calendar system 504 provides the "other calendar functionality" illustrated in FIG. 1. Further, the preexisting calendar system 504 provides the calendar data store 108. But the preexisting calendar system 504 does not handle any of the free-time-aware features summarized above. In contrast, the supplemental calendar system 506 handles the free-time-aware features, such as the forward scheduling component 116, the free-time reservation component 118, the rescheduling component 120, the voting component 122, and the report-generating component shown in FIG. 1. The implementation of FIG. 5 generally accommodates the extension of existing calendar functionality to encompass the free-time-aware features described herein.

B. Forward Scheduling Component

Figure 6:
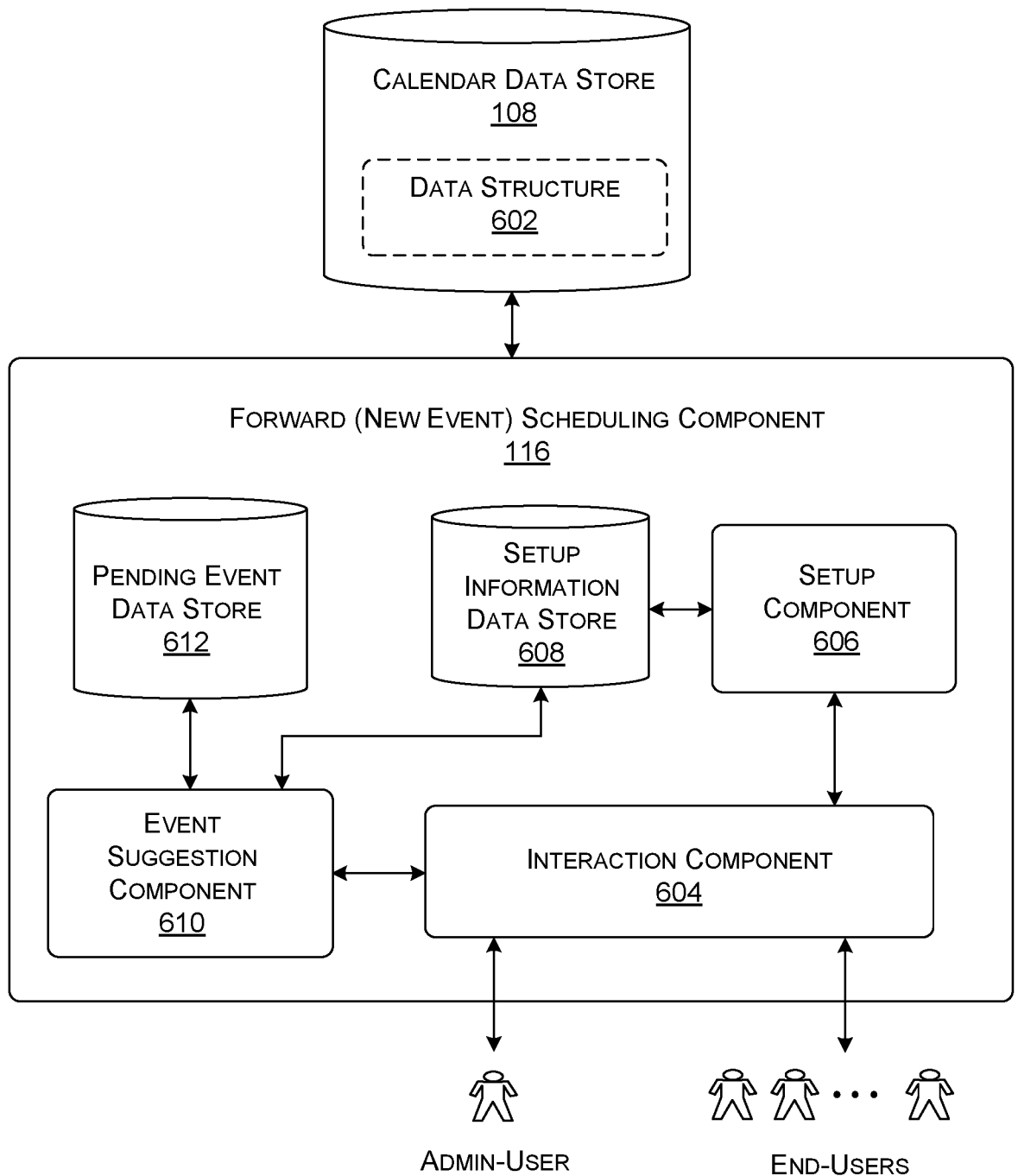
FIG. 6 shows one implementation of a forward scheduling component, which is a component of the calendar system of FIG. 1. The forward scheduling component schedules new events in calendars.

FIG. 6 shows one implementation of the forward scheduling component 116. As described in Section A, the forward scheduling component 116 schedules new events, at the prompting of end-users (and/or administrative-users) who provide instructions to set up the events. In doing so, the forward scheduling component 116 also attempts to satisfy a free-time objective (to be described below). The forward scheduling component interacts with a plurality of calendars stored in the calendar data store 108. The calendars collectively constitute a data structure 602.

The forward scheduling component 116 includes an interaction component 604 through which any user can interact with the forward scheduling component 116. For instance, the interaction component 604 provides one or more user interface presentations (described below) through which an end-user may enter input information to the forward scheduling component 116, such as participant-related constraints pertaining to a new event to be set up. The interaction component 604 also provides one or more user interface presentations (to be described below) that provide the output results generated by the forward scheduling component 116, such as event information pertaining to a proposed time slot selected by the forward scheduling component 116.

A setup component 606 receives setup information from an administrative-user (or an end-user), via the interaction component 604. The setup component 606 stores the setup information in a setup information data store 608. The setup information describes setup conditions (to be described below) which govern the manner in which the forward scheduling component 116 performs its tasks.

An event suggestion component 610 generates a proposed time slot for a new event that satisfies the participant-related constraints associated with the new event and the free-time objective. The event suggestion component 610 stores event information which defines the proposed time slot in a pending event data store 612. Upon approval of the proposed time slot by the event's participants, the event suggestion component 610 can formally add the new event to the calendar data store 108. The new event is "placed" on the participants' calendars at the time slot suggested by the forward scheduling component 116, as approved by the participants.

Figure 7:
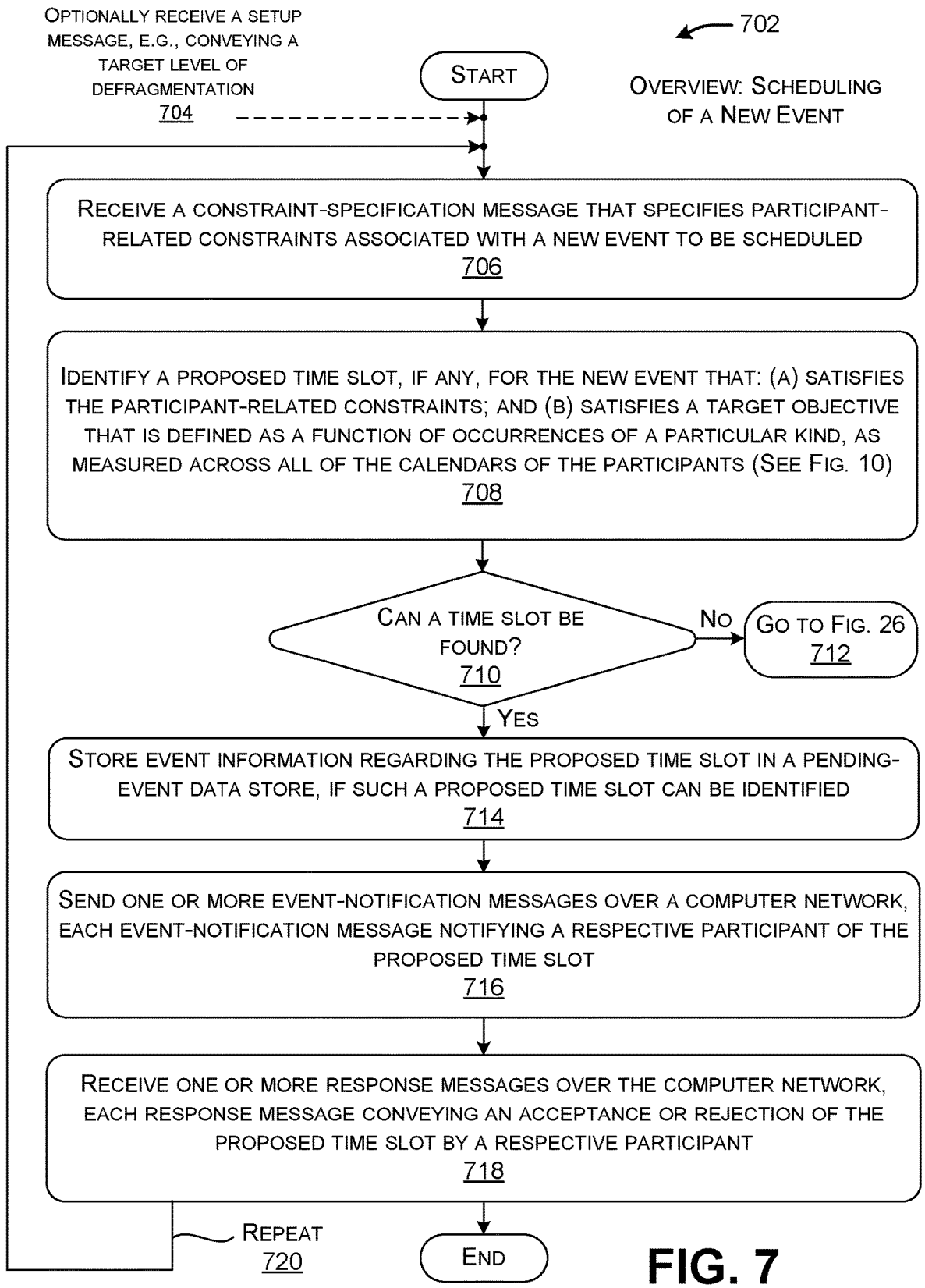
FIG. 7 shows a process that describes one manner of operation of the forward scheduling component of FIG. 6.

FIG. 7 shows a process 702 that describes one manner of operation of the forward scheduling component 116 of FIG. 6 with respect to the scheduling of at least one new event. Assume that the new event involves a set of N participants, and that the calendar data store 108 stores a calendar for each respective participant. To repeat, the calendars for all members of an organization (of which the N participants are members) can be considered a data structure 602.

In preliminary block 704, the forward scheduling component 116 optionally receives setup information from any user, such as an administrative-user. The setup information governs the manner in which the forward scheduling component 116 performs its tasks.

In block 706, the forward scheduling component 116 receives a constraint-specification message that specifies participant-related constraints associated with the new event to be scheduled. The participant-related constraints describe, for instance, a desired timeframe for the event to be scheduled, the number (and identity) of participants of the new event, the duration of the new event, a preferred location (or locations) associated with the new event, etc. In specifying a desired timeframe, an end-user or administrative-user (who is setting up the event) may indicate a preferred time span in which the event is to occur.

In block 708, the forward scheduling component 116 uses a computer-implemented process to identify a proposed time slot, if any, for the new event that: (a) satisfies the participant-related constraints; and (b) satisfies a target objective (e.g., a free-time objective) that is defined as a function of occurrences of a particular kind ("target occurrences"), as measured across all of the calendars of the participants (e.g., occurrences of free time of a particular type, as measured across all of the calendars of the participants). One way of implementing this operation is set forth in greater detail below with reference to FIG. 10.

In block 710, the forward scheduling component 116 determines whether a satisfactory time slot can be found that satisfies both constraints (a) and (b), defined above. If not, then, in block 712, the forward scheduling component 116 can optionally transfer control to the voting component 122. As described later with reference to FIG. 26, the voting component 122 then allows the participants to negotiate an acceptable time slot for the new event.

Assume that an acceptable proposed time slot is found. Then, in block 714, the forward scheduling component 116 stores event information regarding the proposed time slot in the pending-event data store 612. In block 716, the forward scheduling component 116 sends one or more event-notification messages over a computer network (e.g., corresponding to communication conduit(s) 304 shown in FIG. 3), each event-notification message notifying a respective participant of the proposed time slot. In block 718, the forward scheduling component 116 receives one or more response messages over the computer network, each response message conveying an acceptance or rejection of the proposed time slot by a respective participant. If all participants accept the proposed time slot (or if any other environment-specific threshold condition is satisfied), then the forward scheduling component 116 can add event information pertaining to the new event to the participants' calendars in the calendar data store 108.

Operation 720 indicates that the forward scheduling component 116 repeats the above-described process 702 with respect to plural new events, and with respect to plural sets of associated participants. As explained with reference to FIG. 2, over time, the forward scheduling component 116 operates to defragment free time expressed in the data structure 602, e.g., by promoting the presence of minimum-sized free-time blocks and reducing the occurrence of smaller-sized free time blocks.

Figure 8:
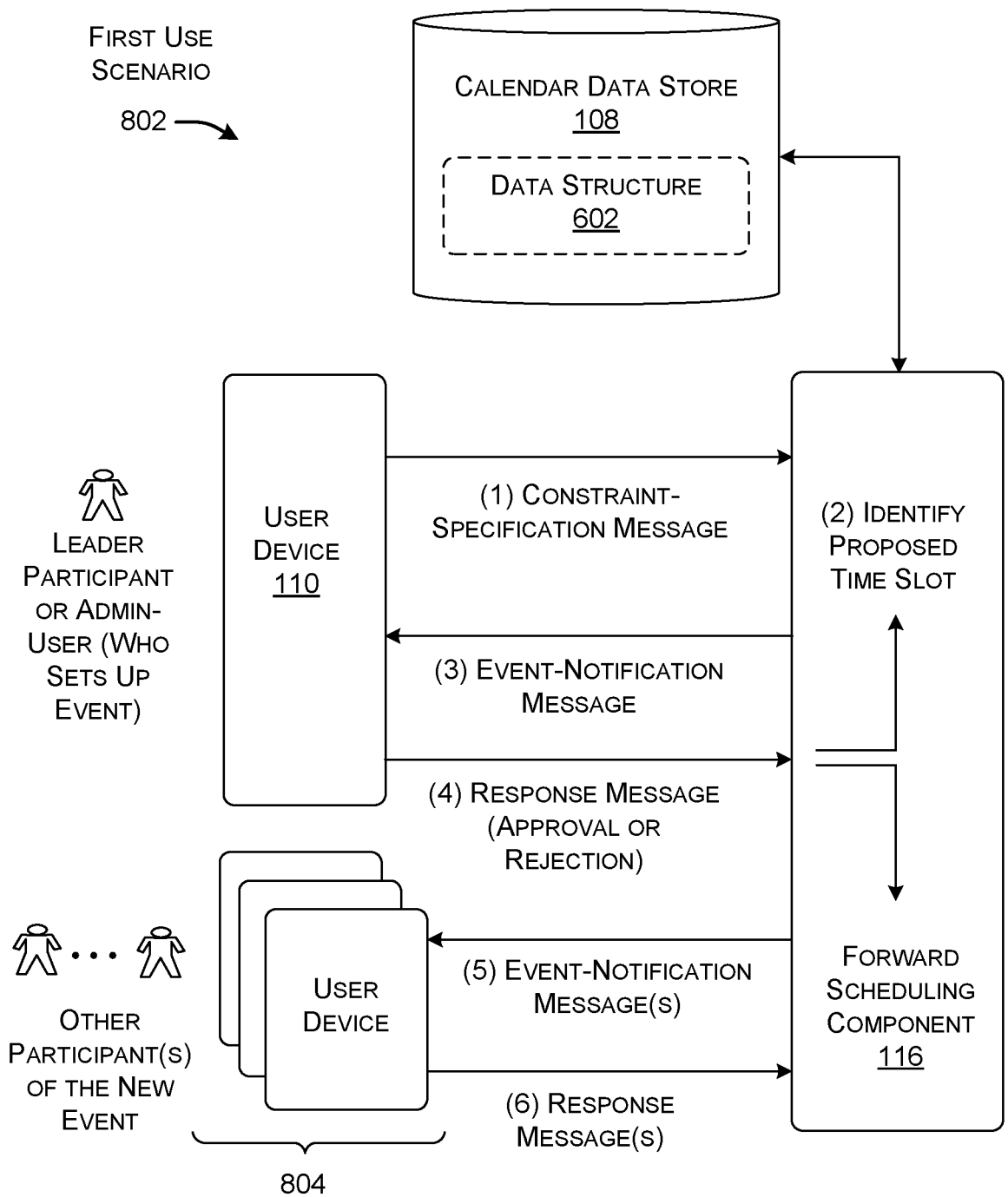
FIGS. 8 and 9 show two use scenarios of the forward scheduling component of FIG. 6.
Figure 9:
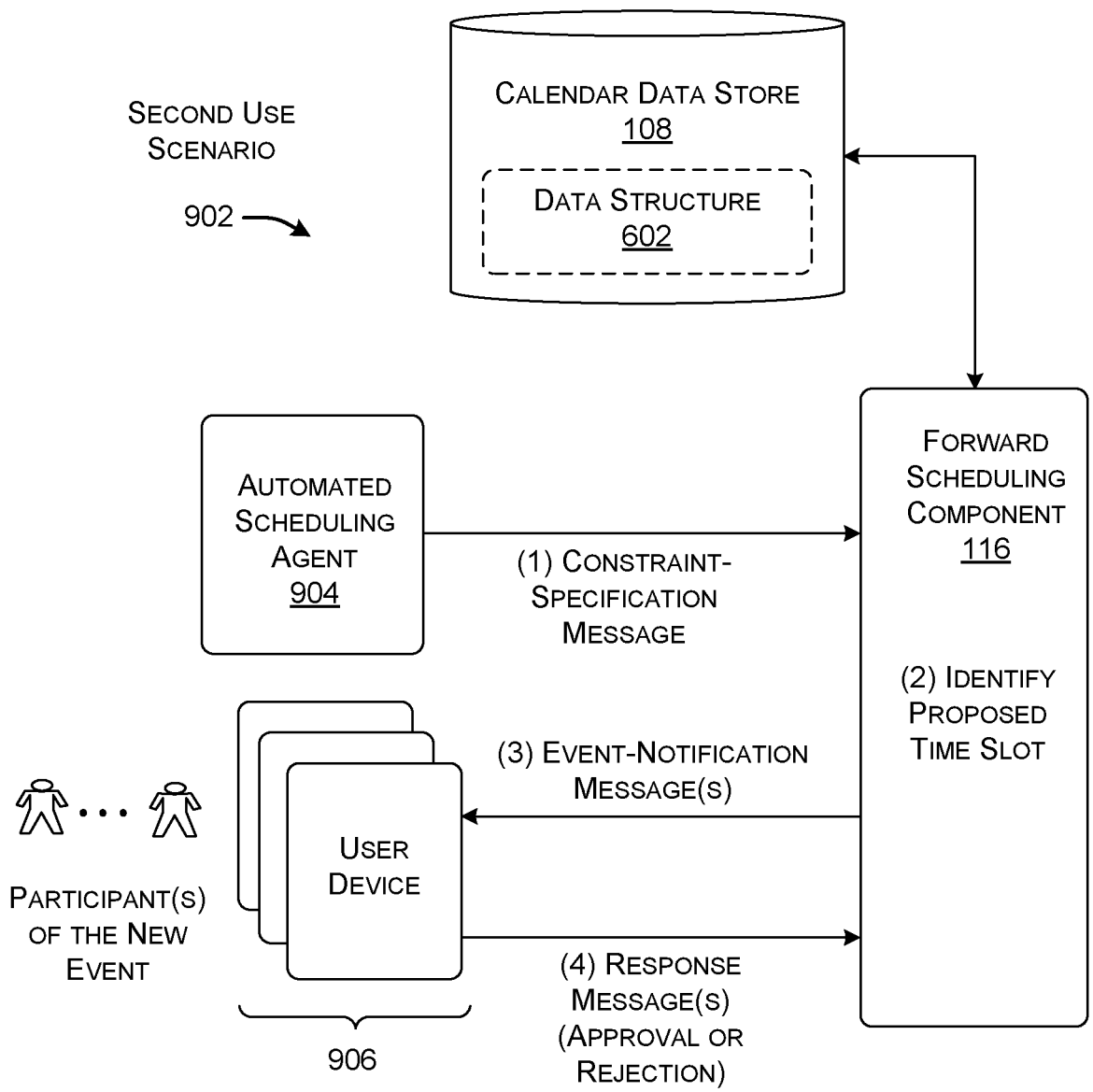

FIGS. 8 and 9 show two use scenarios of the forward scheduling component of FIG. 6. Starting with the first use scenario 802 of FIG. 8, one of the participants of a new event or an administrative-user assumes the role of setting up the new event. This user is referred to below as the leader-user. In an operation (1), the leader-user uses the user device 110 to send a constraint-specification message to the forward scheduling component 116. The constraint-specification message conveys the above-noted participant-related constraints associated with the new event. In operation (2), the forward scheduling component 116 generates at least one proposed time slot. In operation (3), the forward scheduling component 116 sends an event-notification message to the user device 110, alerting the leader-user of the proposed time slot. In operation (4), the leader-user can send a response message to the forward scheduling component 116 which conveys his or her approval or rejection of the proposed time slot. Upon rejection, the forward scheduling component 116 can optionally identify another proposed time slot and/or invoke the voting component 122. Assume, however, that the leader-user approves the proposed time slot. In operation (5), the forward scheduling component 116 sends an event-notification message to each of the other participants of the new event. The participants receive the event-notification message via respective user devices 804. In operation (6), each participant sends a response message, which conveys his or her approval or rejection of the proposed time slot.

In a second use scenario 902 of FIG. 9, in operation (1), an automated scheduling agent 904 provides a constraint-specification message that conveys the participant-related constraints. For instance, the automated scheduling agent 904 may correspond to functionality which infers that a group of participants intends to set up a meeting based on utterances made by one or more of the participants. The automated scheduling agent 904 can use a rules-based system and/or a machine-learned model (e.g., a deep-structured neural network model) to perform this task. In operation (2), the forward scheduling component 116 generates at least one proposed time slot. In operation (3), the forward scheduling component 116 sends event-notification messages to the participants of the new event, which inform the participants of the proposed time slot. In operation (4), the participants use respective user devices 906 to send response messages to the forward scheduling component 116, each of which conveys a participant's approval or rejection of the proposed time slot.

Figure 10:
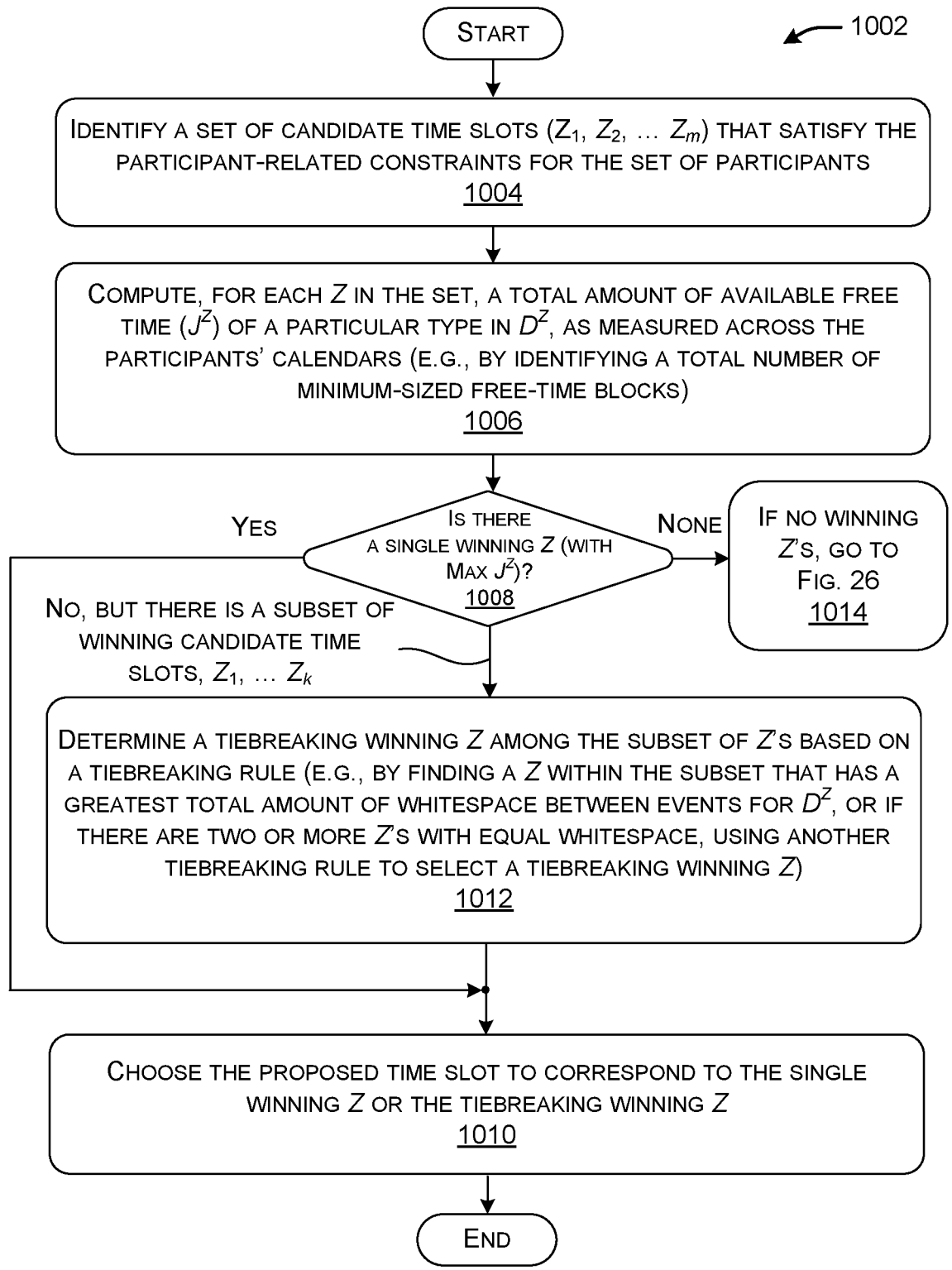
FIG. 10 shows a process that describes, in greater detail compared to FIG. 7, one manner of operation of the forward scheduling component of FIG. 6.

FIG. 10 shows a process 1002 that provides further details regarding block 708 of FIG. 7. In block 1004, the forward scheduling component 116 identifies a set of candidate time slots ($Z_1$, $Z_2$, . . . , $Z_m$), each of which satisfies the participant-related constraints for the set of participants. That is, each candidate time slot Z corresponds to a span of time for which all of the participants are free to attend the event (and in which other constraints associated with the event are met, such as the availability of a meeting room). Each candidate time slot occurs on a particular candidate day $D^Z$ (or D for brevity), or other time unit under consideration (such as a candidate week, etc.). For example, assume that the event corresponds to an hour-long meeting to be conducted sometime in the first two weeks of a particular month. A day within that timeframe for which all of the participants are free to attend the meeting constitutes a feasible candidate day $D^Z$ for consideration, containing at least one candidate time slot Z. The forward scheduling component 116 performs block 1004 by examining the calendars of the respective participants and finding mutually compatible candidate time slots within the specified timeframe.

In block 1006, the forward scheduling component 116 computes, for each time slot in the set of candidate time slots, a total amount of available free time ($J^Z$) of a particular type (e.g., corresponding to quality free time), as measured across all of the calendars of the participants. For example, consider a particular candidate time slot $Z_1$ in the set of candidate time slots. Assume that the candidate time slot $Z_1$ occurs within a particular candidate day $D_1$. Further assume that participant $P_1$ has one minimum-sized block of free time on that day $D_1$, participant $P_2$ has two minimum-sized blocks of free time on that day, and participant $P_3$ has one minimum-sized block of time on that day. In this case, the total amount of available free time ($J^Z$) equals 4, corresponding to the sum of minimum-sized free-time blocks on that candidate day $D_1$. Mathematically expressed:

$$J^Z = \sum_{j=1}^{N} (M_j^D).$$

In this equation, N identifies the total number of participants. $M_j^D$ identifies a number of minimum-sized blocks on a particular candidate day D (associated with a candidate time slot Z), for a particular participant j.

In block 1008, the forward scheduling component 116 determines if there is a single winning candidate time slot $Z_{win}$, among the set of candidate time slots, that is associated with a maximum amount of available free time (Max($J^Z$)). If the answer is "yes," then, in block 1010, the forward scheduling component 116 chooses the proposed time slot to correspond to the single winning candidate time slot $Z_{win}$.

Alternatively assume that there is a subset of two or more candidate time slots, each of which is associated with the same Max($J^Z$) score. If so, in block 1012, the forward scheduling component 116 determines a tiebreaking winning candidate time slot among the subset of candidate time slots based on a tiebreaking rule (one example of which is described below). Then, in block 1010, the forward scheduling component 116 chooses the proposed time slot so that it corresponds to the tiebreaking winning candidate time slot.

Different implementations can adopt different respective tiebreaking rules, e.g., as selected by an administrate-user. In one case, the forward scheduling component 116 computes, for each candidate time slot Z (that occurs on a particular candidate day $D^Z$) in the subset of candidate time slots, a total amount of whitespace ($K^Z$) between events within that particular candidate day $D^Z$, across all of the calendars of the N participants. Whitespace refers to a span of uninterrupted free time. More specifically, for that particular candidate day $D^Z$, the forward scheduling component 116 determines, for each particular participant, a maximum amount of whitespace between events on a calendar associated with the particular participant. (For the purpose of this calculation, the beginning and ending of a workday also constitute "events," e.g., corresponding to an 8:00 AM event and a 6:00 PM event.) The forward scheduling component 116 then sums the maximum amount of whitespace for all of the participants, to provide a measure of the total amount of whitespace ($K^Z$) between events for that particular candidate day $D^Z$. In other words, $K^Z = \Sigma_{j=1}^{N} Max(W^D)$, where $W^D$ is an instance of whitespace between events on the particular candidate day $D^Z$ for a particular participant j, and $Max(W^D)$ is the maximum such span of whitespace between events for the particular participant. The forward scheduling component 116 then determines a single tiebreaking winning candidate time slot $Z_{win}$ (if any), among the subset of candidate time slots, that has a maximum total amount of whitespace between events (i.e., $Max(K^Z)$).

The forward scheduling component 116 can address the situation in which the maximum $K^Z$ value is shared by two or more candidate time slots. For instance, when the competing candidate time slots occur on different days, the forward scheduling component 116 can choose the candidate time slot that occurs on the earliest day. When the competing candidate time slots occur on the same day, the forward scheduling component 116 can choose the candidate time slot that occurs earliest in that day.

Finally, consider the case in which, in block 1008, the forward scheduling component 116 cannot identify any candidate time slot(s) that satisfy the participant-related constraints and/or which contain a requisite amount of free-time blocks (as governed by some environment-specific threshold value). In block 1014, the forward scheduling component 116 can optionally redirect control to the voting component 122. The voting component 122 generates one or more candidate-compromise time slots and allows the participants to vote on those time slots.

FIG. 11 shows excerpts of the calendars of two respective end-users, for a particular day $D_1$, which serves to clarify the meaning of the variables described above. Assume that the two end-users are the only two participants ($P_1$, $P_2$) with respect to a particular event being scheduled. Further assume that the new event to be scheduled has a duration of one hour. Finally, assume that the forward scheduling component 116 is considering the possibility of scheduling the event for the 4:00-5:00 PM time slot for day $D_1$, which is free for both participants $P_1$ and $P_2$. In other words, the 4:00-5:00 PM time slot correspond to one possible candidate time slot Z for consideration that occurs on a candidate day $D_1$.

The participant $P_1$'s calendar has two minimum-sized free-time blocks (1102, 1104). This calendar also has smaller-sized free-time blocks (1106, 1108), each having a duration smaller than the requisite minimum size. Participant $P_2$'s calendar also has two minimum-sized free time blocks (1110, 1112). This calendar also has one smaller-sized free-time block 1114. The forward scheduling component 116 adds the number of minimum-sized free-blocks for participant $P_1$ to the number of free-time blocks for participant $P_2$, to reach a $J^Z$ value of 4.

Assume that there is a tie between two or more days having the same Max($J^Z$) score. In other words, two or more candidate days have a $J^Z$ score of 4 in this example. The forward scheduling component 116 will then examine the whitespace within the calendars to break the tie. The participant $P_1$'s calendar has a maximum amount of whitespace between two consecutive meetings defined by the combination of the free-time block 1104 and the free-time block 1106, e.g., corresponding to a time span 1116. The participant $P_2$'s calendar has a maximum amount of whitespace between two consecutive meetings defined by the combination of free-time block 1110 and free-time block 1112, corresponding to a time span 1118. The forward scheduling component 116 adds the maximum whitespace value (corresponding to span 1116) to the maximum whitespace value (corresponding to span 1118) to derive the maximum whitespace value ($K^Z$) for the particular day $D_1$. If there are two or more days with the same $K^Z$ value, then the forward scheduling component 116 can select one of these days in the manner described above.

Note that it is possible to place the new event at other locations in $D_1$, such as the 12:00-1:00 PM slot, which is available for both participants. The forward scheduling algorithm will consider this candidate time slot, but will eventually discard it; this is because this placement option breaks up a minimum-sized block on both calendars (for $P_1$ and $P_2$) and will therefore be judged of lower $J^Z$ value than the 4:00-5:00 PM option shown in FIG. 11.

In the above description, it is assumed that the new event to be scheduled is a one-off event (meaning a singular event to be scheduled), rather than a recurring-type event. A recurring-type event is an event that occurs at a recurring regular time span (e.g., each Tuesday, 10:00 AM-11:00 AM) based on a specified time interval (such as weekly, bi-weekly, monthly, etc.), or which repeats on an irregular basis. The forward scheduling component 116 can handle a recurring-type new event in different ways. In one implementation, the calendar system 104 can disable the use of the forward scheduling component 116 when an end-user attempts to set up a recurring-type event. In a second implementation, the forward scheduling component 116 can determine the placement of a recurring-type event by only placing the first occurrence of that recurring-type event using the above-described forward-scheduling logic, and then propagating this same selection to subsequent occurrences of the recurring-type event. For example, for a weekly meeting, the forward scheduling component 116 can use the logic of FIGS. 7 and 10 to determine the placement of the first meeting occurrence, e.g., at a particular day and time slot within that day. The forward scheduling component 116 can then schedule subsequent occurrences of the recurring-type event for the same day and time slot on respective subsequent weeks. When a participant already has an event scheduled for one of these subsequent weeks (on the designated day and time slot), the forward scheduling component 116 can optionally double-book that attendee for the recurring-type event.

In a third implementation, the forward scheduling component 116 can determine at least g time slots ($Slot_1$, $Slot_2$, . . . , $Slot_g$) for g respective occurrences of the recurring-type event by independently applying the logic of FIGS. 7 and 10 to each such occurrence, e.g., by treating each occurrence as if it was a standalone new event to be scheduled. Here, the set of time slots can differ, e.g., meaning $Slot_1$ need not refer to the same day of the week and/or time slot during that day as $Slot_2$, etc.

In a fourth implementation, the forward scheduling component 116 again applies the logic of FIGS. 7 and 10, but, in this case, it considers an event that repeats g times as a single compound event to be optimized. For example, assume that an end-user wishes to set up a meeting to be regularly held on a weekly basis for the next two months. This makes eight occurrences of the meeting to be scheduled. The forward-scheduling component 116 can find a subset of repeating candidate time slots, each of which corresponds to a particular time slot on a particular day of the week, and each of which satisfies some or all of the participant-related constraints (for all eight occurrences of the meeting). For example, one repeating time slot (Zrep) can correspond to Tuesday, 10:00 AM to 11:00 AM. For each repeating candidate time slot (Zrep), the forward scheduling component 116 then computes a compound amount of available free time $J^{Zrep}$, e.g., by generating a $J^Z$ value for each weekly occurrence of the meeting in the manner described above, and then summing the individual $J^Z$ values. The forward scheduling component 116 then selects the repeating candidate time slot Zrep having the maximum $J^{Zrep}$ value.

The processes (702, 1002) of FIGS. 7 and 10 can be varied in different respective implementations. For example, in block 1006 of FIG. 10, the forward scheduling component 116 can generate the value $J^Z$ for a particular candidate time slot Z based on a weighted sum of M minimum-sized blocks ($m_1, m_2, \ldots m_M$) for a particular candidate day D, e.g.:

$$J^Z = \sum_{j=1}^{N} \sum_{i=1}^{M} W_{ji}(factor_1, factor_2, \ldots, factor_k) * m_{ji}^D.$$

More specifically, $m_{ji}^D$, having a nominal value of 1.0, refers to a single minimum sized block within a particular candidate day D for a particular participant j, there being M such minimum-sized blocks (including the possibility of zero such blocks). $W_{ji}(factor_1, factor_2, \ldots factor_k)$, applied to each individual block $m_{ji}^D$, refers to a weighting function that depends on an environment-specific set of weighting factors.

One weighting factor identifies one or more preferred time spans for placement of a minimum-sized free-time block. In applying this factor, the forward scheduling component 116 biases a free-time block $m_{ji}^D$ depending on whether the free-time block occurs during a time that is considered preferred. An organization and/or end-user can define what time(s) are considered preferred and/or non-preferred. For example, an organization can create preference information that indicates that a minimum-sized free-time block that occurs before 11:00 AM on a workday is more valued than one that occurs thereafter. For example, such an organization can define a weighting function which applies a weighting value of 1.5 if the free-time block occurs before 11:00 AM, and a weighting value of 1.0 if the free-time block occurs thereafter. With reference to FIG. 11, the above-described weighting function would assign a weighting value of 1.5 to the free-time block 1102 that occurs between 8:00 AM and 10:00 AM, and a weighting value of 1.0 for the free-time block 1106 that occurs between 12:00 PM and 2:00 PM. By applying this weighting rule, the contribution to $J^Z$ for $D_1$, for participant $P_1$, becomes 2.5, instead of the unweighted score of 2.0.

The above-described weighting rule may have the effect of preferentially protecting free-time at certain times of day or days of the week within an organization, and decreasing the likelihood of free-time at other times of the day. An organization may consider this outcome advantageous because it promotes uniformity among members in their work habits, particularly with respect to those times at which the members handle tasks requiring extended and focused attention. It also may promote an organizational culture in which members are less likely to disturb others during those times that have become to be associated with protected free time.

Other implementations can design a weighting function to promote any other organizational goals. For example, in another implementation, an organization can apply (alternatively, or in addition) a weighting function that discounts any day for which one or more participants have zero minimum-sized free-time blocks, even though the sum $J^Z$ may overall have a high value (due to the contributions of other event participants to $J^Z$). Indeed, an organization may completely eliminate any day as a viable option if it cannot deliver at least one free-time block on each calendar of each event participant, for that day. For example, in the case of FIG. 11, a weighting function could eliminate day $D_1$ as a candidate day if participant $P_1$ had zero minimum-sized free-time blocks for that day, even though everyone else invited to the event may have a relatively large number of such blocks.

Alternatively, or in addition, an organization can apply a weighting function that weights a participant's free-time block based on the identity the participant. This rule is based on the assumption that it may be more important to preserve free-time blocks for some members within an organization compared to others, e.g., depending on the roles that the members serve within the organization, and the tasks assigned thereto.

Alternatively, or in addition, an organization can apply a weighting function that weights a participant's free-time blocks for an event depending on whether the participant is invited to the event as a required or optional attendee. The weighting function in this case can operate to favor the contribution of participants who are required, as opposed to participants who are designated as optional.

Alternatively, or in addition, an organization can apply a weighting function that biases a free-time block based on a relationship of the free-time block with some other event or characteristic of a calendar under consideration. For example, when considering a minimum-sized candidate time slot $m_{ji}^D$ for a particular participant, the forward scheduling component 116 can favorably bias that candidate time slot when that candidate time slot is adjacent to one or more other minimum-sized candidate time slots in that participant's calendar.

Figure 12:
FIG. 12 shows an illustrative user interface presentation that the forward scheduling component can use to collect setup information from an administrative-user.

FIG. 12 shows an illustrative user interface presentation 1202 that the forward scheduling component 116 can use to collect setup information from an administrative-user (of any other authorized user). More specifically, the interaction component 604 generates this user interface presentation 1202. The interaction component 604 also collects the setup information provided by the administrative-user via this user interface presentation 1202. The setup component 606 stores the setup information in the setup information data store 608.

Different implementations of the forward scheduling component 116 can collect different kinds of setup information. In the merely illustrative example of FIG. 12, a user interface (UI) feature 1204 optionally identifies those end-users who are entitled to use the forward scheduling component 116. If an end-user is not authorized to use this service, he or she can set up a meeting in a conventional manner that does not address the free-time objective (e.g., using the preexisting calendar system 504 of FIG. 5). A UI feature 1206 optionally identifies any end-users who are excluded from the group identified via the UI feature 1204.

A UI feature 1208 allows an organization (or end-user) to specify a preference with respect to a free-time block. For example, the administrative-user has here selected "before 11:00 AM." In response to this selection, the forward scheduling component 116 will assign a preferential weighting value to any free-time block that occurs before 11:00 AM. The UI feature 1210 specifies the value of the weight associated with the preference specified by the UI feature 1208.

A UI feature 1212 asks the administrative-user to specify how a candidate day is defined with respect to free time. If the user marks "yes" for this option, then a proposed time slot, in order to be considered acceptable, must occur on a day in which all participants have at least one minimum-sized free-time block. Alternatively, the forward scheduling component 116 can discount a proposed free-time block that does not meet this condition, but not outright exclude it.

A UI feature 1214 asks the administrative-user to determine whether voting is permitted or not. If voting is permitted, then the forward scheduling component 116 can transfer control to the voting component 122 in certain scheduling deadlock scenarios, to be described below.

More generally, the setup component 606 (of FIG. 6) can allow an authorized user to configure any rule that determines any aspect of the behavior of the forward scheduling component 116. A first subset of rules determines when the forward scheduling component 116 invokes it services. This subset, for example, can include one or more rules that allow the forward scheduling component 116 to determine the class(es) of end-users who are permitted to use its services, and/or the circumstances in which the end-users are permitted to use the services. A second subset of rules governs the manner in which the forward scheduling component 116 places a new event on the calendars of the participants. This subset, for example, can include one or more rules that indicate whether the forward scheduling component 116 is permitted to double-book a participant when placing a new event. The forward scheduling component 116 double-books a participant when it places the new event in a time slot that is already occupied (at least in part) by a previously-scheduled event (e.g., a previous meeting). A third subset of rules governs the manner in which the forward scheduling component 116 computes the winning time slot(s). This subset, for example, defines the algorithm used by the forward scheduling component 116 (including how the forward scheduling component 116 optionally weights candidate time slots). A fourth subset of rules governs the manner in which the forward scheduling component 116 interacts with end-users. This subset, for example, governs how the forward scheduling component 116 collects input information from end-users, notifies end-users of proposed time slots, and so on. The configurable rules can govern yet other categories of system behavior.

Any rule can have any scope. For example, any individual rule can apply to all end-users or just some end-users (and potentially just a single end-user). Further, any individual rule can apply to all kinds of meetings or just some kinds of meetings (and potentially just a single meeting kind).

Any rule can depend on one or more characteristics or attributes. For example, any rule can depend on any meeting characteristics, such as a duration of a meeting, a number of participants invited to the meeting, a purpose of the meeting, a recurring vs. one-off status of the meeting, a live vs. recorded-content status of the meeting, etc. In addition, or alternatively, any rule can depend on any per-participant characteristics, such as the job role performed by a participant, a seniority level of the participant, an indication of whether that participant is invited as an optional or required attendee, the preferences specified by the participant, etc. In addition, or alternatively, any rule can depend on the characteristics of a candidate time slot Z which is being considered as a possible placement of the new event, such as a (per-participant) calendar state of the candidate time slot (e.g., whether it is labeled as committed-busy, tentative-busy, free, out-of-office, etc.). In addition, or alternatively, any rule can depend on relational time slot characteristics, such as an indication (per-participant) of the placement of a candidate time slot Z with respect to some other event or feature of a participant's calendar. In addition, or alternatively, any rule can depend on participant attendance-requirement characteristics, such as an indication (per-participant) of whether a participant is invited to an event as an optional or required attendee. The above categories of characteristics are cited by way of example, not limitation.

The calendar system 106 can implement any individual rule in any manner, such as an IF-THEN branch in computer code, a machine-learned model, and so on.

To cite illustrative specific rules, a first illustrative rule can preclude applying the forward scheduling component 116 to new events that have certain characteristics, such as meetings with durations longer than a prescribed threshold value, or meetings that have a number of attendees above a prescribed threshold value, or meetings that include non-organizational entities (e.g., external vendors, etc.), and so on. A second illustrative rule can allow at least some participants to be double-booked for a new event depending on the duration of the new event, e.g., by allowing double-booking for long events (as defined by some environment-specific threshold value), rather than short events. A third illustrative rule can allow at least some participants to be double-booked for a new event depending on their roles within the organization, such as by allowing managers to be double-booked, but not engineers, etc. If double-booking is permitted for a participant, a fourth illustrative rule can determine the particular way in which the participant is double-booked for a new event. For example, the fourth rule can determine the type(s) of events that are permitted to overlap, the manner in which the events are permitted to overlap (e.g., by specifying that, when possible, two or more events should be scheduled such that they only partially overlap, which accommodates at least partial attendance by the participant to two or more double-booked events), etc.

Figure 13:
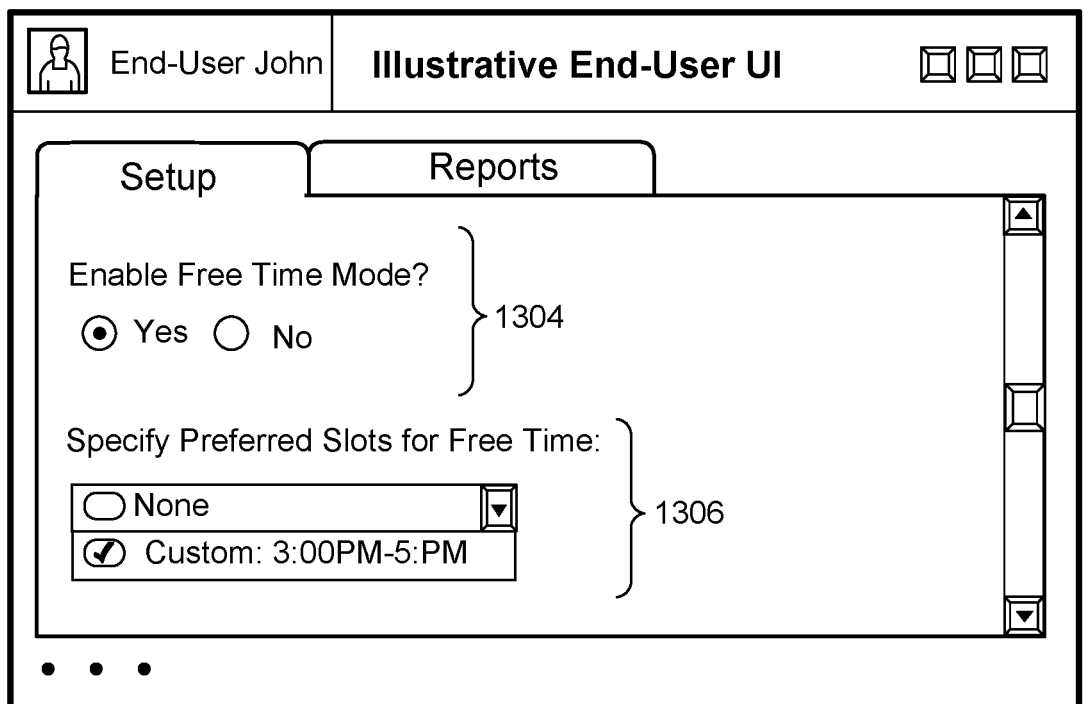
FIG. 13 shows an illustrative user interface presentation that the forward scheduling component can use to collect setup information from an end-user.

FIG. 13 shows an illustrative user interface presentation 1302 that the forward scheduling component 116 can use to collect setup information from an end-user. A UI feature 1304 allows a particular end-user to specify whether he or she wishes to invoke the forward scheduling component 116. If the end-user selects "yes" for this option, the forward scheduling component 116 can invoke the services of the forward scheduling component 116 for any event that the end-user sets up. A UI feature 1306 allows the end-user to specify a preferred time span for the occurrence of a minimum-sized free-time block. When performing its calculations (in block 1006 of FIG. 10), the forward scheduling component 116 can optionally apply a weighting value to any free-time block that occurs within the preferred time span specified by the end-user (via the UI feature 1306), that is, when considering the end-user's contribution to $J^Z$ for a particular candidate time slot Z. More generally, the setup component 606 (of FIG. 6) can allow an authorized user to configure any kind of rule mentioned above (in the context of the description of FIG. 12). But in the context of FIG. 13, each rule governs the behavior of the forward scheduling component 116 with reference to a particular end-user, not all end-users.

Figure 14:
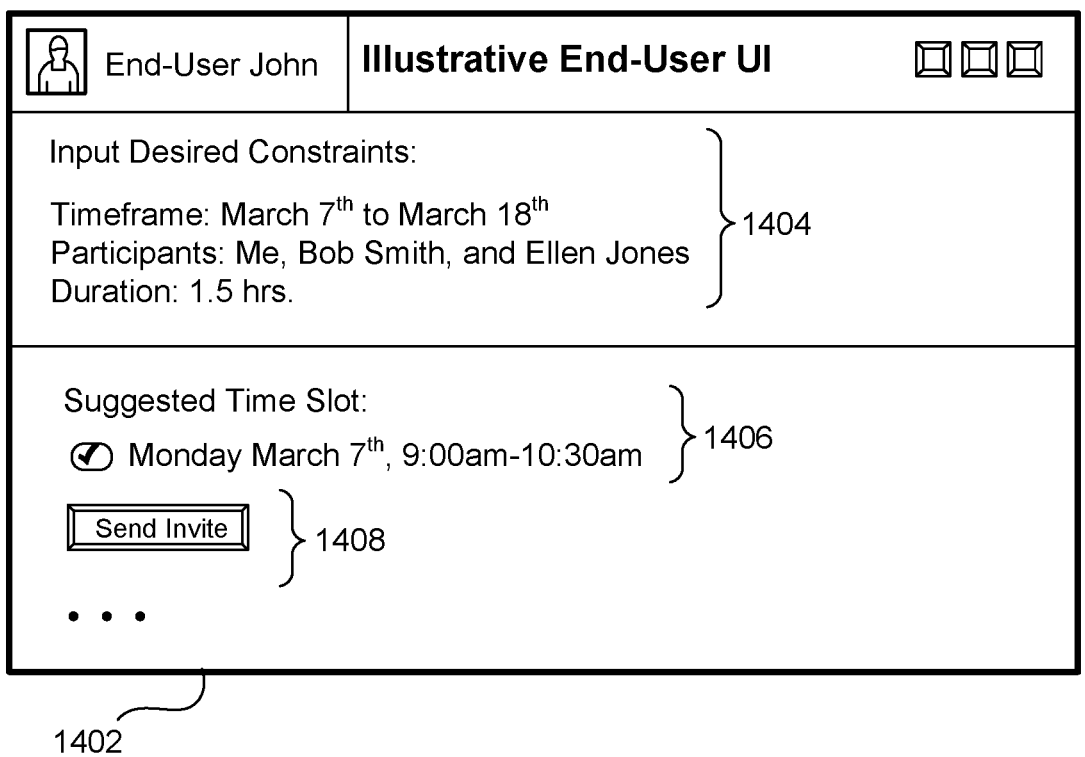
FIG. 14 shows an illustrative user interface presentation that an end-user can use to provide participant-related constraints. The user interface presentation also shows output results generated by the forward scheduling component.

FIG. 14 shows an illustrative user interface presentation 1402 that an end-user (who sets up an event) can use to provide participant-related constraints. For example, in a UI portion 1404, the end-user specifies the preferred timeframe of the event, the participants of the event, and the duration of the event. In some implementations, the calendar system 104 can promote events of certain durations; doing so accommodates the possible later movement of the events (by the rescheduling component 120). For example, the calendar system 104 can promote events having durations of 25 minutes, 55 minutes, 85 minutes, 115 minutes, etc. (where these durations include five-minute trailing buffers to accommodate travel time to a next event, if any). In connection with this functionality, the forward scheduling component 116 can use the user interface presentation 1402 to encourage or require the end-user (who is setting up a new event) to choose a system-preferred event duration.

The user interface presentation 1402 also provides output results generated by the forward scheduling component 116. For example, a UI portion 1406 presents event information regarding the proposed time slot identified by the forward scheduling component 116. In another implementation, the forward scheduling component 116 can provide a set of proposed time slots, ranked from most preferable to least preferable based on their respective $J^Z$ values. A UI feature 1408 allows the end-user to accept a proposed time slot, e.g., by selecting a proposed time slot and clicking a "send invite" command button. Upon doing so, the forward scheduling component 116 can send an event-notification message to all of the other participants of the event, giving each of them the option to accept or decline the proposed time slot.

C. Free-Time Reservation Component

Figure 15:
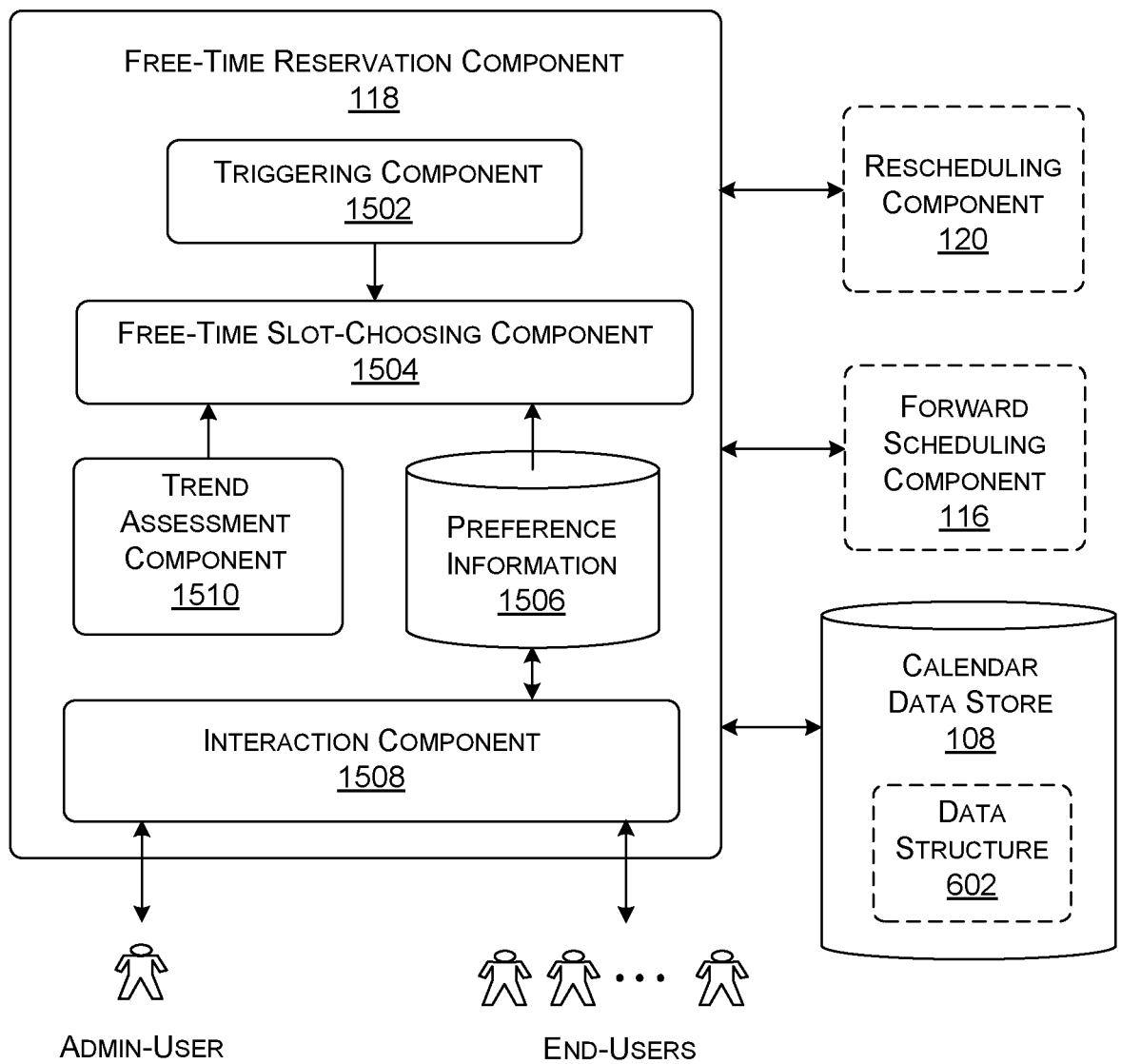
FIG. 15 shows a free-time reservation component, which is another component of the calendar system of FIG. 1. In one implementation, the free-time reservation component schedules free-time blocks in calendars.

FIG. 15 shows additional details regarding the free-time reservation component 118, introduced in Section A. The free-time reservation component 118 proactively schedules free-time blocks in calendars having a minimum size (e.g., two-hour blocks, in one implementation). That is, whereas the forward scheduling component 116 schedules new events in a manner that protects and preserves free-time blocks (which may or may not be officially declared in the calendars as free-time blocks), the free-time reservation component 118 purposely schedules free-time blocks and specifically earmarks those blocks as free time. Section G describes other applications of the free-time reservation component 118.

The free-time reservation component 118 includes a triggering component 1502 that governs when its services are invoked. In one case, the triggering component 1502 activates the free-time reservation component 118 when it receives a command by a user to do so. That is, an administrative-user may instruct the free-time reservation component 118 to find free-time blocks in all calendars in the data structure 602, or some portion thereof. An individual end-user may also instruct the free-time reservation component 118 to find free-time blocks in a calendar owned and controlled by that end-user. In another scenario, the triggering component 1502 activates the free-time reservation component on a periodic basis, such as at the end of every day, or every week, etc.

In another scenario, the triggering component 1502 activates the free-time reservation component 118 in an event-driven manner when a prescribed condition or occurrence is detected. For example, the triggering component 1502 can activate the free-time reservation component 118 when the triggering component 1502 detects that the level of fragmentation in the data structure 602 as a whole (or a part thereof) reaches a prescribed triggering threshold. Fragmentation can be defined in any of the ways described in Section A. In still another scenario, the forward scheduling component 116 and/or the rescheduling component 120 can invoke the free-time reservation component 118; this last-mentioned scenario is described in greater detail below.

A free-time slot-choosing component 1504 determines the temporal placement of one or more free-time blocks in the calendars. Again, the free-time slot-choosing component 1504 can use various strategies to accomplish this objective. In a first technique, the free-time slot-choosing component 1504 can work in cooperation with the forward scheduling component 116 to add free-time blocks to calendars when an event (e.g., a meeting event) is added to the calendars for a set of participants. That is, recall that the forward scheduling component 116 determines an optimum candidate time slot Z to host an event, such as a meeting (where the time slot Z occurs on a particular candidate day $D^Z$, or D for simplicity); it does this by identifying the presence of free-time blocks on the calendars of at least some of the participants for that day, but without otherwise reserving those free-time blocks. The free-time slot-choosing component 1504 can work in tandem with the forward scheduling component 116 by formally reserving at least one free-time block for the day D on each calendar (providing that the calendar has a free-time block on that day D). For example, referring back to FIG. 11, the free-time slot-choosing component 1504 can formally reserve the free-time block 1102 or the free-time block 1104 for participant $P_1$, and can reserve the free-time block 1110 or the free-time block 1112 for participant $P_2$, and so on. It can choose among available blocks on a day based on preference information, or based on a random selection, etc. It can formally reserve a free-time block by labeling it as free time, thus transforming it into a free time event.

Figure 17:
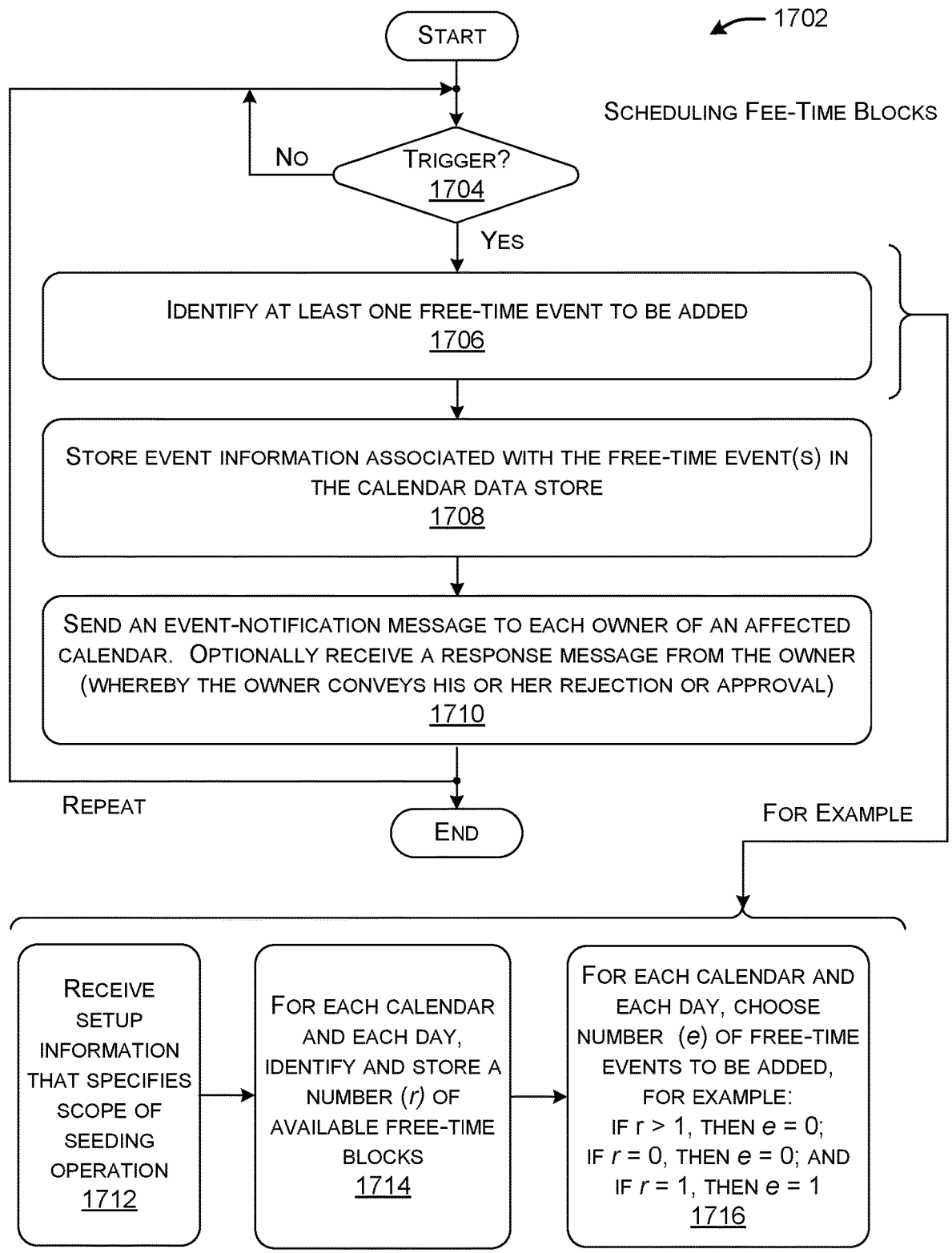
FIG. 17 shows a process that describes one manner of operation of the free-time reservation component of FIG. 15.

In a second technique, the free-time reservation component 118 proactively adds free-time slots to some or all calendars across a prescribed range of days, to the extent that this is possible. For example, assume that the triggering component 1502 activates the free-time reservation component 118 once every two weeks. Upon activation, the free-time reservation component 118 can add free-time slot to each day of a two-week period, per end-user's calendar, where that two-week period begins a month from a current date. For example, if the current date is May $1^{st}$, the free-time reservation component 118, when invoked, can add a free-time block to each day of each calendar from June $1^{st}$ to June $15^{th}$, for those days in which this is possible. In this manner of operation, the free-time reservation component 118 is forever reaching out into the future to seed the calendars of end-users with free-time blocks. Other implementations can modify any of the above-described controlling parameters in any manner (e.g., by changing the length of the time span that is seeded with free-time blocks, by changing the commencement time of that time span, etc.). Further, any individual end-user can enable or disable this mode of operation, or change its operating parameters. FIG. 17 describes one specific implementation of the above-described second technique.

The second technique will exhibit a certain degree of failure. For example, the second technique will fail when it attempts to move a free-time block to a preferred time slot on a particular calendar, but finds that this time slot is already reserved for another event, such as a meeting. In one implementation, the second technique will not attempt to dislodge this preexisting event in the calendar.

In a third technique, the free-time reservation component 118 works in cooperation with the rescheduling component 120 to reserve free-time blocks in calendars 106. As will be described in Section D, the rescheduling component 120 operates to rearrange events in the calendars of end-users to decrease the level of fragmentation of free time in the calendars. But the rescheduling component 120 does not otherwise reserve free-time blocks. The free-time reservation component 118 works in tandem with the rescheduling component 120 by formally reserving free-time blocks in the manner described above with respect to the forward scheduling component 116. For example, referring again to FIG. 11, when a decision is made (by the rescheduling component 120) to move a meeting from an original time slot $Z_{org}$ on a day $D_{org}$ to a new time slot $Z_1$ on day $D_1$ (shown in FIG. 11), the free-time reservation component 118 can reserve the free-time block 1102 or the free-time block 1104 for participant $P_1$, and it can reserve the free-time block 1110 or the free-time block 1112 for participant $P_2$.

In a fourth technique, the rescheduling component 120 attempts to add free-time blocks to calendars using the above-described second technique. As noted above, the second technique produces an outcome having a certain degree of failure. If the second technique fails to secure a desired fragmentation-related goal, then the free-time reservation component 118 can use the above-described third technique to reserve free-time blocks. The third technique is more invasive compared to the second technique because it moves preexisting events in calendars.

The free-time slot-choosing component 1504 can use different considerations to determine where to place a free-time block within a day. In one case, the free-time slot-choosing component 1504 consults explicit preference information provided in a data store 1506 to identify a preferred placement of a free-time block in a calendar. One kind of preference information expresses an organization-wide preference as to the placement of a free-time block within a day. An administrative-user may enter this kind of preference information via an interaction component 1508. Another kind of preference information expresses an end-user-specific preference as to the placement of a free-time block with respect the end-user's own calendar. An end-user may enter this kind of preference information via the interaction component 1508.

Alternatively, or in addition, the free-time slot-choosing component 1504 consults implicit preference information that is generated by a trend assessment component 1510 to identify a preferred placement of a free-time block in a calendar. In one manner of operation, the trend assessment component 1510 examines the events already scheduled over a prescribed amount of time, such as a 120-day period extending from 60 days in past to 60 days into the future (with respect to a midpoint defined by the current point in time). The trend assessment component 1510 can then use cluster analysis to determine clusters of events and free-time blocks within this timeframe. The trend assessment component 1510 can perform cluster analysis by forming a histogram of events and free-time blocks for each segment of time within a day over the span of 120 days. Or the trend assessment component 1510 can perform cluster analysis using a k-means algorithm or some other clustering algorithm. In whatever manner a cluster is identified, a cluster of free time may reflect an implicit preference of an organization, e.g., as to how people prefer to structure their activities during a day. The trend assessment component 1510 can mine these habits with respect to any organizational scope, such as the entire organization, a division, a work unit, etc.

Figure 16:
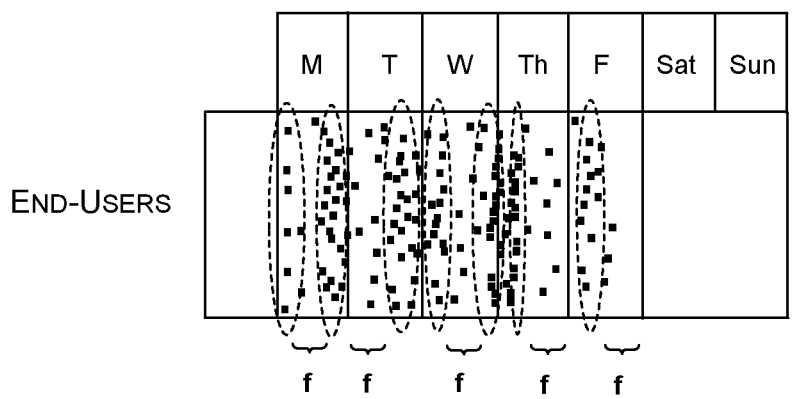
FIG. 16 shows clusters of events within a plurality of calendars. The free-time reservation component can leverage the information conveyed in FIG. 16 in scheduling free-time blocks.

For example, FIG. 16 shows representative clusters of events over the course of a workweek for a plurality of end-users. More specifically, the black dots represent events, the dashed-lined ovals represent prominent clusters of events, and the whitespace regions between the ovals (each labeled as "f") represent prominent clusters of free-time blocks, whether these free-time blocks are formally declared or not. To point out merely one trend, FIG. 16 appears to reveal that many end-users are refraining from scheduling meetings on Tuesday morning. The free-time slot-choosing component 1504 works in harmony with the end-users' habits by formally reserving a free-time block on each calendar on one or more future Tuesday mornings. The free-time slot-choosing component 1504 performs the same decision process with respect to other days of the week.

FIG. 17 shows a process 1702 that describes one manner of operation of the free-time reservation component 118 of FIG. 15. The process 1702 adds at least one free-time event on at least one calendar of the data structure 602. In one case, the free-time event corresponds to a minimum-sized block of free time, such as a two-hour block of free time. In block 1704, the free-time reservation component 118 determines whether the process 1702 should be invoked. For example, the triggering component 1502 performs block 1704 by determining whether any of the above-described triggering conditions have been met.

In block 1706, if block 1704 is answered in the affirmative, the free-time reservation component 118 identifies at least one free-time event to be added to at least one calendar, e.g., by determining the temporal placement of a free-time block within the calendar. The free-time slot-choosing component 1504 can use any of the techniques described above to perform block 1706. In block 1708, the free-time reservation component 118 stores event information associated with the free-time event(s) identified in block 1706. In block 1710, the free-time reservation component 118 can optionally send an event-notification message to the owner of each calendar that is impacted by the process 1702. The event-notification message alerts the calendar owner to the fact that at least one free-time block has been (or will be) added to his or her calendar. The free-time reservation component 118 may optionally receive a response message from the owner, whereby the owner conveys his or her approval or rejection of the changes made to his or her calendar.

FIG. 17 also describes one way of performing block 1706, corresponding to the above-summarized second technique. Recall that the second technique entails automatically seeding the calendar data structure with free-time events for a specified range of days. In block 1712, the free-time scheduling component 118 receives setup information that specifies a scope of calendar days to be seeded with free-time events. The scope is defined with respect to a subset of calendars to be seeded with free-time events, and a span of time within those calendars to be seeded with the free-time events. In block 1714, the free-time scheduling component 118 identifies (and stores), for each calendar and each day in the scope, a number r of minimum-sized free-time blocks that are currently available in that day, where r≥0. In block 1716, the free-time scheduling component 118 chooses a number e of free-time events to be added to each day within the scope, based on an environment-specific seeding rule. In one particular case, the free-time scheduling component 118 chooses a single free-time event (e=1) if r=1; otherwise, the free-time scheduling component 118 will decline to add a free-time event to the day (i.e., e=0). The free-time scheduling component 118 will decline to add a free-time event to the day when r=0 because there are no available free-time blocks to accommodate the free-time event. The free-time scheduling component 118 will decline to add a free-time event to the day when r>1 because the day is not in immediate jeopardy of filling up with non-free-time events (and therefore is not in immediate jeopardy of losing its ability to host at least one minimum-sized free-time block). Note that, in block 1716, the free-time choosing component 1504 does not need to choose among multiple available time slots to place the free-time event, because, by definition, there is only one available free-time block (r=1) on each day that will receive a free-time event.

D. Rescheduling Component

Figure 18:
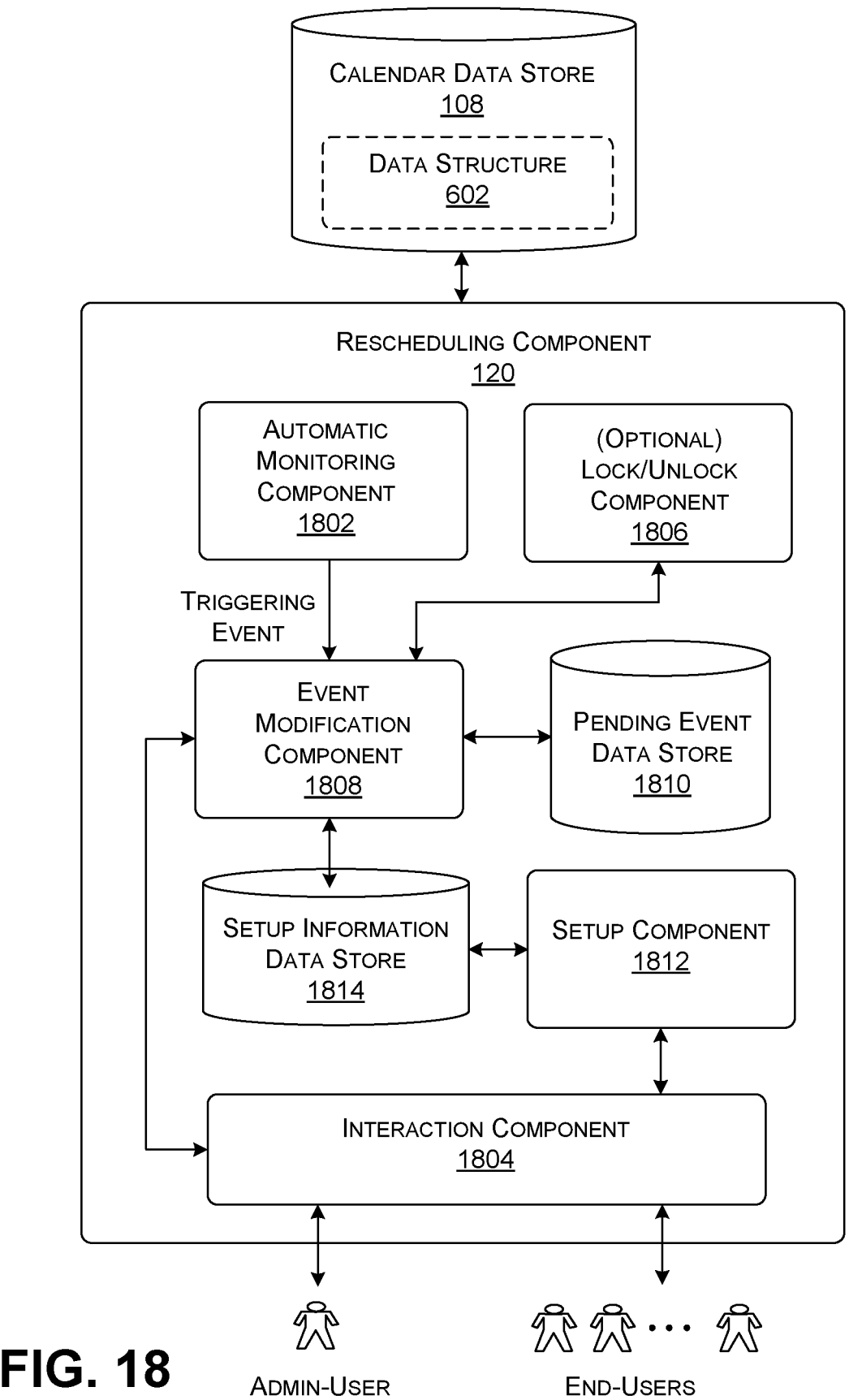
FIG. 18 shows a rescheduling component, which is another component of the calendar system of FIG. 1. The rescheduling component reschedules already-scheduled events in calendars.

FIG. 18 shows additional illustrative details regarding the rescheduling component 120, introduced in Section A. The rescheduling component 120 reschedules at least some already-scheduled events in calendars.

The rescheduling component 120 includes an automatic monitoring component 1802 that invokes a rescheduling operation. For instance, the automatic monitoring component 1802 can automatically determine the level of fragmentation in a collection of calendars, where fragmentation is defined in any of the ways explained in Section A. The automatic monitoring component 1802 triggers a rescheduling operation when the level of fragmentation exceeds an environment-specific threshold value. Alternatively, an interaction component 1804 may receive an instruction from an administrative-user to commence a rescheduling operation.

A lock/unlock component 1806 optionally locks the collection of calendars before a rescheduling operation begins. It then unlocks the collection of calendars after the rescheduling operation ends. The lock/unlock component 1806 locks the calendars by preventing end-users from making changes to the calendars during the rescheduling operation. It unlocks the calendars by again permitting changes to be made to the calendars.

An event modification component 1808 performs the actual task of rescheduling the events in the calendars, in a manner to be described in detail below. The event modification component 1808 can operate in two modes. In a first trial mode, the event modification component 1808 performs a provisional modification of events within the calendars. The event modification component 1808 can then store an updated version of the data structure 602 in a pending event data store 1810 which reflects the changes that have been made, but without changing the event information in the calendar data store 108. In an actual-change mode, the event modification component 1808 produces actual modifications to the events in the calendars, provided in the calendar data store 108.

Figure 23:
FIG. 23 shows an illustrative user interface presentation that the rescheduling component can use to collect setup information from an administrative-user.

A setup component 1812 receives setup information from an administrative-user (or an end-user) via the interaction component 1804, and stores the setup information in a setup information data store 1814. The event modification component 1808 performs its rescheduling operation in a manner that is based on the setup information. FIG. 23 (to be described below) shows various instances of setup information that the setup component 1812 may collect, according to one illustrative implementation.

Figure 19:
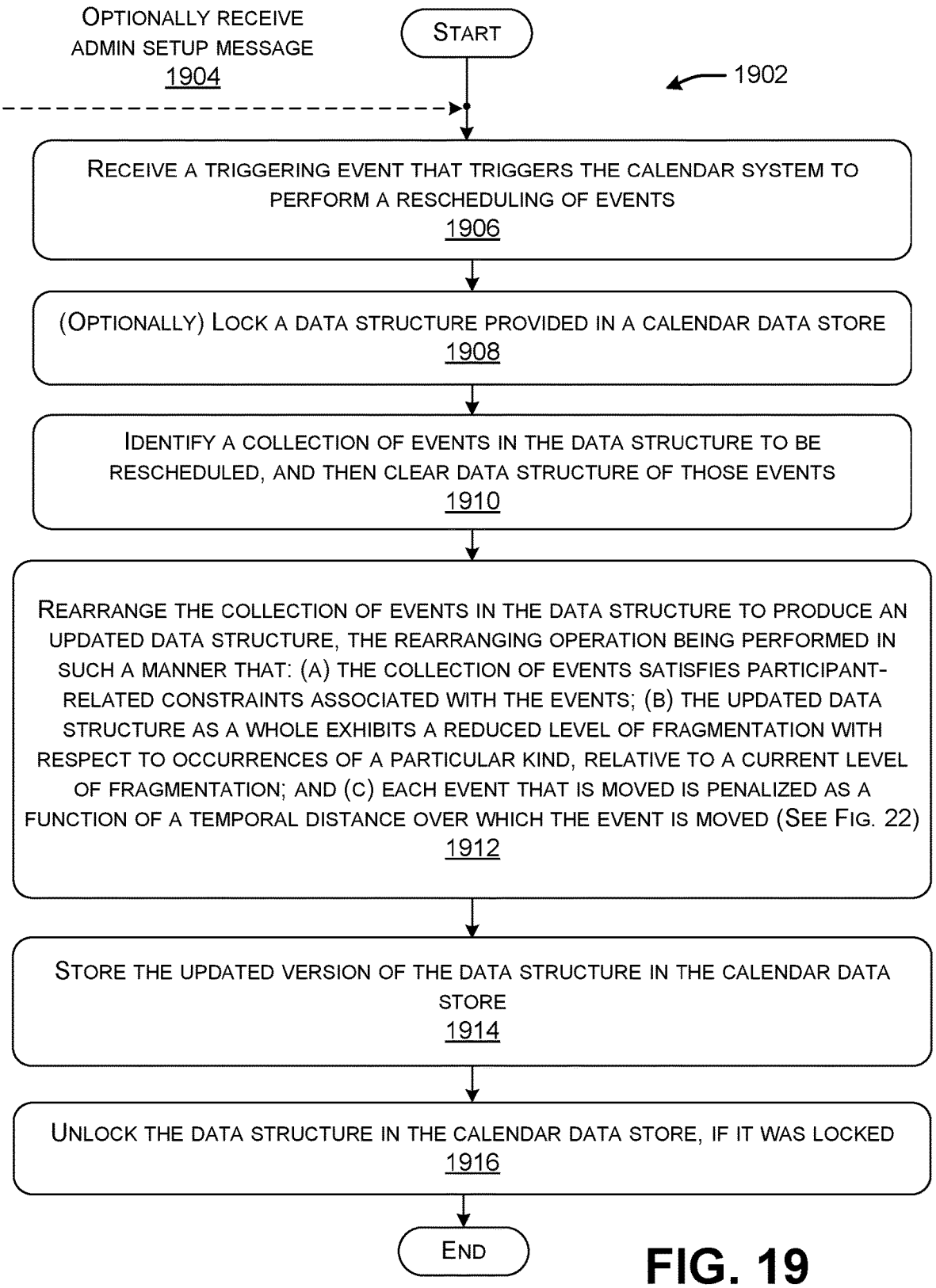
FIG. 19 shows a process that describes one manner of operation of the rescheduling component of FIG. 18.

FIG. 19 shows a process 1902 that describes one manner of operation of the rescheduling component 120 of FIG. 18. In a preliminary block 1904, the rescheduling component 120 optionally receives setup information from an administrative-user or any other user via a computer network. In block 1906, the rescheduling component 120 receives a triggering event that triggers the rescheduling component 120 to perform an actual rescheduling of events. The triggering event may emanate from the automatic monitoring component 1802 or may correspond to a triggering message that emanates from a user device operated by an administrative-user. In block 1908, the rescheduling component 120, in response to the triggering event, locks the data structure 602 provided in the calendar data store 108 (if, in fact, an actual-mode rescheduling operation is taking place, and not a trial-mode rescheduling operation).

In block 1910, the rescheduling component 120 identifies a collection of events in the data structure 602 to be rescheduled. For example, the setup information may define a desired range within which events are to be rescheduled. For instance, the setup information may identify a span of two weeks, to commence 10 days from a current day. The rescheduling component 120 can cull all events that are already scheduled within that time span and earmark them for rescheduling. In another use scenario, the block 1910 may entail culling all of the events that were scheduled in the last x hours (e.g., the last 24 hours), regardless of the placement of the events on the calendars. In this mode, the rescheduling component 120 operates by rearranging a batch of recently scheduled events. Further, as part of block 1910, the rescheduling component 120 clears the data structure with respect to the collection of events, which means that, for each event, it marks its associated time slot as now being free.

In block 1912, the rescheduling component 120 uses a computer-implemented process (described more fully in FIG. 22) to rearrange the collection of events in the data structure 602, to produce an updated data structure. The rearranging operation is performed in such a manner that: (a) the collection of events satisfies participant-related constraints associated with the respective events; (b) the updated data structure as a whole exhibits a reduced level of fragmentation of target occurrences of a particular kind (e.g., instances of free time), relative to a current (initial) level of fragmentation (when rescheduling begins); and (c) each event that is moved is penalized as a function of a temporal distance over which the event is moved. With respect to the last-mentioned condition, assume that an event is moved from an original time slot to a new time slot, and there is a difference in time $t_A$ between these two time slots (excluding non-work hours). The rescheduling component 120 discounts this new time slot as a function of $t_A$, e.g., based on any linear or non-linear weighting function.

In block 1914, the rescheduling component 120 stores an updated version of the data structure in the calendar data store 108, presuming that the rescheduling operation is designated as an actual (non-trial) operation. In block 1916, the rescheduling component 120 unlocks the data structure 602 in the calendar data store 108 (if it was, in fact, previously locked in block 1908).

Figure 20:
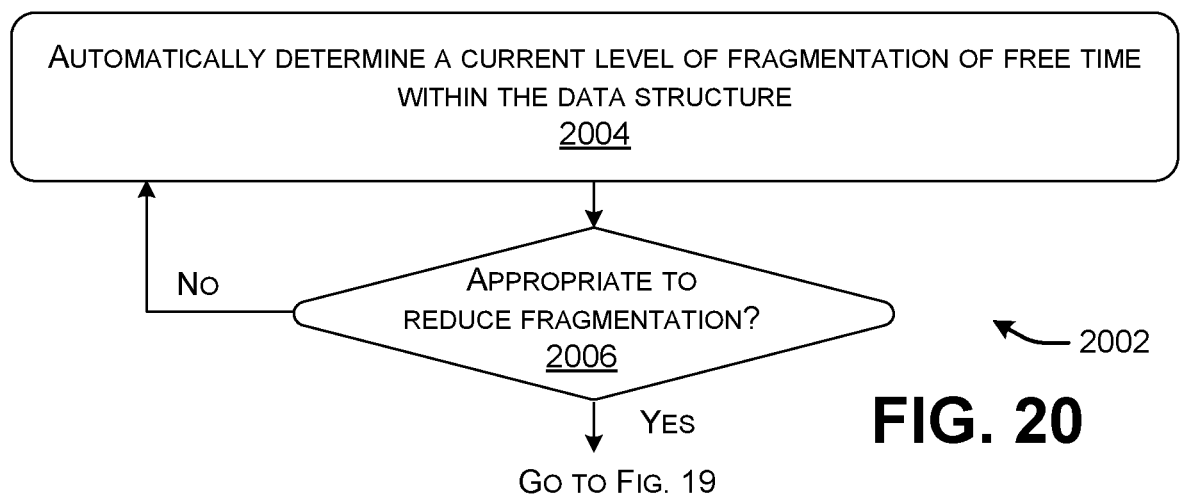
FIG. 20 shows a process that describes one manner of invoking the process of FIG. 19.

FIG. 20 shows a process 2002 that describes the operation of the automatic monitoring component 1802. In block 2004, the automatic monitoring component 1802 automatically determines the current level of fragmentation of free time within the data structure 602. In block 2006, the automatic monitoring component 1802 assesses, based at least on comparison of the current level of fragmentation with a fragmentation threshold value, whether it is appropriate to reduce fragmentation of the free time in the data structure 602.

Figure 21:
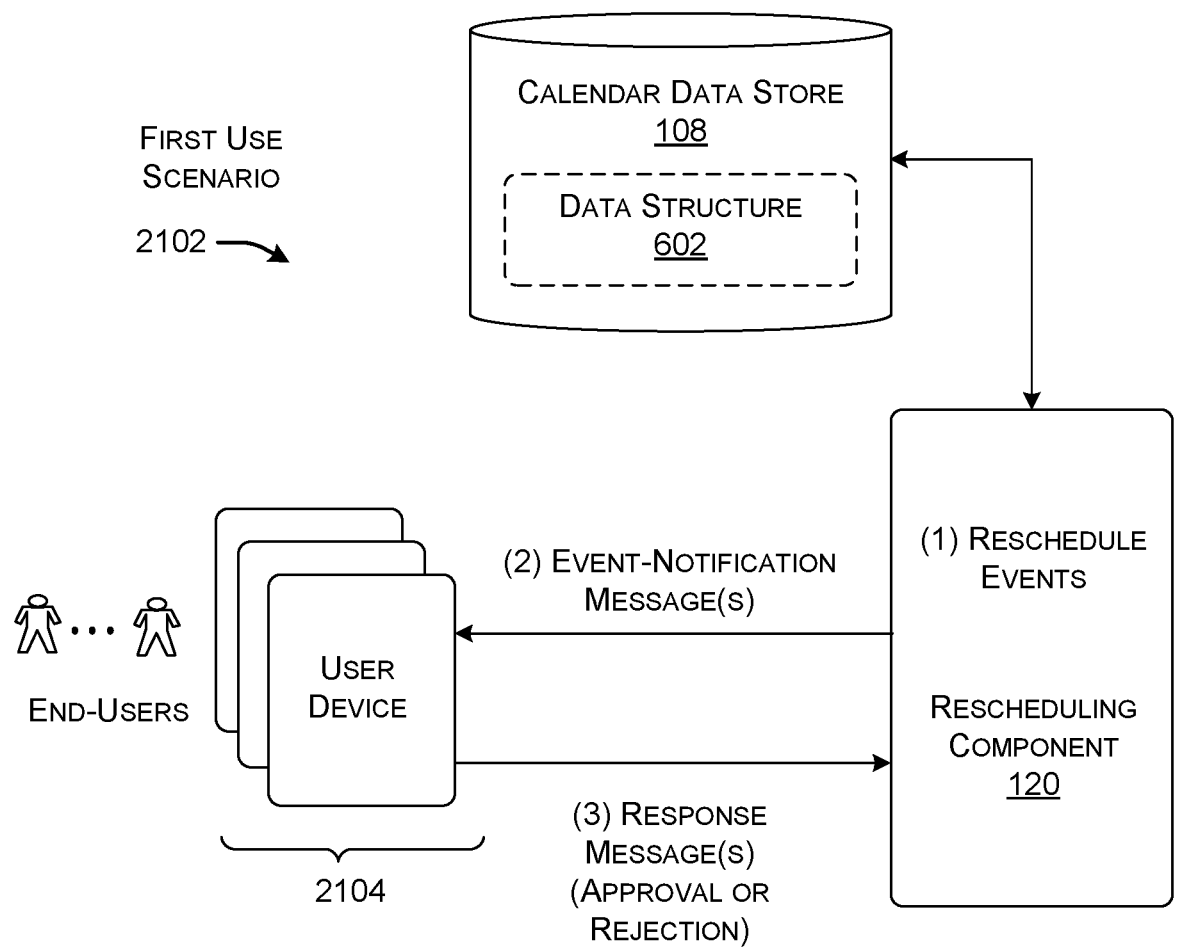
FIG. 21 shows one use scenario of the rescheduling component of FIG. 18.

FIG. 21 shows one use scenario 2102 of the rescheduling component 120 of FIG. 18. In operation (1), the rescheduling component 120 reschedules a collection of events when triggered to do so. In operation (2), the rescheduling component 120 can optionally send event-notification messages to end-users who own calendars that are affected by the rescheduling operation. The end-users interact with the rescheduling component 120 via respective user devices 2104. In operation (3), each end-user may optionally send a response message to the rescheduling component 120, which conveys the end-user's acceptance or rejection of the changes to his or her schedule.

Figure 22:
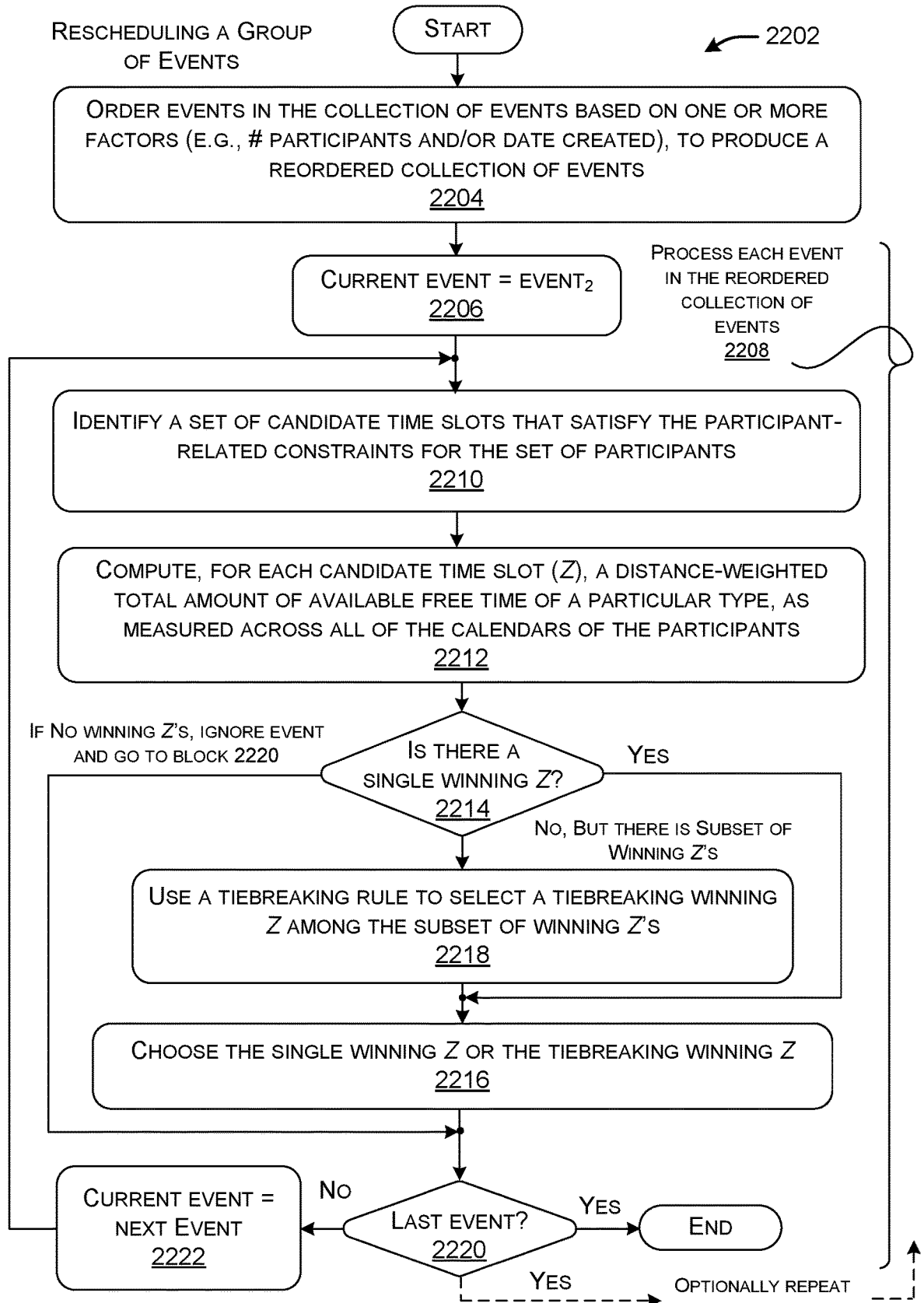
FIG. 22 shows a process that describes, in greater detail compared to FIG. 19, one manner of operation of the rescheduling component.

FIG. 22 shows a process 2202 that provides further details regarding block 1912 of FIG. 19 (in which events are rescheduled). In block 2204, the rescheduling component 120 orders events in the collection of events based on one or more factors, to produce a reordered collection of events. The rescheduling component 120 can use different rules to perform this reordering. In one implementation, the rescheduling component 120 can order the events from the greatest number of constraints to the least number of constraints. For example, the rescheduling component 120 can order the events from the greatest number of attendees to the least number of attendees, based on the premise that events with a large number of constraints are more difficult to reschedule than events with fewer number of attendees. An event$_1$ has the greatest number of attendees. If there are two or more events that have the same number of attendees, the rescheduling component 120 can order the events in the order in which they were originally created, e.g., in the order in which they were originally added to the calendars. Alternatively, or in addition, the rescheduling component 120 can use any other factor(s) to govern the ordering of events, such as by giving preference to some end-users in an organization over other end-users, based on their perceived greater need for quality free time. Alternatively, or in addition, the rescheduling component 120 can order the events based on calendar state information associated with each event to be moved, such as the number (or percentage) of participants who have accepted the event, the manner in which each participant has accepted (e.g., as a committed-acceptance or tentative-acceptance, etc.), and so on.

Block 2206 indicates that the rescheduling component 120 begins the rescheduling operation (corresponding to procedure 2208) by rescheduling the second event (event$_2$) in the reordered collection of events. The rescheduling component 120 skips the first event (event$_1$) because it considers this event as an anchor event which will remain undisturbed (meaning that will not be moved).

The procedure 2208 generally entails identifying a new time slot, if any, for the event that: (a) satisfies participant-related constraints associated with the event; and (b) satisfies a free-time objective that is defined as a function of a total amount of free time of a particular type (e.g., quality free time) measured across all of the calendars of the participants. The rescheduling component 120 biases the total amount of free time based on the temporal distance ($t_A$) between the proposed new time slot and an original time associated with the event. The rescheduling component 120 can also bias its computations using any other weighting factors described above with respect to the operation of the forward scheduling component 116.

More specifically, in block 2210, the rescheduling component 120 identifies a set of candidate time slots, each of which satisfies the participant-related constraints for the set of participants associated with the event under consideration (event$_i$). Each candidate time slot Z occurs on a candidate day $D^Z$, or for simplicity, D. In block 2212, the rescheduling component 120 computes, for each candidate time slot in the set of candidate time slots, a distance-weighted total amount of available free time $J^Z$, as measured across all of the calendars of the participants. The total amount is considered distance-weighted because it is weighted based on the temporal distance factor $t_A$ described above, e.g., $J^Z = W(t_A) * \Sigma_{j=1}^{N} M^D$, where $W(t_A)$ corresponds to any weighting function based on $t_A$. Generally, the rescheduling component 120 can perform block 2212 in the same manner as block 708 (associated with the operation of the forward scheduling component 116), again, with the exception that, for block 2212, the rescheduling component 120 biases the sum $J^Z$ by the temporal distance $t_A$.

The rescheduling component 120 can weight each participant j and/or each individual free-time block $m_{ji}^D$ under consideration in the manner described above (with respect to the forward scheduling component 116). In addition, the rescheduling component 120 can apply a weighting value to each free-time block $m_{ji}^D$, for a particular participant j, that depends on the calendar state associated with the original event that is being moved, with respect to the participant j. For example, the rescheduling component 120 can apply a weighting value which varies based on whether the participant j: (a) has accepted the original event without qualification; or (b) has accepted the original event as a tentative attendee; or (c) has not yet accepted the original event, etc.

In block 2214, the rescheduling component 120 determines if there is single winning candidate time slot $Z_{win}$, among the set of candidate time slots, that is associated with a distance-weighted maximum amount of available free time. If so, in block 2216, the rescheduling component 120 chooses the proposed time slot to correspond to the single winning candidate time slot. Alternatively, assume that there is a subset of two or more candidate time slots, among the set of candidate time slots, each of which is associated with a same distance-weighted maximum amount of available free time. If so, in block 2218, the rescheduling component 120 uses a tiebreaking rule (such as the whitespace-maximization rule described in Section B) to choose a tiebreaking winning candidate time slot among the subset of candidate time slots.

In many cases, the ultimate winning candidate time slot for an event will correspond to the original time slot associated with the event. This is because the process 2202 is biased against movement of an event unless it is deemed necessary or otherwise appropriate. Further note that the process 2202 may move more events towards the end of its processing of a collection of events, compared to the beginning. This is because the calendars become more constrained as rescheduling proceeds, offering fewer viable time slots for consideration.

Further note, with reference to block 2214, that there is a possibility that the rescheduling component 120 cannot identify any winning candidate time slot for an event under consideration. If this is so, then the rescheduling component 120 can optionally skip this event, earmarking it for later potential resolution via the voting component 122. At the end of its processing, the process 2202 may identify a set of events for which automatic scheduling failed.

In block 2220, the rescheduling component 120 determines whether it has processed the last event in the ordered collection. If not, then in block 2222, the rescheduling component 120 advances to the next event in the collection. If the answer to block 2220 is "yes," then the process 2202 ends.

In another implementation, represented by block 2224, the rescheduling component 120 can start anew and repeat the process 2202 of FIG. 22 with respect to one or more different orderings of events in the collection. The rescheduling component 120 can then choose the rescheduling run that produces the great amount of defragmentation of the data structure 602, and/or is preferred for other reasons. For example, in block 2204, the rescheduling component 120 can reorder events based on respective priority levels assigned to the participants associated each event. The rescheduling component 120 can then repeat the rescheduling procedure 2208 with respect to this new ordering of events.

According to another optional feature, the rescheduling component 120 can attempt to satisfy a defragmentation target level (as optionally specified in the setup information). The rescheduling component 120 can perform this operation in different ways. In one approach, the rescheduling component 120 can repeat the process 2202 for increasingly invasive changes to the original data structure, until the defragmentation target level is achieved, or until it is concluded that the defragmentation target level cannot be achieved (because all options are exhausted).

For example, in a first iteration of the rescheduling operation, the rescheduling component 120 can limit movement of events to a maximum $t_A$ of 2 days. If this limit fails to yield the defragmentation goal, then, in a second iteration, the rescheduling component 120 can repeat the scheduling operation, this time with a maximum $t_A$ of 4 days, and so on. Alternatively, or in addition, the rescheduling component 120 can repeat a scheduling operation by relaxing participant-related constraints and/or free-time-related constraints in one or more regards, e.g., by double-booking some participants of some events, and so on. This last-mentioned tactic constitutes "lossy" rescheduling, which is described in greater detail below. In general, the above-described iterative approach to rescheduling is advantageous because it has the potential of producing the least disruption to an existing schedule in order to achieve an organization's defragmentation goals. In one case, for each occasion for which the rescheduling component 120 repeats the process 2202, it can discard the results of the previous iteration and start anew. Or it can further refine the results of the previous iteration, e.g., by attempting to reschedule events that were not successfully handled in the previous iteration.

In yet other implementations, other algorithms and systems besides that shown in FIG. 22 can be used to reschedule events. Those algorithms and systems include exhaustive search algorithms (to enumerate all possible scheduling options for a set of events, and then choose the option yielding the greatest defragmentation of the data structure), branch-and-bound algorithms, neural network models, genome-type matching algorithms (such as the Smith-Waterman algorithm, the Basic Local Alignment Search Tool (BLAST) algorithm, etc.), clustering models, symbolic computation engines, and so on.

In the above description, it has been assumed that each event to be rescheduled corresponds to a one-off event. But the same logic can be applied to moving a recurring event, e.g., by using any of the strategies described above with respect to the description of the forward scheduling component 116.

FIG. 23 shows an illustrative user interface presentation 2302 that the rescheduling component 120 can use to collect setup information from an administrative-user. A UI feature 2304 allows the administrative-user to specify whether the rescheduling operation is a trial run or an actual run. A UI feature 2306 allows the administrative-user to specify a target group or groups of end-users to which rescheduling is to be applied. A UI feature 2308 allows the administrative-user to specify those end-users (if any) that are to be excluded from the group(s) specified via UI feature 2306.

A UI feature 2310 allows the administrative-user to specify a time span over which rescheduling is to be performed. The UI feature 2310 can solicit this information in any manner, e.g., by providing a popup calendar (not shown) on which the administrative-user can select the time span.

A UI feature 2312 allows the administrative-user to optionally specify defragmentation goal, e.g., corresponding to a fragmentation target level to be satisfied by the rescheduling component 120. This fragmentation target level can be defined in various ways. In one example, the UI feature 2310 allows the administrative-user to specify the fragmentation level as a target percentage, e.g., corresponding to an amount of permitted non-quality free time to total free time in the calendars of end-users, for some scope of end-users. More generally, fragmentation level can be defined in any manner specified in Section A.

A UI feature 2314 allows the administrative-user to optionally specify a permitted type (or types) of loss, if any. A permitted type of loss describes an aspect of the participant-related constraints and/or free-time-related constraints that the rescheduling component 120 is permitted to ignore or relax in an effort to satisfy the logic of block 1912 of FIG. 19. For example, assume that the administrative-user specifies that it is permitted to drop a certain class of attendees from events, even though these attendees were originally invited to some of the events. Then assume that, in an attempt to reschedule a particular event, the rescheduling component 120 determines that it cannot find any time slot that satisfies all of the participant-related constraints associated with that event. The rescheduling component 120 can address this situation by omitting one or more attendees from the invitation list, if permitted by the setup information entered via the UI feature 2314. The rescheduling component 120 then repeats its attempt to find a suitable time slot which satisfies the logic of block 1912 of FIG. 19. Generally, if no loss is permitted by the administrative-user, then the rescheduling operation is considered lossless. Otherwise, the rescheduling operation is considered potentially lossy to varying degrees. In the particular example of FIG. 23, the administrative-user specifies that it is permissible to drop participants of meetings labeled as "optional," if this proves to be necessary to satisfy the logic of block 1912 of FIG. 19.

The UI feature 2314 also optionally allows the administrative-user to specify a desired degree of loss. For example, in the specific example of FIG. 23, the administrative-user specifies a threshold value which represents a maximum number of events for which dropping an optional attendee is permitted. In other words, the UI feature 2314 allows the administrative-user to set a quota for the specified type of loss.

Assume that a decision is made to drop an end-user from the invitation list of a particular event. In one example, the rescheduling component 120 can implement a lossy rescheduling operation in this circumstance by: (a) omitting consideration of the end-user's availability when finding a proposed time slot for the event; and (b) declining to schedule an event on the end-user's calendar. In another case, the rescheduling component 120 implements a lossy rescheduling operation by: (a) omitting consideration of the end-user's availability when finding a proposed time slot for the event; and (b) double-booking the end-user for the event with respect to whatever proposed time slot is chosen. The end-user is double-booked when he or she is scheduled to attend another event (or events) at the same time as the proposed time slot. In this latter option, the end-user is thereby empowered to choose the event he or she wishes to attend.

As an aside, although not mentioned in Section B, note that the forward scheduling component 116 can also incorporate the same kind of lossy scheduling functionality described above. That is, the user interface presentation 1202 of FIG. 12 can include the UI feature 2314 shown in FIG. 23.

A UI feature 2316 allows the administrative-user to specify whether each end-user that is affected by the rescheduling operation should be notified of the changes made to his or her calendar. A UI feature 2318 allows the administrative-user to specify whether voting is permitted by end-users to resolve scheduling conflicts encountered in the rescheduling operation.

Although not shown, yet another UI feature can allow the administrative-user to specify the manner in which an event is to be biased as a function of the temporal distance ($t_A$) over which it is moved. For instance, such a UI feature can allow the administrative-user to specify a weighting function $W(t_A)$ of any type. The user interface presentation 1202 of FIG. 12 can include a similar UI feature, although not shown.

More generally stated, the setup component 1812 (of FIG. 18) can allow an authorized user to configure any rule that determines any aspect of the behavior of the rescheduling component 120. Examples of such controllable behavior were cited above in the description of FIG. 12. Any such rule can have any scope. Any such rule can also depend on one or more characteristics. Examples of such characteristics were cited above in the description of FIG. 12.

In addition, any rule can also depend on the characteristics (e.g., the calendar state) of an original time slot of an event that is being moved. For instance, an illustrative rule can operate to: (a) determine the characteristics of an original time slot for an event to be moved; and (b) transfer the same characteristics to the new time slot to be assigned to the event. For example, in applying this rule, the rescheduling component 120 can determine that an original event includes a doubled-booked participant. In response, the rescheduling component 120 can permit that same participant to be double-booked, if necessary, for the new time slot assigned to the event. In another case, the rescheduling component 120 can determine that an original event includes an optional participant. In response, the rescheduling component 120 can designate that participant as an optional attendee in the new time slot assigned to the event. In another case, as already described above, the rescheduling component 120 can weight a participant's free-time blocks based on any aspect of the calendar state of the original event to be moved, with respect to that participant.

Finally, the user interface presentation 2302 includes a command feature 2320. The administrative-user can activate this command feature 2320 to instruct the rescheduling component 120 to commence a rescheduling operation. When activated, the rescheduling operation proceeds on the basis of the setup information collected via the user interface presentation 2302 of FIG. 23.

Figure 24:
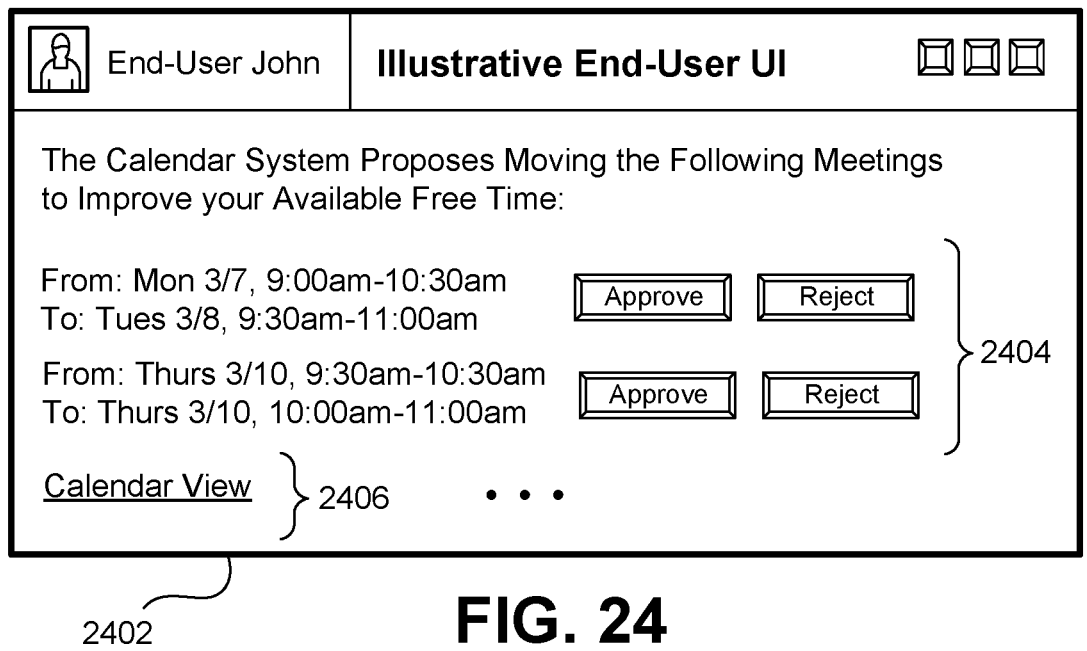
FIG. 24 shows an illustrative user interface presentation whereby an end-user can approve or reject rescheduled events, produced by the rescheduling component.

FIG. 24 shows an illustrative user interface presentation 2402 whereby an end-user can approve or reject rescheduled events, produced by the rescheduling component 120. For example, a UI portion 2404 can display all the changes that have been made to the end-user's calendar. The UI portion 2404 can optionally include command features that allow the end-user to approve or reject each such change. A UI feature 2406 allows the administrative-user to invoke a calendar-type presentation that shows the changes that have been made.

The rescheduling component 120 can use different strategies to handle the case in which one or more end-users reject a proposed new time slot for an event. In one case, the rescheduling component 120 moves that event back to its original time slot, assuming that the original time slot has not been taken by another event. If the original time slot is no longer available, the rescheduling component 120 can invoke the voting component 122 to allow the end-users to choose a new time slot for the event. In yet other cases, the rescheduling component 120 can disable all event changes across the calendars if any end-user objects to the changes that have been.

E. Voting Component

Figure 25:
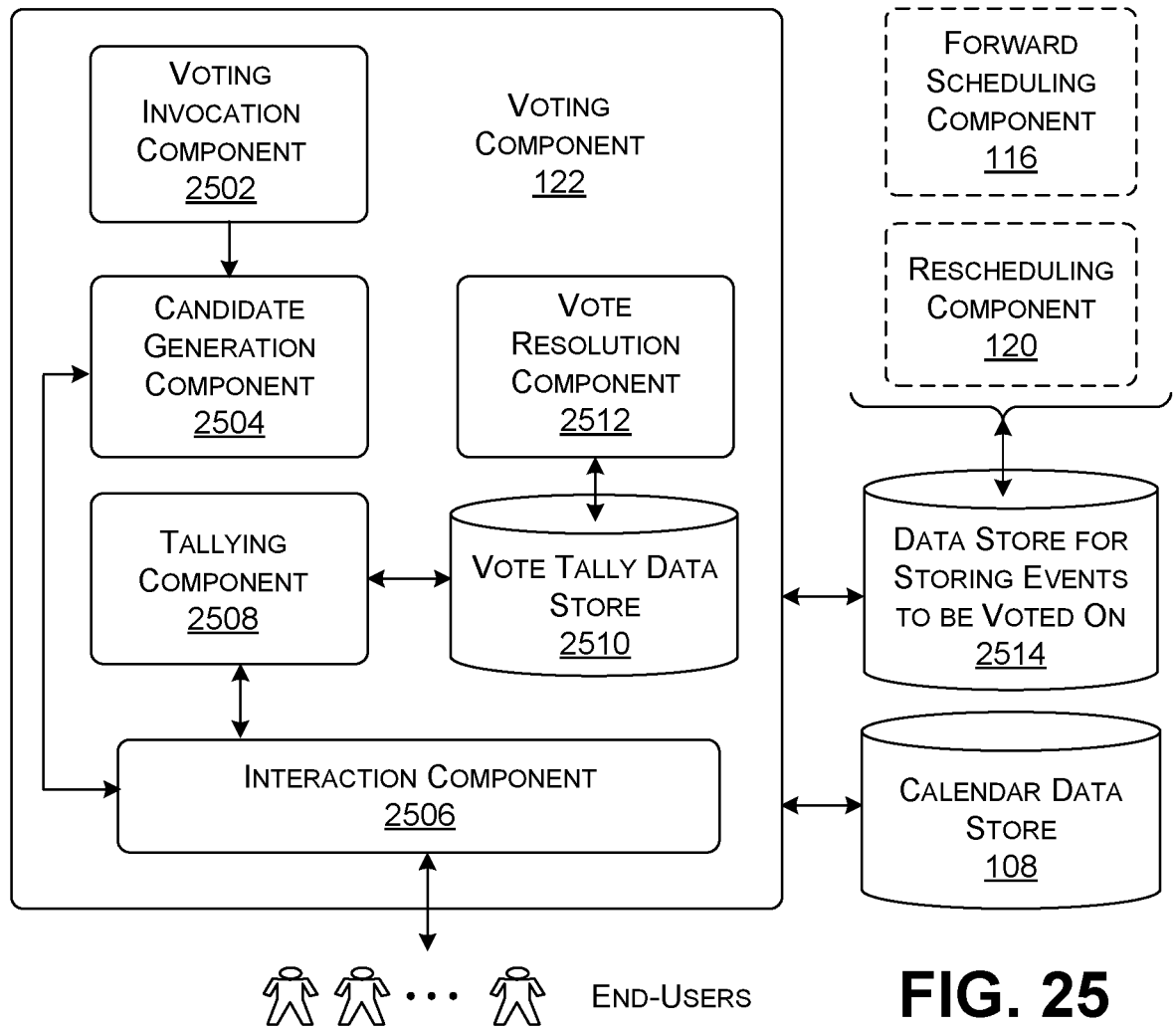
FIG. 25 shows one implementation of a voting component, which is another component of the calendar system of FIG. 1. The voting component offers candidate-compromise time slots to end-users and allows end-users to vote on these slots.

FIG. 25 shows one implementation of the voting component 122, introduced in Section A. The voting component 122 allows end-users to resolve scheduling deadlocks that may arise in the operation of the forward scheduling component 116 and/or the rescheduling component 120.

A voting invocation component 2502 triggers the operation of the voting component 122. For instance, with reference to FIG. 7, the forward scheduling component 116 may invoke the services of the voting component 122 when it cannot find any time slot which satisfies all of the conditions of block 708, with respect to an event under consideration. Similarly, with reference to FIG. 19, the rescheduling component 120 can invoke the services of the voting component 122 when it cannot find any time slot which satisfies all of the conditions of block 1912, with respect to an event under consideration.

In another mode, the rescheduling component 120 activates the voting component 122 when a target level of defragmentation cannot automatically be achieved without intervention by end-users. More specifically, assume that the administrative-user specifies a desired maximum level of fragmentation of 30%. Further assume that the rescheduling component 120 generates an updated data structure 602 with a fragmentation level of 35%. Further assume that the rescheduling operation remains deadlocked for a set of n events, and therefore did not attempt to automatically move these events. The rescheduling component 120 can transfer control to the voting component 122, thereby enlisting the participants' help in rescheduling the n deadlocked events, or some portion thereof, with the ultimate aim of further reducing the level of fragmentation of the data structure 602 to the target goal of 30%.

A candidate generation component 2504 generates a set of candidate-compromise time slots for each event. The candidate generation 2504 can use different techniques to generate the candidate-compromise time slots. In one technique, the candidate generation component 2504 relaxes one or more participant-related constraints and/or one or more free-time-related constraints. The candidate generation component 2504 then generates one or more time slots which satisfy the relaxed constraints.

To cite a first example, consider a modified version of the forward scheduling component 116 that applies the following free-time-related rule: a candidate day (which is being considered to host an event) is disqualified if that day does not accommodate at least one free-time block on each calendar of each participant, for that day. For example, the forward scheduling component 116 will not move a meeting to Tuesday if doing so will not secure a free-time block for one of the participants to the meeting, even though other participants have a large number of free-time blocks on that day. Further assume that the forward scheduling component 116 cannot find any day which satisfies this free-time-related rule for the event under consideration, and therefore fails to provide a proposed time slot for the participants' consideration for the event. The candidate generation component 2504 operates by: (1) removing the above-described free-time-related rule; (2) finding a set of compromise-candidate time slots that satisfies the relaxed scheduling constraints, if any; and (3) allowing the participants to vote of the compromise-candidate time slots.

As another option, the candidate generation component 2504 can relax one or more aspects of the participant-related constraints. For example, again consider the scenario described above. Assume that the forward scheduling component 116 cannot find any time slots which satisfy both the participant-related constraints and the free-time objective, in whatever manner the free-time objective is defined. Instead of relaxing the free-time objective, the candidate generation component 2504 can relax one or more aspects of the participant-related constraints. For example, assume the leader-user who sets up the meeting specifies that the meeting should preferably occur within a time span defined by a four-day period, beginning at some date in the future. The candidate generation component 2504 can progressively extend this time span on a day-by-day basis until it finds a set of candidate-compromise time slots to present to the participants for voting. Alternatively, or in addition, the candidate generation component 2504 can successively drop invitees from an invitation list until viable candidate-compromise time slots are found.

In a third example, the candidate generation component 2504 provides one or more candidate-compromise time slots in which at least one participant is double-booked for an event under consideration. This option would give the double-booked participant the option to either accept the time slot (and forego the other event for which he is she is booked), or to decline attending the current event under consideration.

The above three examples are presented in the spirit of illustration, not limitation; in other implementations, the candidate generation component 2504 can use yet other constraint-relaxation strategies.

An interaction component 2506 presents the candidate-compromise time slots to the participants of an event. The interaction component 2506 also receives response messages from the participants, each of which conveys voting information. In one implementation, the voting information ranks the candidate-compromise time slots in order from most desirable to least desirable.

A tallying component 2508 tallies the votes for each candidate-compromise time slot, and stores resultant tally information in a vote tally data store 2510. The tallying component 2508 can optionally weight votes based on different factors, such as the identities of the participants who are making the votes. If this option is applied, the tallying component 2508 can treat the votes of some end-users as more important than others, for any organization-related reasons.

A vote resolution component 2512 determines whether a vote threshold condition is achieved, such as the receipt of a prescribed number of votes, or the receipt of votes from a prescribed percentage of participants associated with an event under consideration. If this vote threshold condition is reached, then the vote resolution component 2512 chooses the candidate-compromise time slot having the greatest number of votes. If two or more time slots have the same maximum number of votes, then the vote resolution component 2512 can randomly choose a candidate-compromise time slot, or it can select a candidate-compromise time slot based on one or more other factors (besides vote tallies), such as by selecting the earliest candidate-compromise time slot.

A data store 2514 can store event information that identifies votes to be operated on in the above-described manner by the voting component 122. For example, the rescheduling component 120 can identify a set of events that it cannot reschedule because of any deadlock conditions described above. The data store 2514 may store event information that identifies those events. The voting component 122 may then process each of these events in series and/or in parallel.

Figure 26:
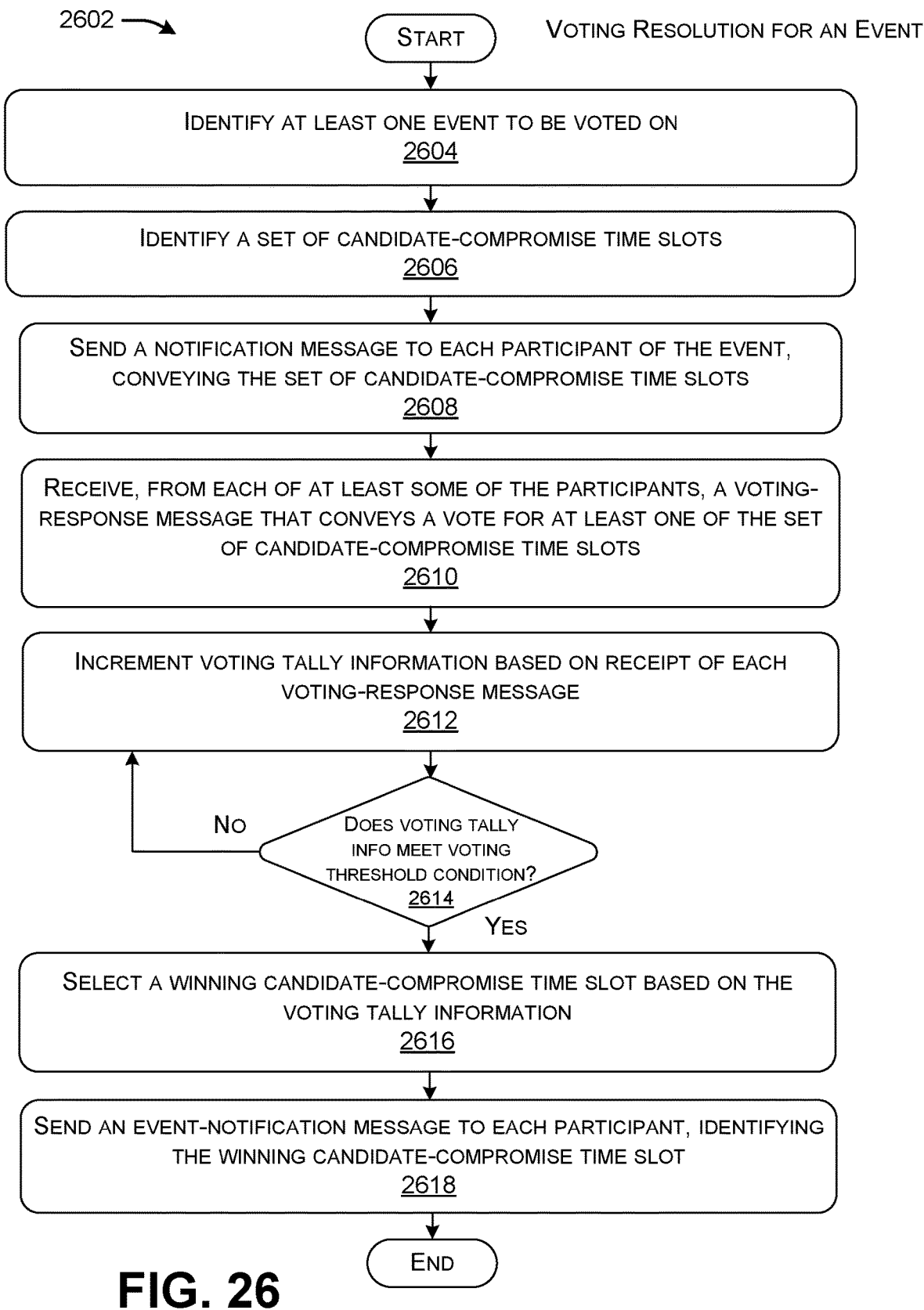
FIG. 26 shows a process that describes one manner of operation of the voting component of FIG. 25.

FIG. 26 shows a process 2602 that describes one manner of operation of the voting component 122 of FIG. 25, with respect to a single event under consideration. The process 2602 is invoked when a proposed time slot cannot be found that satisfies both the participant-related constraints and the free-time objective. In block 2604, the voting component 122 identifies at least one event to be voted on. In block 2606, the voting component 122 identifies a set of candidate-compromise time slots, each of which is considered to fall short with respect to the participant-related constraints and/or the free-time objective. In block 2608, the voting component 122 sends an event-notification message to each participant of the new event, conveying the set of candidate-compromise time slots. In block 2610, the voting component 122 receives, from each of at least some of the participants, a voting-response message that conveys a vote for at least one of the set of candidate-compromise time slots. In block 2612, the voting component 122 increments voting tally information based on receipt of each voting-response message. In block 2614, the voting component 122 determines whether the voting tally information satisfies a voting threshold condition. In block 2616, if the voting threshold condition has been met, the voting component 122 selects a winning candidate-compromise time slot based on the voting tally information. In block 2618, the voting component 122 sends an event-notification message to each participant, identifying the winning candidate-compromise time slot.

In the case of the forward scheduling component 116, the voting component 122 may perform the process 2602 each time the automatic scheduling of a new event reaches a deadlock condition. In the case of the rescheduling component 120, the voting component 122 may perform the process 2602 for a batch of events that could not be automatically rescheduled based on deadlock conditions.

Figure 27:
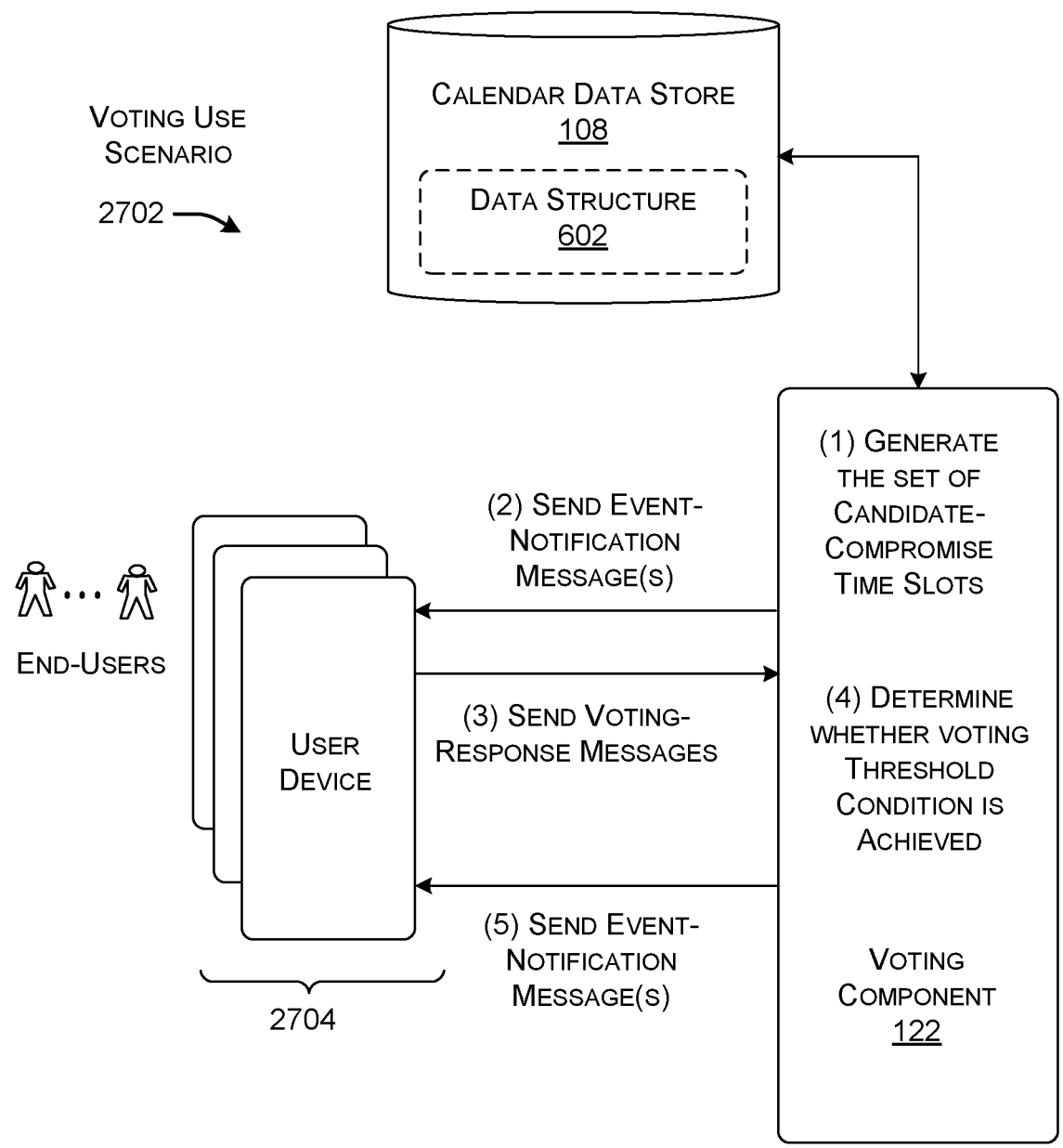
FIG. 27 shows one use scenario of the voting component of FIG. 25.

FIG. 27 shows one use scenario 2702 of the voting component 122 of FIG. 25. In operation (1), the voting component 122 generates a set of candidate-compromise time slots for an event under consideration. In operation (2), the voting component 122 sends event-notification messages to user devices 2704 operated by the end-users (corresponding to participants of the event under consideration). In operation (3), at least some of the end-users send voting-response messages to the voting component 122. In operation (4), the voting component 122 determines whether a voting threshold condition has been reached. In operation (5), the voting component chooses a winning time slot, and sends an event-notification message to each participant which informs the participant of the winning time slot.

Figure 28:
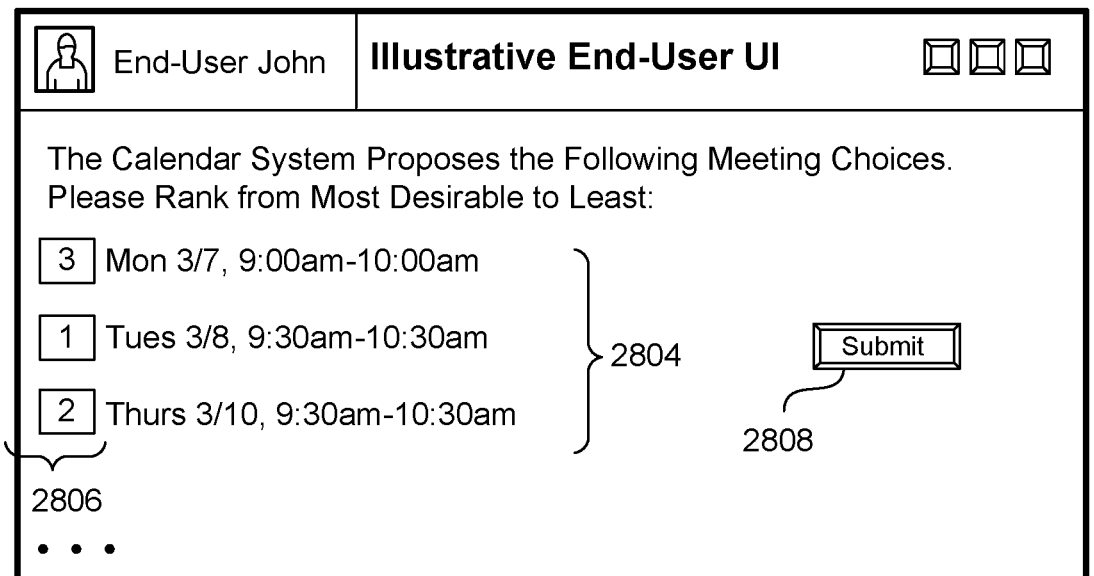
FIG. 28 shows one illustrative user interface presentation whereby an end-user can vote on candidate-compromise time slots generated by the voting component.

FIG. 28 shows one illustrative user interface presentation 2802 whereby an end-user can vote on candidate-compromise time slots generated by the voting component. A UI portion 2804 displays three candidate-compromise time slots for an end-user's consideration. A UI input feature 2806 receives votes from the end-user. Here, the end-user has ranked the candidate-compromise time slots from most preferred (vote=1) to least preferred (vote=3). There are three candidate-compromise options here, but other implementations can provide any other number k of options. A UI command feature 2808 allows the end-user to submit his or her votes.

F. Report-Generating Component

Figure 29:
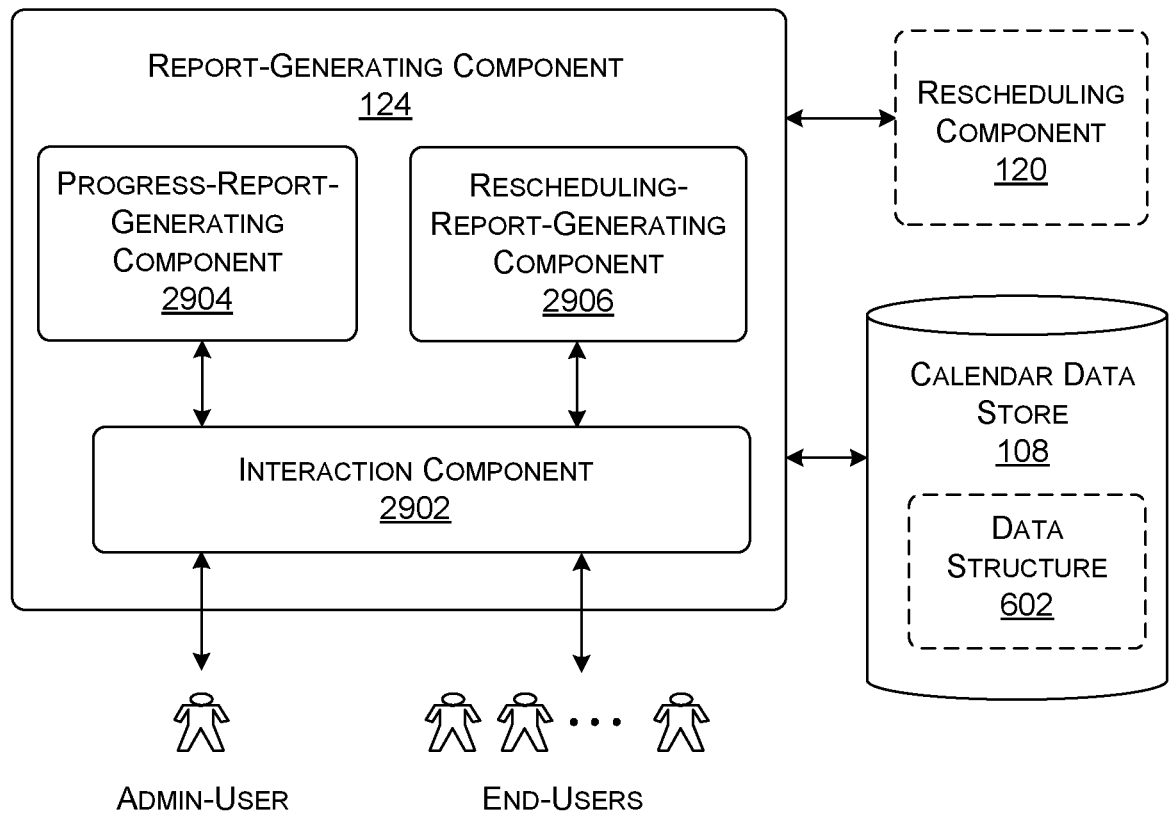
FIG. 29 shows one implementation of a report-generating component, which is another component of the calendar system of FIG. 1. The report-generating component generates reports that describe the operation of the calendar system.

FIG. 29 shows one implementation of the report-generating component 124, which was introduced in Section A. The purpose of the report-generating component 124 is to generate reports that describe the state of the data structure 602 at any given time. The reports can also describe the outcome of the operation of the forward scheduling component 116 and the rescheduling component 120.

An interaction component 2902 allows any administrative-user and (optionally) any authorized end-user to request and receive report information. A progress-report-generating component 2904 prepares a report that describes the actual state of the data structure 602 over the course of time, e.g., as a result of the operation of the forward scheduling component 116 and/or successive applications of the rescheduling component 120. Or the user may view a snapshot of the state of the data structure 602 at a single instance of time. A rescheduling-report-generating component 2906 prepares a report that describes the outcome of any individual episode of rescheduling performed by the rescheduling component 120. The rescheduling performed by the rescheduling component 120 can correspond to a trial run (which does not affect the actual event information in the calendar data store 108) or an actual run (which does affect the event information in the calendar data store 108).

Figure 30:
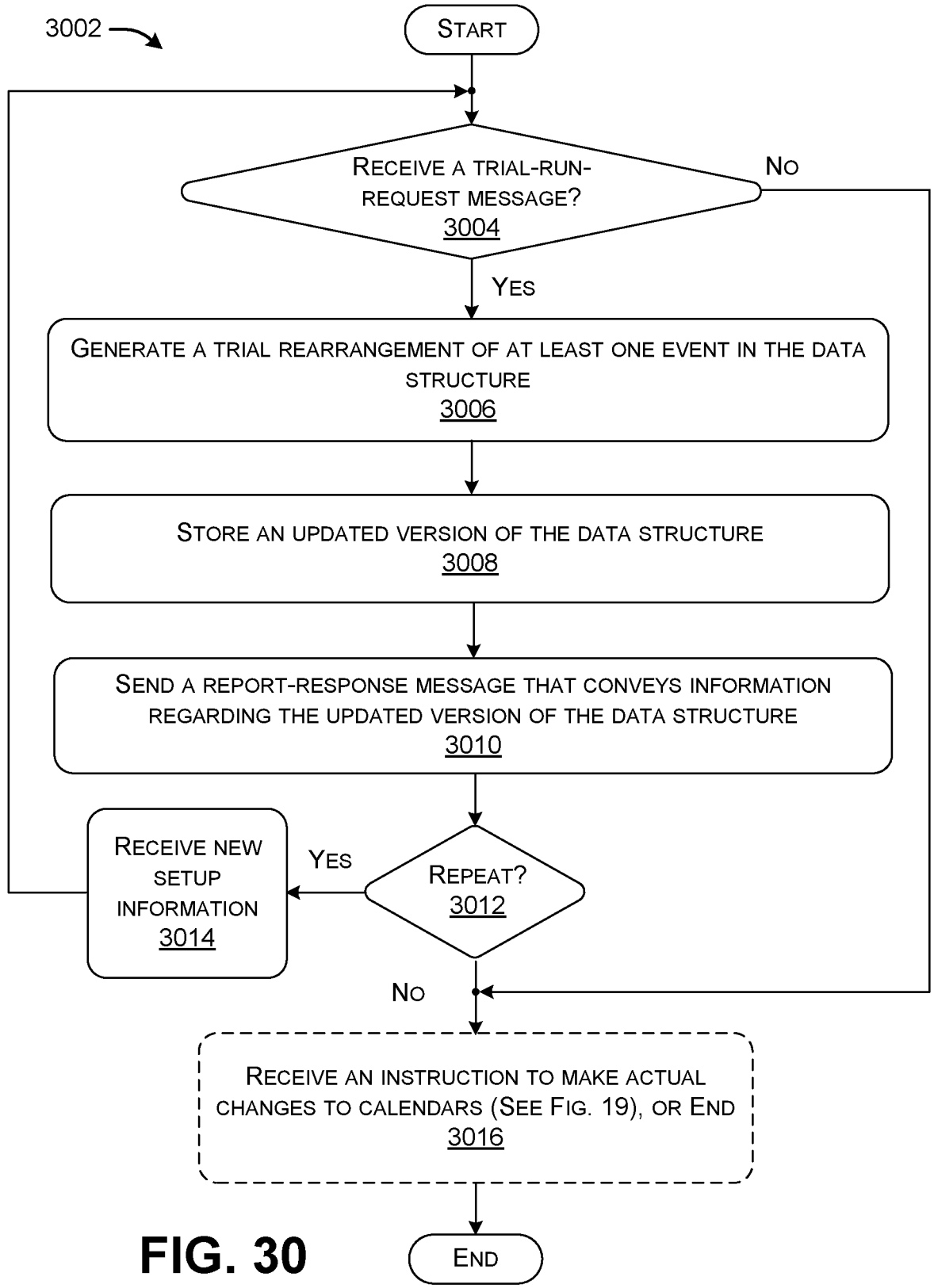
FIG. 30 shows a process that describes one manner of operation of the report-generating component of FIG. 29.

FIG. 30 shows a process 3002 that describes one strategy for interacting with the rescheduling component 120. The rescheduling component 120 and the report-generating component 124 perform this process 3002 at the direction of an administrative-user (or any other authorized user).

In block 3004, the rescheduling component 120 determines whether it has received a command from the administrative-user to perform a trial-run rescheduling operation. For instance, an administrative-user can designate a rescheduling operation as a trial run via the UI feature 2304 of FIG. 23. The administrative-user can invoke the rescheduling operation by activating the command feature 2320 of FIG. 23.

In block 3006, the rescheduling component 120 generates a trial rearrangement of events, but without affecting the event information in the calendar data store 108 and without locking the calendar data store 108. The rescheduling operation, as previously described, entails generating a trial rearrangement of at least one event in the data structure in such a manner that: (a) each event in the data structure satisfies participant-related constraints associated with that event; (b) the data structure as a whole exhibits a reduced level of fragmentation, relative to a current (initial) level of fragmentation; and (c) each event that is moved is penalized as a function of a temporal distance $t_A$ over which the event is moved. In block 3008, the rescheduling component 120 stores an updated version of the data structure (in the pending event data store 1810).

In block 3010, upon request from the administrative-user, the report-generating component 124 sends a report-response message over a computer network to a user device operated by the administrative-user. The report-response message conveys information regarding the updated version of the data structure produced in the trial run.

In block 3012, the administrative-user examines the report and makes one of at least two decisions. As a first decision, the administrative-user may decide to change the setup information and instruct the rescheduling component 120 to perform another trial rescheduling operation based on the new setup information. For example, the administrative-user may change a target level of defragmentation and then instruct the rescheduling component 120 to repeat the rescheduling operation. As a second decision, the administrative-user may instruct the rescheduling component 120 to repeat the rescheduling operation in an actual run, in which the events in the calendar data store 108 are rearranged.

In block 3014, as an outcome of the first decision, the rescheduling component 120 receives new setup information. In block 3016, as an outcome of the second decision, the rescheduling component 120 receives an instruction to perform an actual (non-trial) rescheduling operation.

Figure 31:
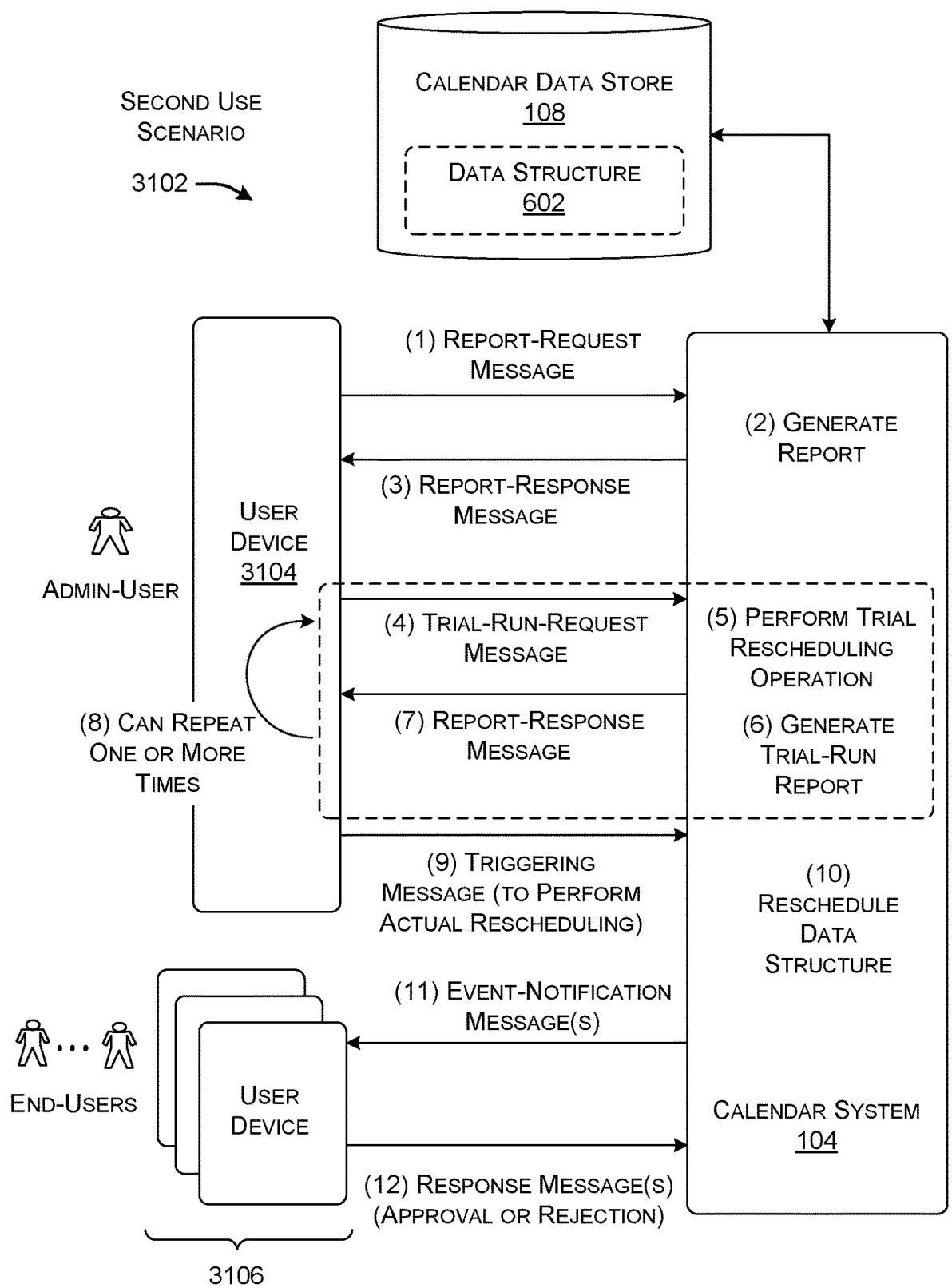
FIG. 31 shows one use scenario of the report-generating component of FIG. 29.

FIG. 31 shows one use scenario 3102 which summarizes the process 3002 described above. In operation (1), an administrative-user uses a user device 3104 to send a report-request message to the report-generating component 124. The report-request message can ask the report-generating component 124 to generate a progress report or a static current-fragmentation report (which thereby invokes the services of the progress-report-generating component 2904) or to generate a rescheduling report to gauge the outcome of a previous rescheduling operation (which thereby invokes the services of the rescheduling-report-generating component 2906). In operation (2), the report-generating component 124 generates the requested report. In operation (3), the report-generating component 124 sends a report-response message to the user device 3104 which conveys the requested report.

Assume that the administrative-user reviews the report and decides to perform what-if analysis on calendars to determine how they may be rearranged to satisfy a free-time objective. In operation (4), the administrative-user sends a trial-run-request message to the rescheduling component 120 that requests it to perform a trial rescheduling operation. In operation (5), the rescheduling component 120 performs the trial-run rescheduling operation. In operation (6), the report-generating component 124 generates a trial-run report which describes the output results of the trial-run rescheduling operation. In operation (7), the report-generating component 124 generates a report-response message which conveys the trial-run report. Operation (8) indicates that that the operations (4)-(7) can be repeated one or more times, at the instruction of the administrative-user. For example, the administrative-user may decide to change the setup information that governs the trail-run rescheduling operation and then repeat the operations (4)-(7).

In operation (9), the administrative-user sends a triggering message to the rescheduling component 120, which provides an instruction to perform an actual rescheduling of events in the calendar data store 108. In operation (10), the rescheduling component 120 performs an actual rescheduling operation after locking the data structure 602. In operation (11), the rescheduling component 120 can optionally notify each end-user that is affected by the rescheduling operation of the events that have been moved. In operation (12), each end-user that receives an event-notification message can optionally send a response message, which conveys the end-user's acceptance or rejection of each rescheduled event. The end-users interact with the calendar system 104 via respective user devices 3106.

Figure 32:
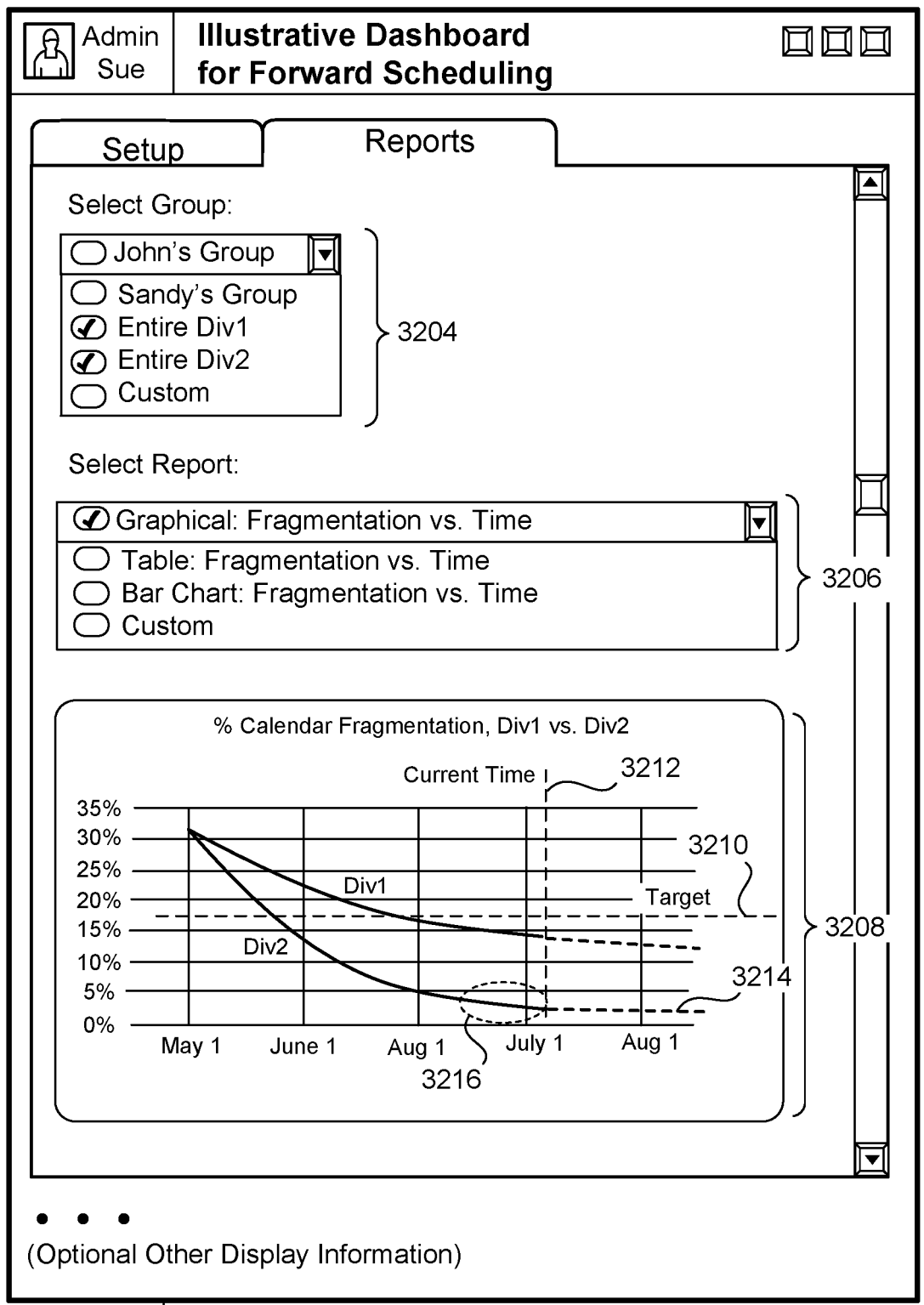
FIG. 32 shows an illustrative user interface presentation that allows an administrative-user to interact with the report-generating component of FIG. 29.

FIG. 32 shows a user interface presentation 3202 with which an administrative-user can interact with the progress-report-generating component 2904. For example, the administrative-user may request a report from the progress-report-generating component 2904 which displays the outcome of the operation of the forward scheduling component 116 as a function of time.

A UI feature 3204 allows the administrative-user to specify a subset of calendars for which the report will be generated. A UI feature 3206 allows the administrative-user to specify the type of report that will be generated. Here, the administrative-user requests the progress-report-generating component 2904 to generate a report which graphically describes the fragmentation of the data structure 602 as a function of time.

A UI portion 3208 conveys the report requested by the administrative-user. In this particular case, the report shows the level of fragmentation in the data structure as a function of time for two divisions of a company (Div1 and Div2). A horizontal dashed line 3210 shows a target level of defragmentation specified by the administrative-user. A vertical dashed line 3212 shows a current time.

Note that the report optionally shows a projection of the fragmentation level as a function of time into the future. For example, a dashed-line extension 3214 provides a projection of the fragmentation level of Div2 as a function of time into the future. The progress report-generating component 2904 can generate such projection information in different ways. In one case, the progress-report-generating component 2904 can estimate the slope of a curve in a region 3216 immediately preceding a current point in time. The progress-report-generating component 2904 can then extend the trend into the future along the same slope.

Alternatively, or in addition, the progress-report-generating component 2904 may maintain information regarding the responsiveness of the division under consideration to the operation of the forward scheduling component 116 (with respect to the level of fragmentation in the data structure 2602), e.g., in a lookup table or the like. The progress-report-generating component 2904 can consult this historical information in generating its projection for the division under consideration. For example, the historical data may reveal that, at a given fragmentation level x, it generally takes y number of days for the division to reach a 5 percent further reduction in the fragmentation level.

As a general observation, the report shown in FIG. 32 reveals that progress towards defragmentation of the data structure 602 can be expected to slow and (potentially) level off as time progresses. This is because, beyond certain low levels of fragmentation, further reductions in fragmentation become increasingly difficult to achieve, e.g., due to intractable scheduling constraints.

Figure 33:
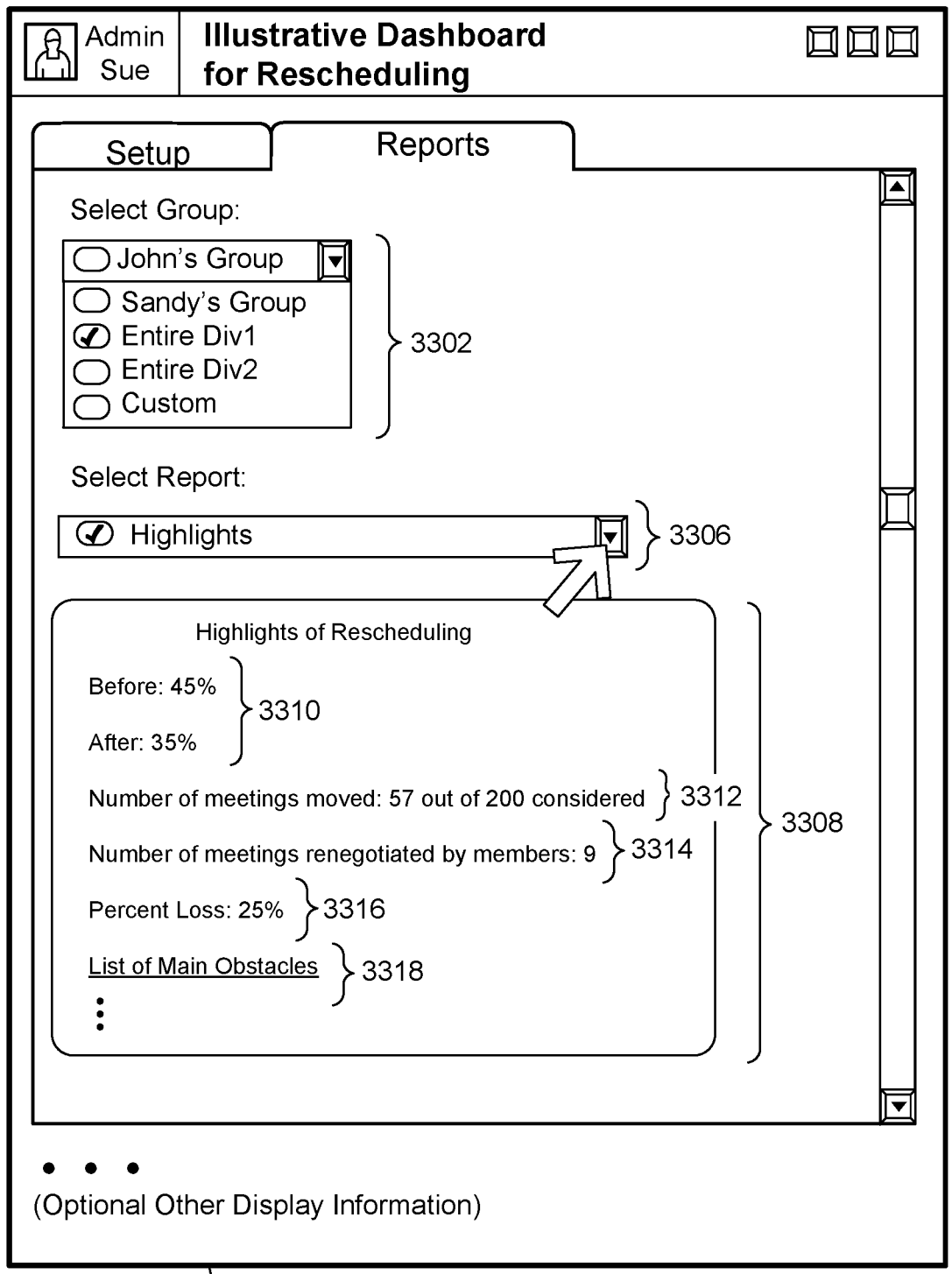
FIG. 33 shows another illustrative user interface presentation that allows an administrative-user to interact with the report-generating component of FIG. 29.

FIG. 33 shows a user interface presentation 3302 with which an administrative-user can interact with the rescheduling-report-generating component 2906. The administrative-user may request a report from the rescheduling-report-generating component 2906 to inspect the outcome of the operation of the rescheduling component 120, operating in either its trial mode or actual mode.

A UI feature 3304 allows an administrative-user to select a group of calendars for which a report will be generated. Here, the administrative-user specifies that he or she would like to inspect the outcome of a rescheduling operation as it affects the members of a particular division within a company.

A UI feature 3306 allows the administrative-user to select a format of a report to be generated. Here, the administrative-user specifies that he or she would like to receive a report which conveys highlight information regarding the performance of the rescheduling operation. Another type of report corresponds to a heat map (e.g., density map) of the type shown in FIG. 16.

A UI portion 3308 provides the requested report information. More specifically, a UI portion 3310 reveals a level of fragmentation of the data structure 602 before and after the rescheduling operation. A UI portion 3312 identifies the number of events that have been moved by the rescheduling operation, with respect to a total number of events processed by the rescheduling component 120. A UI portion 3314 can identify a number of events that were resolved using the voting component 122, if any. A UI portion 3316 can reveal a percent of loss associated with a rescheduling operation, if any. An instance of loss occurs when an event is rescheduled to a new time slot that does not satisfy all of the participant-related constraints (and, for example, results in a double-booking situation or a dropped invitee), and/or does not satisfy the free-time-related constraints.

A UI portion 3318 provides a list of principal obstacles to the rescheduling operation. For example, assume that the rescheduling operation identifies 50 events that could not be automatically rescheduled due to deadlock conditions. The rescheduling-report-generating component 2906 can form a histogram of participants in those 50 events. Participants having a high count in the histogram may correspond to individuals whose presence in events is causing deadlock conditions, e.g., due to the nature of constraints affecting those individuals' calendars and/or other factors. An administrative-user may respond to such a finding in different ways, such as by questioning whether it is necessary for those individuals to attend the events under consideration.

The types of report fields depicted in FIGS. 32 and 33 are presented in the spirit of illustration, not limitation. Other implementations can provide other ways of summarizing the operation of the forward scheduling component 116 and the rescheduling component 120.

G. Alternative Applications

In the above examples, the calendar system 104 achieves a target objective that is defined as a function of instances of free time in a calendar data structure. More generally stated, the calendar system 104 can achieve any target objective that is defined as a function of calendar occurrences of a particular kind (target occurrences), as measured across the calendar data structure.

For example, an occurrence of a particular kind (target occurrence) may correspond to a particular activity performed during the day that is considered desirable (or undesirable) for any environment-specific reason. For example, a promoted activity may correspond to a safety check within a factory environment, exercise session, meal break, relaxation break, etc. As a target objective, the calendar system 104 can attempt to achieve an ideal state in which every calendar has a prescribed number of these scheduled occurrences on each work day (such as one per day, or two per day, etc.). Or the calendar system 104 can attempt to achieve a state in which a prescribed percentage of calendars have a prescribed number of these occurrences each day. The calendar system 104 can also apply weighting values (in the manner described above) that promote the coordination of the target occurrences across an organization or some part of the organization. For example, the calendar system 104 can favorably weight a candidate time slot for a daily relaxation break that occurs within a preferred timeframe. Doing so can potentially enhance the efficiency and profitability of the organization, e.g., by achieving uniformity within the organization and increasing opportunities for collaboration among its members.

In another example, a promoted target occurrence can refer to a relationship among events in the calendar data structure. For example, a promoted occurrence may correspond to an occasion in which two meetings occur in back-to-back fashion with no free time separating them, or with minimal travel-time allowance between the meetings. As a target objective, the calendar system 104 can attempt to achieve a state in which all (or a prescribed percentage) of workdays in the calendar data structure have a prescribed number of instances in which two meetings occur in back-to-back fashion. This target objective operates to compress events within the calendar data structure, which may indirectly serve to increase free time across the calendars. In another case, a promoted occurrence may correspond to an occasion in which two consecutive meetings occur in the same geographic region, e.g., in the same building. As a target objective, the calendar system 104 can attempt to achieve a state in which all (or a prescribed percentage) of workdays in the calendar data structure have a prescribed number of instances in which consecutive meetings occur in the same region. This target objective operates to reduce travel costs within an organization.

In yet other cases, an organization can apply the calendar system 104 to promote a mix of two or more occurrences of different respective kinds, such as occurrences of minimum-sized free-time blocks and instances of back-to-back meetings. The calendar system 104 can apply weighting values to govern the relative importance of each sub-objective relative to another other sub-objective.

The same algorithms described above can be applied to the above use scenarios. For instance, instead of finding a day that has the maximum number of minimum-sized free-time blocks across a set of calendars (e.g., in block 1006 of FIG. 10 and in block 2212 of FIG. 22), the algorithms can find a day that has a maximum number of target occurrences of a particular kind, in whatever manner defined, across a set of calendars. A counterpart to the free-time scheduling component 118 can proactively schedule events of any particular kind, such as a safety checks, relaxation breaks, etc.

With respect to the above alternative examples, it still remains the case that the calendar system 104 can be said to defragment the calendar data structure. In the most general context, defragmentation means making the data structure more ordered or compliant with whatever target objective is being sought. In other words, a data structure can be considered to exhibit a high level of fragmentation with respect to occurrences of a particular kind when its individual calendars do not conform to the target objective with any degree of consistency, such that instances of compliance (with respect to the target objective) are scattered among instances of non-compliance in a haphazard and disordered manner.

H. Representative Computing Functionality

Figure 34:
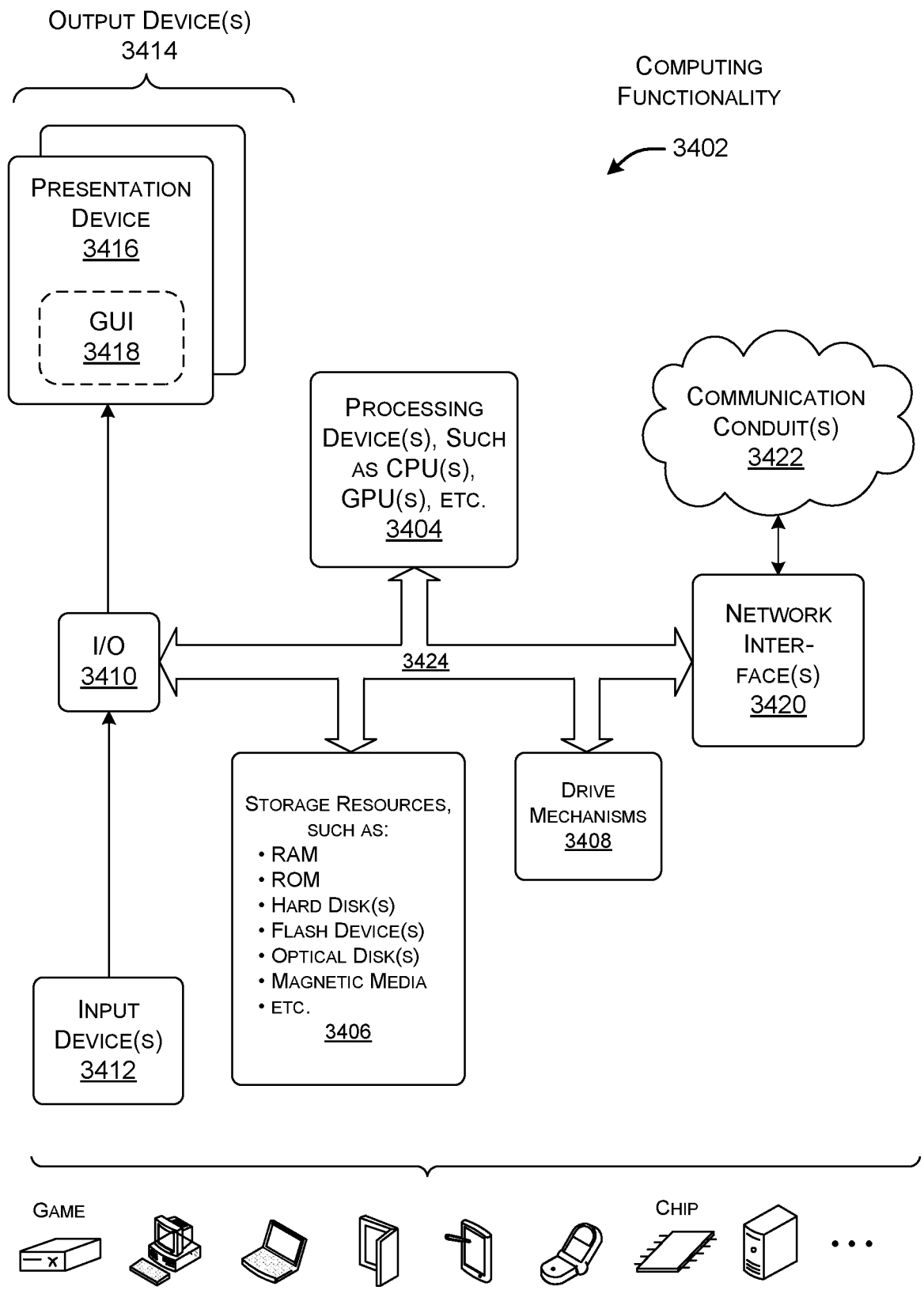
FIG. 34 shows illustrative computing functionality that can be used to implement any aspect of the features shown in the foregoing drawings.

FIG. 34 shows computing functionality 3402 that can be used to implement the calendar system 104 of FIG. 1. In one implementation, the calendar system 104 is entirely implemented by server-side functionality, e.g., by one or more server computing devices. In another implementation, the calendar system 104 is implemented by a combination of server-side functionality and client-side functionality, e.g., as implemented by a combination of one or more sever computing devices and user devices. In these contexts, the computing functionality 3402 may represent any server computing device or any user device. In all cases, the computing functionality 3402 represents one or more physical and tangible processing mechanisms.

The computing functionality 3402 can include one or more hardware processor devices 3404, such as one or more central processing units (CPUs), and/or one or more graphical processing units (GPUs), and so on. The computing functionality 3402 can also include any storage resources (also referred to as computer-readable storage media or computer-readable storage medium devices) 3406 for storing any kind of information, such as machine-readable instructions, settings, data, etc. Without limitation, for instance, the storage resources 3406 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the computing functionality 3402. The computing functionality 3402 may perform any of the functions described above when the hardware processor device(s) 3404 carry out computer-readable instructions stored in any storage resource or combination of storage resources. The computing functionality 3402 also includes one or more drive mechanisms 3408 for interacting with any storage resource, such as a hard disk drive mechanism, an optical disk drive mechanism, and so on.

The computing functionality 3402 also includes an input/output component 3410 for receiving various inputs (via input devices 3412), and for providing various outputs (via output devices 3414). Illustrative input devices include a keyboard device, a mouse input device, a touchscreen input device, a digitizing pad, one or more video cameras, one or more depth cameras, a free space gesture recognition mechanism, one or more microphones, a voice recognition mechanism, any movement detection mechanisms (e.g., accelerometers, gyroscopes, etc.), and so on. One particular output mechanism may include a display device 3416 and an associated graphical user interface presentation (GUI) 3418. The display device 3416 may correspond to a charge-coupled display device, a cathode ray tube device, a projection mechanism, etc. Other output devices include a printer, a model-generating mechanism, a haptic output mechanism, an archival mechanism (for storing output information), and so on. The computing functionality 3402 can also include one or more network interfaces 3420 for exchanging data with other devices via one or more communication conduits 3422. One or more communication buses 3424 communicatively couple the above-described components together.

The communication conduit(s) 3422 can be implemented in any manner, e.g., by a local area computer network, a wide area computer network (e.g., the Internet), point-to-point connections, etc., or any combination thereof. The communication conduit(s) 3422 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 3402 (and its hardware processor) can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc. In this case, the machine-executable instructions are embodied in the hardware logic itself.

The following summary provides a non-exhaustive list of illustrative aspects of the technology set forth herein.

According to a first aspect, a computer-implemented calendar system is described that includes a calendar data store and a rescheduling component. The calendar data store stores a plurality of calendars associated with members within an organization, the plurality of calendars collectively constituting a data structure. The rescheduling component is configured to reschedule events in the calendars. The rescheduling component includes: logic configured to identify a triggering event that triggers the rescheduling component to perform a rescheduling of events; logic configured to lock, in response to the triggering event, the data structure provided in the calendar data store, locking being performed to prevent modification of the data structure by end-users during rescheduling of the data structure; logic configured to identify a collection of events in the data structure to be rescheduled; logic configured to clear the data structure with respect to the collection of events by freeing time slots occupied by the respective events; logic configured to rearrange, using a computer-implemented process, the collection of events in the data structure to produce an updated version of the data structure, such that: (a) the collection of events satisfies participant-related constraints associated with the events; (b) the updated version of the data structure as a whole exhibits a reduced level of fragmentation with respect to target occurrences of a particular kind, relative to a current level of fragmentation of the target occurrences, prior to rearranging the events; and (c) each event that is moved is penalized as a function of a temporal distance over which the event is moved; logic configured to store the updated version of the data structure in the calendar data store; and logic configured to unlock the data structure in the calendar data store.

According to a second aspect, the computer-implemented calendar system further includes: logic configured to automatically determine the current level of fragmentation of the target occurrences within the data structure, prior to rearranging the collection of events; logic configured to assess, based at least on comparison of the current level of fragmentation with a fragmentation threshold value, whether it is appropriate to reduce fragmentation of the target occurrences in the data structure; and logic configured to generate the triggering event when it is determined to be appropriate to reduce fragmentation.

According to a third aspect, the triggering event corresponds to a triggering message that is received over a computer network from a user device operated by a user.

According to a fourth aspect, the computer-implemented calendar system further includes: logic configured to receive a setup message from a user device that specifies an administrator-specified type and/or degree of permitted loss; and logic configured to relax constraints employed by the above-referenced logic configured to rearrange based on the administrator-specified type and/or degree of permitted loss.

According to a fifth aspect, the above-referenced logic configured to rearrange includes: logic configured to order events in the collection of events based on one or more factors, to produce a reordered collection of events; and logic configured to process each event in the reordered collection of events by identifying a new proposed time slot, if any, for the event that: (a) satisfies participant-related constraints associated with the event; and (b) satisfies a target objective that is defined as a function of the target occurrences, as measured across calendars associated with participants of the event, the function applying a weighting value based on a temporal distance between the new proposed time slot and an original time slot associated with the event.

According to a sixth aspect, a method is described, performed using a computer implemented calendar system, for rescheduling events. The method includes: receiving a triggering event that triggers the calendar system to perform rescheduling of events in a data structure provided in a calendar data store, the data structure collectively representing a plurality of calendars associated with a plurality of members of an organization; in response to the triggering event, identifying a collection of events in the data structure to be rescheduled; clearing the data structure with respect to the collection of events by freeing time slots occupied by the respective events; and rearranging, using a computer-implemented process, the collection of events in the data structure to produce an updated version of the data structure. The above-referenced rearranging is performed in such a manner that: (a) the collection of events satisfies participant-related constraints associated with the events; (b) the updated version of the data structure as a whole exhibits a reduced level of fragmentation with respect to target occurrences of a particular kind, relative to a current level of fragmentation of the target occurrences, prior the above-referenced rearranging; and (c) each event that is moved is penalized as a function of a temporal distance over which the event is moved. The method further includes storing the updated version of the data structure.

According to a seventh aspect, the method further includes: prior to the above-referenced rescheduling, locking the data structure provided in the calendar data store, the above-referenced locking being performed to prevent modification of the data structure by end-users while the data structure is being rearranged; and after the above-referenced storing, unlocking the data structure in the calendar data store.

According to an eighth aspect, the above-referenced rearranging is a trial-run rearrangement of the collection of events that does not affect the calendars in the calendar data store, and which is performed without locking the data structure in the calendar data store.

According to a ninth aspect, the method further includes generating the triggering event in response to: automatically determining the current level of fragmentation of the target occurrences within the data structure, prior to the above-referenced rearranging; and assessing, based at least on comparison of the current level of fragmentation with a fragmentation threshold value, whether it is appropriate to reduce fragmentation of the target occurrences in the data structure.

According to a tenth aspect, the triggering event corresponds to a triggering message that is received over a computer network from a user device operated by a user.

According to an eleventh aspect, the method further includes: receiving a setup message from a user device that specifies an administrator-specified type and/or degree of permitted loss; and relaxing constraints employed by the above-referenced rearranging based on the administrator-specified type and/or degree of permitted loss.

According to a twelfth aspect, the above-referenced rearranging includes: ordering events in the collection of events based on one or more factors, to produce a reordered collection of events; and processing each event in the reordered collection of events by identifying a new proposed time slot, if any, for the event that: (a) satisfies participant-related constraints associated with the event; and (b) satisfies a target objective that is defined as a function of the target occurrences, as measured across calendars of a set of participants associated with the event. The function applies a weighting value based on a temporal distance between the new proposed time slot and an original time slot associated with the event.

According to a thirteenth aspect, each event has a number of constraints associated therewith, and wherein the above-referenced ordering comprises, at least in part, ordering events from a greatest number of constraints to a least number of constraints.

According to a fourteenth aspect, the target objective is a free-time objective, and wherein the target occurrences correspond to instances of free time, and wherein the above-referenced identifying of the new proposed time slot includes: identifying a set of candidate time slots that satisfy the participant-related constraints for the set of participants, each candidate time slot occurring within an associated candidate time unit; computing, for each candidate time slot in the set of candidate time slots, a distance-weighted total amount of available free time of a particular type within a corresponding candidate time unit, as measured across all of the calendars of the set of participants; determining if there is single winning candidate time slot, among the set of candidate winning time slots, that has a distance-weighted maximum amount of available free time of the particular type within a corresponding candidate time unit; if there is such a single winning candidate time slot, choosing the new proposed time slot to correspond to the single winning candidate time slot; and if there is a subset of two or more candidate time slots, among the set of candidate time slots, each of which is associated with a same distance-weighted maximum amount of available free time of the particular type, using a tiebreaking rule to choose a tiebreaking winning candidate time slot among the subset of candidate time slots.

According to a fifteenth aspect, the method further includes receiving a setup message over a computer network from a user device operated by a user, the setup message conveying a target level of defragmentation. The above-referenced rearranging is configured to achieve the target level of defragmentation, if achieving the target level of defragmentation is possible.

According to a sixteenth aspect, the method further includes: sending an event-notification message over the computer network to each member of the organization that is affected by the above-referenced rearranging; and receiving a response message over the computer network from each of at least some members, conveying an acceptance or rejection of at least one rearranged event.

According to a seventeenth aspect, the method further includes: identifying a set of events that cannot be automatically rearranged; and for each event in the set of events, using a voting procedure to reschedule the event. The voting procedure includes the operations of: identifying a set of candidate-compromise time slots for the event; sending a notification message to each participant of the event, conveying the set of candidate-compromise time slots; receiving, from each of at least some of the participants, a voting-response message that conveys a vote by each participant for at least one of the set of candidate-compromise time slots; incrementing voting tally information based on receipt of each voting-response message; determining whether the voting tally information meets a voting threshold condition; and if the voting threshold condition has been met, selecting a winning candidate-compromise time slot based on the voting tally information.

According to an eighteenth aspect, a computer-readable storage medium is described for storing computer-readable instructions. The computer-readable instructions, when executed by one or more processor devices, perform a method that includes: identifying a triggering event that invokes a rescheduling of events in a data structure provided in a calendar data store, the data structure collectively representing a plurality of calendars associated with a plurality of members of an organization; identifying a collection of events in the data structure to be rescheduled; clearing the data structure with respect to the collection of events by freeing time slots occupied by the respective events; and rearranging, using a computer-implemented process, the collection of events in the data structure, to produce an updated version of the data structure. The above-referenced rearranging includes: ordering events in the collection of events based on one or more factors, to produce a reordered collection of events; and processing each event in the reordered collection of events by identifying a new proposed time slot for the event that: (a) satisfies participant-related constraints associated with the event; (b) satisfies a free-time objective that is defined as a function of a total amount of free time, as measured across calendars of a set of participants associated with the event, the total amount of free time being weighted based on a temporal distance between the new proposed time slot and an original time associated with the event. The method further includes storing the updated version of the data structure.

According to a nineteenth aspect, the method further includes: prior to the above-referenced rescheduling, locking the data structure provided in the calendar data store, the above-referenced locking being performed to prevent modification of the data structure by end-users while the data structure is being rearranged; and after the above-referenced storing, unlocking the data structure in the calendar data store.

According to a twentieth aspect, the above-referenced identifying of the new proposed time slot includes: identifying a set of candidate time slots that satisfy the participant-related constraints for the set of participants; computing, for each candidate time slot in the set of candidate time slots, a distance-weighted total amount of available free time of a particular type, as measured across all of the calendars of the participants; determining if there is single winning candidate time slot, among the set of candidate time slots, that has a weighted maximum amount of available free time of the particular type; if there is such a single winning candidate time slot, choosing the new proposed time slot to correspond to the single winning candidate time slot; and if there is a subset of two or more candidate time slots, among the set of candidate time slots, each of which is associated with a same weighted maximum amount of available free time of the particular type, using a tiebreaking rule to choose a tiebreaking winning candidate time slot among the subset of candidate time slots.

A twenty-first aspect corresponds to any combination (e.g., any permutation or subset) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented calendar system, comprising:
a data store storing a data structure representing a plurality of calendars;
a processing device; and
a storage resource storing machine-readable instructions which, when executed by the processing device, cause the processing device to:
while the data structure is in an unlocked state, add events to the data structure in response to messages received over a wide-area or local-area network from a plurality of remote end-user devices;
identify a triggering event that triggers defragmentation of the data structure, the triggering event being received when the data structure has a first level of fragmentation with respect to contiguous blocks of free time;
in response to the triggering event, place the data structure stored in the data store into a locked state that prevents modification of the data structure by the plurality of remote end-user devices;
while the data structure is in the locked state, defragment the data structure by:
identifying candidate time slots that satisfy participant-related constraints associated with individual events in the data structure;
determining respective numbers of contiguous blocks of free time for the candidate time slots;
based at least on the respective numbers of contiguous blocks of free time, determining new time slots for the individual events; and
modifying the data structure by moving the individual events to the new time slots in the data structure, the modifying resulting in a defragmented version of the data structure that, as a whole, exhibits a second level of fragmentation with respect to the contiguous blocks of free time, the second level of fragmentation being reduced relative to the first level of fragmentation of the data structure;
store the defragmented version of the data structure in the data store;
place the data structure in the data store in the unlocked state after the defragmenting; and
after placing the data structure in the unlocked state, add further events to the data structure in response to further messages received over the wide-area or local-area network from the plurality of remote end-user devices.

2. The computer-implemented calendar system of claim 1, wherein the machine-readable instructions, when executed by the processing device, cause the processing device to:
automatically monitor a current level of fragmentation of the data structure over time;
assess, based at least on a comparison of the current level of fragmentation with a fragmentation threshold value, whether it is appropriate to defragment the data structure; and
generate the triggering event when it is determined to be appropriate to defragment the data structure.

3. The computer-implemented calendar system of claim 1, wherein the triggering event corresponds to a triggering message that is received over the wide-area or local-area network from a particular remote end-user.

4. The computer-implemented calendar system of claim 1, wherein the machine-readable instructions, when executed by the processing device, cause the processing device to:
receive, over the wide-area or local-area network, a setup message from a particular remote end-user device that specifies an administrator-specified type and/or degree of permitted loss; and
relax constraints employed when defragmenting the data structure based at least on the administrator-specified type and/or degree of permitted loss.

5. The computer-implemented calendar system of claim 1, wherein the machine-readable instructions, when executed by the processing device, cause the processing device to:
when defragmenting the data structure, penalize the candidate time slots as a function over which the individual events are moved from previously-scheduled time slots.

6. A method performed by a processing device, the method comprising:
storing a data structure representing a plurality of calendars in a data storage device;
while the data structure is in an unlocked state, adding events to the data structure in response to messages received over a wide-area or local-area network from a plurality of remote end-user devices;
receiving a triggering event that triggers defragmentation of the data structure stored in the data storage device, the triggering event being received when the data structure has a first level of fragmentation with respect to contiguous blocks of free time;
in response to the triggering event, placing the data structure stored in the data storage device into a locked state that prevents modification of the data structure by the plurality of remote end-user devices;
while the data structure is in the locked state, defragmenting the data structure by:
identifying candidate time slots that satisfy participant-related constraints associated with individual events in the data structure;
determining respective numbers of contiguous blocks of free time for the candidate time slots;
based at least on the respective numbers of contiguous blocks of free time, determining new time slots for the individual events; and
modifying the data structure by moving the individual events to the new time slots in the data structure, the modifying resulting in a defragmented version of the data structure that, as a whole, exhibits a second level of fragmentation with respect to the contiguous blocks of free time, the second level of fragmentation being reduced relative to the first level of fragmentation of the data structure;

storing the defragmented version of the data structure in the data storage device;

placing the data structure in the data storage device in the unlocked state after the defragmenting; and after placing the data structure in the unlocked state, adding further events to the data structure in response to further messages received over the wide-area or local-area network from the plurality of remote end-user devices.

7. The method of claim 6, further comprising:

in at least one instance, performing a trial-run rearrangement of the individual events that does not affect the data structure without locking the data structure in the data storage device.

8. The method of claim 6, further comprising generating the triggering event in response to:

automatically monitoring a current level of fragmentation of the data structure over time; and assessing, based at least on a comparison of the current level of fragmentation with a fragmentation threshold value, whether it is appropriate to defragment the data structure.

9. The method of claim 6, wherein the triggering event corresponds to a triggering message that is received over the wide-area or local-area network from a particular remote end-user device.

10. The method of claim 6, further comprising:

receiving, over the wide-area or local-area network, a setup message from a particular remote end-user device that specifies an administrator-specified type and/or degree of permitted loss; and relaxing constraints employed by the defragmenting based at least on the administrator-specified type and/or degree of permitted loss.

11. The method of claim 6, wherein the defragmenting comprises:

ordering the individual events based at least on one or more factors, to produce a reordered collection of events; and determining respective new time slots for each particular event in the reordered collection of events sequentially.

12. The method of claim 11, wherein each individual event has a number of constraints associated therewith, and wherein said ordering comprises, at least in part, ordering the individual events from a greatest number of constraints to a least number of constraints.

13. The method of claim 11, wherein the contiguous blocks of free time have a specified minimum duration.

14. The method of claim 6, further comprising:

receiving, over the wide-area or local-area network, a setup message from a particular remote end-user device, the setup message conveying a target level of defragmentation, wherein said defragmenting is configured to achieve the target level of defragmentation provided that achieving the target level of defragmentation is determined to be feasible.

15. The method of claim 6, further comprising:

sending event-notification messages over the wide-area or local-area network to respective remote end-user devices associated with members of an organization that is affected by the defragmenting; and receiving response messages over the wide-area or local-area network from the respective remote end-user devices, the response messages conveying acceptance or rejection of at least one rearranged event.

16. The method of claim 6, further comprising:

identifying a set of other events in the data structure that cannot be automatically rearranged; and for each particular event in the set of other events, using a voting procedure to reschedule the particular event, the voting procedure comprising:

identifying a set of candidate-compromise time slots for the particular event;

sending, over the wide-area or local-area computer network, a notification message to each participant of the particular event, conveying the set of candidate-compromise time slots;

receiving, over the wide-area or local-area network from each of at least some of the participants, a voting-response message that conveys a vote by each participant for at least one of the set of candidate-compromise time slots;

incrementing voting tally information based on receipt of each voting-response message;

determining whether the voting tally information meets a voting threshold condition; and in instances when the voting threshold condition has been met, selecting a winning candidate-compromise time slot based on the voting tally information.

17. A computer-readable storage medium storing computer-readable instructions, the computer-readable instructions, when executed by one or more processor devices, causing the one or more processor devices to perform acts comprising:

while a data structure representing a plurality of calendars is in an unlocked state, adding events to the data structure in response to messages received over a wide-area or local-area network from a plurality of remote end-user devices;

identifying a triggering event that invokes a defragmentation of the data structure, the triggering event being identified when the data structure has a first level of fragmentation with respect to contiguous blocks of free time;

in response to the triggering event, placing the data structure into a locked state that prevents modification of the data structure by the plurality of remote end-user devices;

while the data structure is in the locked state, defragmenting the data structure by:

identifying candidate time slots that satisfy participant-related constraints associated with individual events in the data structure;

determining respective numbers of contiguous blocks of free time for the candidate time slots;

based at least on the respective numbers of contiguous blocks of free time, determining new time slots for the individual events; and modifying the data structure by moving the individual events to the new time slots in the data structure, the modifying resulting in a defragmented version of the data structure that, as a whole, exhibits a second level of fragmentation with respect to the contiguous blocks of free time, the second level of fragmentation being reduced relative to the first level of fragmentation;

storing the defragmented version of the data structure;

placing the data structure in the unlocked state after the defragmenting; and after placing the data structure in the unlocked state, adding further events to the data structure in response to further messages received over the wide-area or local-area network from the plurality of remote end-user devices.

18. The computer-readable storage medium of claim 17, the acts further comprising:
clearing the data structure by freeing time slots occupied by respective events prior to the defragmenting.

19. The computer-readable storage medium of claim 17, the defragmenting comprising:
penalizing the candidate time slots as a function over which the individual events are moved from previously-scheduled time slots.

20. The computer-readable storage medium of claim 17, the acts further comprising:
outputting a user interface having a field for specifying a target fragmentation level;
receiving, via the user interface, user input specifying a particular target fragmentation level;
continuing the defragmenting while the data structure is in the locked state until the particular target fragmentation level is achieved; and
placing the data structure in the unlocked state and adding the further events after the particular target fragmentation level is achieved.

* * * * *